(12) United States Patent
Whitman et al.

(10) Patent No.: US 10,730,662 B2
(45) Date of Patent: Aug. 4, 2020

(54) METHOD FOR TRANSPORTING GOODS ON A PALLET REVERSIBLY CONVERTIBLE TO A BIN

(71) Applicant: Divert, Inc., Concord, MA (US)

(72) Inventors: Nicholas L. Whitman, Lincoln, MA (US); Ryan R. Begin, North Billerica, MA (US)

(73) Assignee: DIVERT, INC., Concord, MA (US)

( * ) Notice: Subject to any disclaimer, the term of this patent is extended or adjusted under 35 U.S.C. 154(b) by 78 days.

(21) Appl. No.: 16/216,298

(22) Filed: Dec. 11, 2018

(65) Prior Publication Data
US 2019/0112102 A1 Apr. 18, 2019

Related U.S. Application Data

(60) Continuation of application No. 15/469,622, filed on Mar. 27, 2017, now Pat. No. 10,273,046, which is a (Continued)

(51) Int. Cl.
*B65D 19/16* (2006.01)
*B65D 21/08* (2006.01)
(Continued)

(52) U.S. Cl.
CPC .............. *B65D 21/086* (2013.01); *B60P 1/00* (2013.01); *B65D 19/0004* (2013.01);
(Continued)

(58) Field of Classification Search
CPC ..... B65D 23/00; B65D 23/008; H04W 4/029; B65F 2210/128; B65F 2210/138
(Continued)

(56) References Cited

U.S. PATENT DOCUMENTS 3,291,364 A 12/1966 Fischer
3,374,915 A 3/1968 Verhein et al.
(Continued)

FOREIGN PATENT DOCUMENTS

CA 2592214 A1 12/2007
DE 102007051403 A1 4/2008
(Continued)

OTHER PUBLICATIONS

Biogen, "Anaerobic Digestion of Farm and Food Processing residues", p. 1-55.
(Continued)

*Primary Examiner* — King M Chu
(74) *Attorney, Agent, or Firm* — GTC Law Group PC & Affiliates

(57) ABSTRACT

A method for transporting goods on a pallet, where the pallet may be reversibly converted to a bin for the collection of waste and/or recyclable material. The pallet may include a base with side walls and a collapsible sleeve wherein, if the collapsible sleeve is open and joined to the base, the collapsible sleeve, with the base, forms a bin. Goods are transported on the pallet. After unloading the pallets and removing the goods, the pallet may be converted to a bin. Waste or recyclable material may be placed in the bin and transported away. After removing the material in the bin and cleaning the bin, the bin may be collapsed back into a pallet for the transportation of goods.

15 Claims, 31 Drawing Sheets

Related U.S. Application Data division of application No. 15/204,093, filed on Jul. 7, 2016, now abandoned.

(60) Provisional application No. 62/190,055, filed on Jul. 8, 2015.

(51) Int. Cl.

| | | |
|---|---|---|
| *B65F 1/06* | (2006.01) | |
| *B65D 19/00* | (2006.01) | |
| *G06F 16/58* | (2019.01) | |
| *H04W 4/44* | (2018.01) | |
| *G06K 7/10* | (2006.01) | |
| *H04N 5/225* | (2006.01) | |
| *B65F 9/00* | (2006.01) | |
| *G06K 9/18* | (2006.01) | |
| *H04W 4/029* | (2018.01) | |
| *G06Q 30/00* | (2012.01) | |
| *G01G 19/08* | (2006.01) | |
| *G06Q 10/08* | (2012.01) | |
| *G06Q 10/00* | (2012.01) | |
| *G06Q 50/28* | (2012.01) | |
| *H04L 29/06* | (2006.01) | |
| *B66F 9/06* | (2006.01) | |
| *G06Q 30/04* | (2012.01) | |
| *B60P 1/00* | (2006.01) | |
| *H04W 4/40* | (2018.01) | |
| *B65F 1/14* | (2006.01) | |
| *G09F 3/00* | (2006.01) | |
| *G09F 3/02* | (2006.01) | |
| *H04N 5/33* | (2006.01) | |
| *B65D 19/14* | (2006.01) | |

(52) U.S. Cl.
CPC ............. *B65D 19/16* (2013.01); *B65F 1/06* (2013.01); *B65F 9/00* (2013.01); *B66F 9/06* (2013.01); *G01G 19/083* (2013.01); *G06F 16/58* (2019.01); *G06K 7/10009* (2013.01); *G06K 7/10316* (2013.01); *G06K 9/183* (2013.01); *G06Q 10/0875* (2013.01); *G06Q 10/30* (2013.01); *G06Q 30/018* (2013.01); *G06Q 30/04* (2013.01); *G06Q 50/28* (2013.01); *H04L 67/42* (2013.01); *H04N 5/2258* (2013.01); *H04W 4/029* (2018.02); *H04W 4/40* (2018.02); *H04W 4/44* (2018.02); *B65D 19/14* (2013.01); *B65F 1/1468* (2013.01); *B65F 2210/1026* (2013.01); *B65F 2210/128* (2013.01); *B65F 2210/138* (2013.01); *B65F 2220/106* (2013.01); *B65F 2220/1063* (2013.01); *B65F 2240/138* (2013.01); *B65F 2250/105* (2013.01); *B65F 2250/106* (2013.01); *B65F 2250/114* (2013.01); *G06K 2209/19* (2013.01); *G09F 3/0297* (2013.01); *G09F 2003/0272* (2013.01); *H04N 5/332* (2013.01); *Y02W 90/20* (2015.05)

(58) Field of Classification Search
USPC ........................................................ 206/600
See application file for complete search history.

(56) References Cited

U.S. PATENT DOCUMENTS

| | | |
|---|---|---|
| 4,273,500 A | 6/1981 | Yates et al. |
| 4,750,197 A | 6/1988 | Denekamp et al. |
| 4,949,898 A | 8/1990 | Nederveld |
| 5,161,709 A | 11/1992 | Oestreich |
| 5,426,284 A | 6/1995 | Doyle |
| 5,818,346 A | 10/1998 | Goodwin, III et al. |
| 5,903,457 A | 5/1999 | Chang |
| 6,182,849 B1 | 2/2001 | Elstone |
| 6,216,899 B1 | 4/2001 | Vicari |
| 6,902,061 B1 | 6/2005 | Elstone |
| 7,689,465 B1 | 3/2010 | Shakes et al. |
| 8,165,891 B2 | 4/2012 | Roberts |
| 9,120,621 B1 | 9/2015 | Curlander et al. |
| 9,174,883 B2 | 11/2015 | Begin et al. |
| 9,216,857 B1 | 12/2015 | Kalyan et al. |
| 10,005,587 B2 | 6/2018 | Whitman et al. |
| 10,273,046 B2 | 4/2019 | Whitman et al. |
| 10,556,722 B2 | 2/2020 | Whitman et al. |
| 2001/0019056 A1 | 9/2001 | Rosenfeldt |
| 2003/0067414 A1 | 4/2003 | Cole et al. |
| 2004/0238400 A1 | 12/2004 | Knutsson et al. |
| 2005/0080520 A1 | 4/2005 | Kline et al. |
| 2005/0254732 A1 | 11/2005 | Eisenbarth |
| 2006/0015289 A1 | 1/2006 | Shakman et al. |
| 2006/0080819 A1 | 4/2006 | McAllister |
| 2006/0106742 A1* | 5/2006 | Bochicchio .......... G01G 19/083 705/414 |
| 2006/0255951 A1 | 11/2006 | Roeder et al. |
| 2007/0020410 A1 | 1/2007 | Sasine et al. |
| 2007/0222600 A1* | 9/2007 | Reeves ................ G06Q 10/087 340/572.4 |
| 2008/0020456 A1 | 1/2008 | Choate et al. |
| 2008/0035561 A1 | 2/2008 | Gray (Gabb) et al. |
| 2008/0059383 A1 | 3/2008 | Mayernik et al. |
| 2009/0187583 A1 | 7/2009 | Pape et al. |
| 2010/0002224 A1 | 1/2010 | Vincent et al. |
| 2010/0267102 A1 | 10/2010 | Begin et al. |
| 2010/0299097 A1 | 11/2010 | Threlkeld et al. |
| 2011/0040660 A1 | 2/2011 | Allison et al. |
| 2011/0168593 A1 | 7/2011 | Neufeld et al. |
| 2011/0218670 A1 | 9/2011 | Bell et al. |
| 2012/0075071 A1 | 3/2012 | Liu et al. |
| 2014/0273178 A1 | 9/2014 | Lesueur et al. |
| 2014/0278630 A1 | 9/2014 | Gates et al. |
| 2015/0114061 A1 | 4/2015 | Eten et al. |
| 2015/0324760 A1 | 11/2015 | Borowski et al. |
| 2015/0348252 A1 | 12/2015 | Mask |
| 2016/0019497 A1 | 1/2016 | Carvajal |
| 2017/0008671 A1 | 1/2017 | Whitman et al. |
| 2017/0010149 A1 | 1/2017 | Whitman et al. |
| 2017/0011362 A1 | 1/2017 | Whitman et al. |
| 2017/0011363 A1 | 1/2017 | Whitman et al. |
| 2017/0011364 A1 | 1/2017 | Whitman et al. |
| 2017/0200135 A1 | 7/2017 | Whitman et al. |
| 2017/0330207 A1 | 11/2017 | Labrie et al. |
| 2018/0155080 A1 | 6/2018 | Whitman et al. |
| 2019/0112103 A1 | 4/2019 | Whitman et al. |
| 2019/0112104 A1 | 4/2019 | Whitman et al. |
| 2020/0051040 A1 | 2/2020 | Whitman et al. |

FOREIGN PATENT DOCUMENTS

| | | |
|---|---|---|
| EP | 2419384 A4 | 8/2014 |
| WO | 2008049582 A3 | 6/2009 |
| WO | 2010121197 A1 | 10/2010 |
| WO | 2012069839 A1 | 5/2012 |
| WO | 2017007913 A1 | 1/2017 |

OTHER PUBLICATIONS

Cicek, "Membrane Bioreactors in the Treatment of Wastewater Generated from Agricultural Industries and Activities", p. 1-32.
George, "Focus on Anaerobic Digestion", p. 1-4.
PCT/US2016/041300, "Application Serial No. PCT/US2016/041300, International Search Report and Written Opinion dated Sep. 30, 2016", Feed Resource Recovery, Inc., 10 pages.
PCT/US2016/041300, "International Application Serial No. PCT/US2016/041300, International Preliminary Report on Patentability and Written Opinion dated Jan. 18, 2018", Divert, Inc., 8 Pages.
Pye-Smith, et al., "Transporting food", p. 1-5.

(56) References Cited

OTHER PUBLICATIONS

Featsent, "Food Donation a Restaurateur's Guide", National Restaurant Association, Nov. 2007, 50 pages.

\* cited by examiner

| Store | Material (examples) | Category (examples) | Metric/Rank (examples) See note 1 | Category Wt. (%) See note 2 | Material Wt. (%) See note 3 | Peer set rank / score See note 4 | Chain wide rank / score See note 5 | Performance against store See note 6 | Incentive / penalty See note 7 |
|---|---|---|---|---|---|---|---|---|---|
| Store# 1 | Cardboard | | | | % | | | | |
| | | Weight | Pounds | % | | # | # | $ | $ |
| | | Contamination | Y/N | % | | # | # | $ | $ |
| | | Wetness | Percent | % | | # | # | $ | $ |
| | | Collapsed | Rank. 1-3 | % | | # | # | $ | $ |
| Store# 1 | Waxed | | | | % | | | | |
| | | Contamination | | % | | # | # | $ | $ |
| | | Volume | | % | | # | # | $ | $ |
| | | Weight | | % | | # | # | $ | $ |
| | | Collapsed | | % | | # | # | $ | $ |
| Store# 1 | Food waste | | | | % | | | | |
| | | Bin liner | | % | | # | # | $ | $ |
| | | Contamination | | % | | # | # | $ | $ |
| | | Leaking | | % | | # | # | $ | $ |
| | | Tied off | | % | | # | # | $ | $ |
| | | Food donation | | % | | # | # | $ | $ |
| Store# 1 | Plastic | | | | % | | | | |
| | | Volume | | % | | # | # | $ | $ |
| | | Leaking | | % | | # | # | $ | $ |
| Store# 1 | Others | | | | % | | | | |
| | | TBD | | % | | # | # | $ | $ |
| Store# 1 | Total | | | | | # | | $ | |

FIG. 2

RFID ENABLED RECYCLING COLLECTS ESSENTIAL DATA USED TO IMPROVE RECYCLING BEHAVIOR, THEREBY INCREASING RECYCLING RATES AT THE RETAIL LEVEL

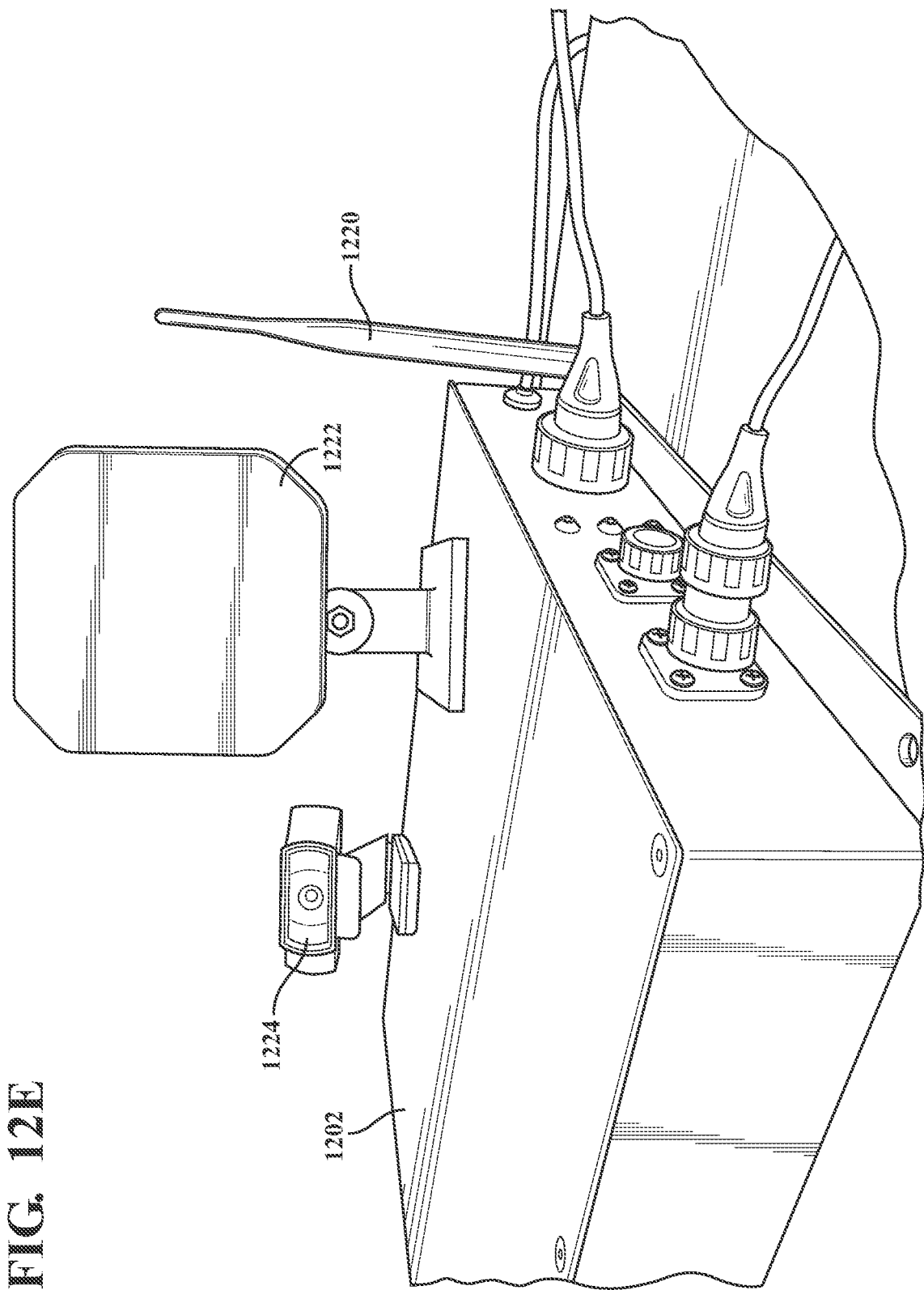

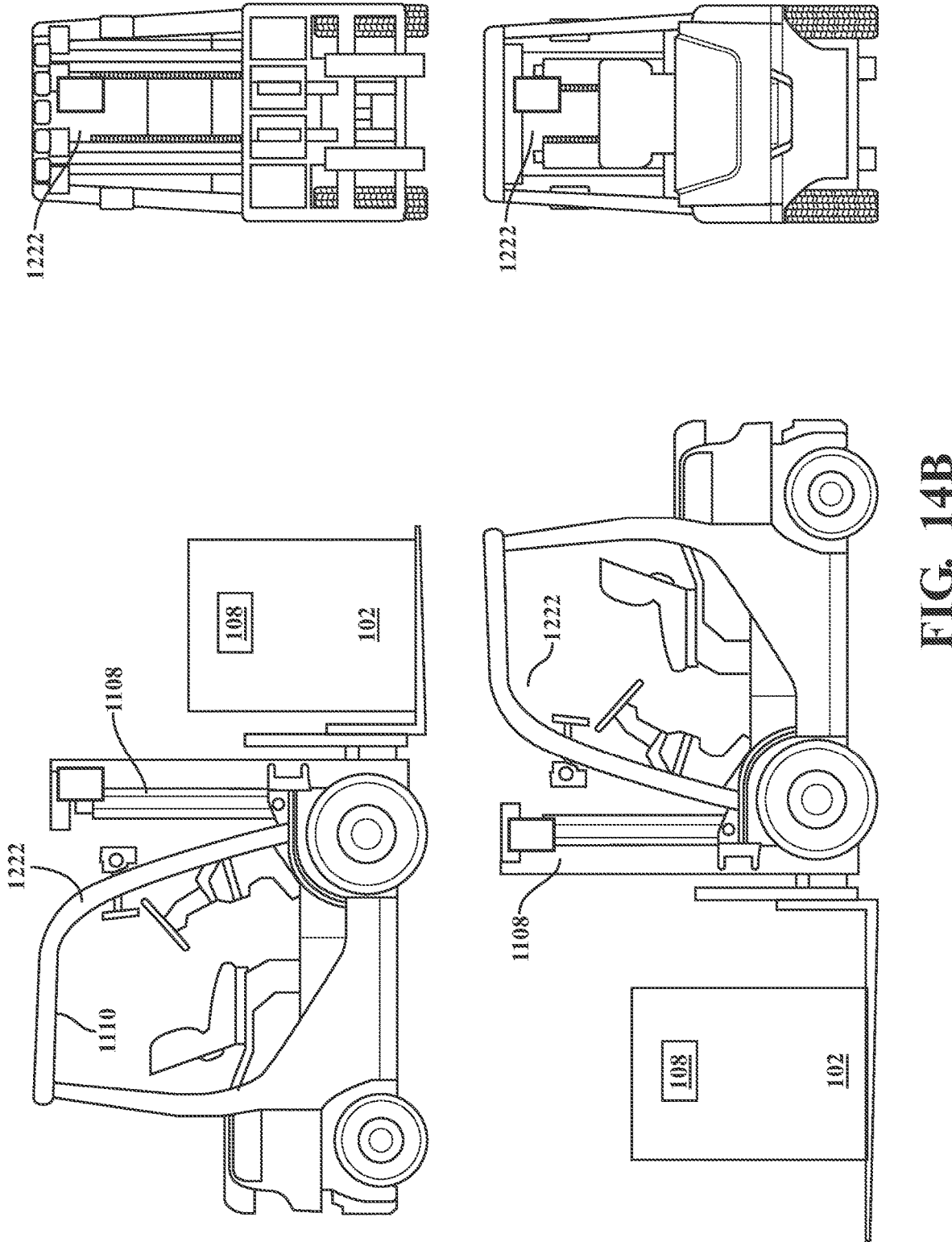

METHOD FOR TRANSPORTING GOODS ON A PALLET REVERSIBLY CONVERTIBLE TO A BIN

CROSS-REFERENCE TO RELATED APPLICATIONS

This application is a continuation of U.S. patent application Ser. No. 15/469,622 (FEED-0005-U02-V01) filed Mar. 27, 2017.

U.S. patent application Ser. No. 15/469,622 (FEED-0005-U02-V01) is a divisional of U.S. patent application Ser. No. 15/204,093 (FEED-0005-U02) filed Jul. 7, 2016, which claims the benefit of U.S. provisional patent application 62/190,055 (FEED-0001-P01), filed Jul. 8, 2015.

Each of the above applications is incorporated herein by reference in its entirety.

BACKGROUND

1. Field

The present disclosure generally relates to computing and information technology systems, devices, and methods for collecting, managing, measuring, and tracking recyclable and waste materials and providing feedback on the material collected for the purposes of billing, compliance assurance, performance assessment, and the like.

2. Description of the Related Art

Many commercial organizations undertake recycling initiatives with associated goals and incentives. However, in the case of large organizations, such as where the material for recycling may be collected from a plurality of stores and locations, with today's limited information technology infrastructure it may be difficult to track how individual stores are performing, individually or relative to one another, with respect to recycling efficiency and goal compliance. A large organization that uses a distribution center for the receipt, temporary storage, and redistribution of goods and materials may be able to obtain measurements made at the distribution center that indicate the total amount of material received in a given period from stores in a chain, but with current systems it can be difficult to identify the relative contribution made by each of the different stores. In such cases, different stores may be allocated equal or proportionate credit for recycling based on the total amount of material, without regard to each individual store's actual contribution. As a result, individual stores may not be rewarded or penalized based on their actual performance, relative to organizational goals of recycling, which may tend to cause individual stores to undertake only minimal efforts and in turn tend to diminish aggregate success. In the absence of the means to adequately track recycling efforts, or in the absence of success of those efforts, some organizations and stores may chose not to implement, or to abandon, a recycling or backhauling program. Such challenges are compounded in situations where waste material takes different forms; for example, grocery organizations may have organic waste of various types, materials that are subject to deposit regulations (like deposit soda and beer bottles), and a variety of packaging materials and containers, such as cardboard boxes, glass containers, plastic containers of various sizes, shapes, and constituent materials. Each different kind of material may be subject to distinct regulations, pricing agreements, and other requirements, such that a need exists to track and manage each different material separately from other materials. However, current systems for tracking such information are inadequate, requiring manual tracking of information by untrained employees and lacking facilities for rapid, efficient collection, integration, and analysis of data of disparate types for large numbers of stores.

In situations where third party providers transport recyclables, organic waste, trash and the like for smaller organizations on the return portion of a delivery trip (referred to herein in some cases as "backhaul"), the difficulties associated with adequately tracking material returned by different stores are magnified, as owners may have no effective mechanism for obtaining information about the nature of the contents of a backhaul trip from the third party.

A need exists for methods and systems that help stores, enterprises, transport service providers and the like adequately track and characterize the material handled in streams of recyclable and waste material.

SUMMARY

In accordance with exemplary and non-limiting embodiments, systems, methods and devices are provided for tracking and managing waste materials, which may include one or more devices enabled to record information (such as from a bar code, label or the like) about the handling of waste material at a point in a distribution chain, as well as information technology systems for collecting, processing, analyzing and otherwise managing information about a large number and variety of streams of waste material, such as from various originating sources.

The present disclosure describes a method, the method according to one disclosed non-limiting embodiment of the present disclosure can include transporting goods on a plurality of pallets, wherein at least one of the plurality of pallets includes a base with side walls and a collapsible sleeve that is contained within the side walls of the base, wherein, if the collapsible sleeve is collapsed and configured to lie flat on the base, the collapsible sleeve provides a surface for the transport of the goods, and, if the collapsible sleeve is open and joined to the base, the collapsible sleeve, with the base, forms a bin; transporting goods on the at least one of the plurality of pallets from a first location to a second location using a transportation trailer; unloading the at least one of the plurality of pallets from the transportation trailer at the second location; upon removal of the goods from the at least one of the plurality of pallets at the second location, forming a bin by opening the collapsible sleeve and attaching the open collapsible sleeve to the base; at the second location, placing waste or recyclable material in the bin; transporting the material in the bin from the second location, using the transportation trailer used to deliver goods; removing the material in the bin; cleaning the bin; collapsing the collapsible sleeve; placing the collapsed collapsible sleeve on the at least one of the plurality of pallets; and loading the at least one of the plurality of pallets with goods for transportation from the first location to the second location.

A further embodiment of any of the foregoing embodiments of the present disclosure further including, after attaching the open collapsible sleeve to the base, inserting a liner into the bin.

A further embodiment of any of the foregoing embodiments of the present disclosure may include situations wherein removing the material in the bin further includes removing the liner from the bin.

A further embodiment of any of the foregoing embodiments of the present disclosure may include situations wherein the first location is a food distribution center and the second location is a food retailer.

A further embodiment of any of the foregoing embodiments of the present disclosure further including: moving the goods on the at least one of the plurality of pallets at the first location or the second location using a forklift or a pallet jack.

A further embodiment of any of the foregoing embodiments of the present disclosure further including moving the material in the bin at the first location or the second location using a forklift or a pallet jack.

A further embodiment of any of the foregoing embodiments of the present disclosure further including securing the collapsible sleeve to the base, wherein securing the collapsible sleeve to the base includes sliding an attachment mechanism on the base through an opening in a bottom of the collapsible sleeve.

A further embodiment of any of the foregoing embodiments of the present disclosure may include situations wherein the bin further includes a cover.

A further embodiment of any of the foregoing embodiments of the present disclosure further including: forming the at least one of the plurality of pallets with the collapsed collapsible sleeve, the cover, and the base.

A further embodiment of any of the foregoing embodiments of the present disclosure may further including: fitting an exterior frame of the cover over a peripheral edge of the bin for transporting material in the bin.

A further embodiment of any of the foregoing embodiments of the present disclosure may further including: tracking a location of the at least one of the plurality of pallets or the bin via an RFID tag, a GPS tracker, or an asset tracker.

A further embodiment of any of the foregoing embodiments of the present disclosure may include situations wherein the sleeve is made of plastic or cardboard material.

A further embodiment of any of the foregoing embodiments of the present disclosure may include situations wherein the collapsible sleeve includes a z-fold and wherein the z-fold is in a folded position if the collapsible sleeve is collapsed.

A further embodiment of any of the foregoing embodiments of the present disclosure may include situations wherein the base and the side walls form a reservoir for capturing any liquid portion of the material in the bin.

A further embodiment of any of the foregoing embodiments of the present disclosure may include situations wherein the collapsible sleeve has an opening to accommodate an attachment mechanism of the base.

The present disclosure describes a system for tracking waste or recyclable material in a transported material stream and providing at least one of billing information, credit information, and reporting information with respect to the material, wherein the system according to one disclosed non-limiting embodiment of the present disclosure may include a label associated with a batch of waste or recyclable material at an originating site, the label including label information and being associated with at least one of the batch of material and a container for the material at the originating site, the label information comprising at least one of identifier information identifying the originating site and information about the material, a label reader at a material handling site that is remote from the originating site and is capable of reading the label information on the label, and a communications facility for communicating to a server the label information read by the label reader, wherein the server uses the label information to report or determine, with respect to the material, specific information about at least one of the type and the amount of the material.

In embodiments, the specific information relates to the amount of the material and at least one of a credit owed and an obligation owed.

In embodiments, information reported by the server further comprises at least one of: an amount of recycled material, a type of the material, an owner of the facility that produced the material, a time of origination of the material, a transporter of the material, a time of transportation of the material, an image of the material, a weight of the material, a temperature of the material, a volume of the material, and a location of handling of the material.

In embodiments, a forklift is configured to handle the material, or a container for the material is configured to be handled by a forklift.

In embodiments, information reported by the server about the material includes information about the transport of the material.

In embodiments, the information about the transport of the material comprises at least one of: a pick-up location, a time of pick-up, a drop-off location, a time of drop-off, a duration of transport, a temperature of the material during transport, a weight of the material, and a weight at a particular time.

In embodiments, the system further comprises an image processing subsystem for acquiring an image of at least one of the material and a container for the material, wherein the image is used in a compliance analysis.

In embodiments, the compliance analysis includes at least one of: a determination of presence or absence of contaminants in the material, such as with the use of an image capture system, a determination of proper or improper container assembly, a determination of proper or improper liner set-up, such as with the use of an image capture system, a determination of whether temperature of the material is within a predetermined range, and a determination of compliance or noncompliance with regulations.

In embodiments, the system further includes an image processing subsystem for acquiring an image of at least one of the material and a container for the material, wherein the server uses the image to determine a nature of the material and associates the nature of the material with information about the origination and handling of the material.

In embodiments, the system further includes a scale to determine a weight of the material.

In embodiments, the same or a different server tracks information with respect to a plurality of batches of material to determine at least one of a net credit and a net obligation with respect to the plurality of batches.

The present disclosure describes a system for tracking material in a transported waste stream and providing information with respect to the material, the method according to one disclosed non-limiting embodiment of the present disclosure can include a label associated with a batch of waste or recyclable material at an originating site, the label including label information and being associated with at least one of the batch of material and a container for the material at the originating site, the label information comprising at least one of identifier information identifying the originating site and information about the material, a label reader at a material handling site that is remote from the originating site and is capable of reading the label information on the label; and a communications facility for communicating to a server the label information read by the label reader, wherein the server uses the label information to determine analytics with respect to the material.

In embodiments, the information with respect to the material includes at least one of a credit owed, an obligation owed, reporting information, destination site, type of material, and classifications.

In embodiments, the analytics include analyzed information of the material including a cost analysis, a time analysis, and an efficiency analysis.

The present disclosure describes a device for transporting waste or recyclable material, the device according to one disclosed non-limiting embodiment of the present disclosure may include a base and a collapsible sleeve movable between an open state and a collapsed state, wherein the collapsible sleeve in the open state interfaces in a nesting manner with the base to form a bin for receiving and transporting waste material.

In embodiments, the collapsible sleeve in the collapsed state and the base are adapted to function as a pallet for transportation of goods.

In embodiments, the base has an interface adapted to allow the device to be lifted by at least one of: a fork lift and a pallet jack.

In embodiments, the base comprises an attachment mechanism to secure the collapsible sleeve in the open state to the base.

In embodiments, the collapsible sleeve comprises at least one of plastic and cardboard material.

In embodiments, the collapsible sleeve is collapsible with a z-fold such that it may be contained within the outer edges of the base.

In embodiments, the collapsed state of the collapsible sleeve allows the base and the collapsed sleeve to be transported together like a standard wooden palette.

In embodiments, the device further comprises a cover, wherein the cover is integral to or separate from the collapsible sleeve and fits on top of the open collapsible sleeve.

In embodiments, the base, the open collapsible sleeve and the cover together are stackable on another similar device.

In embodiments, the collapsible sleeve in the collapsed state fits within the cover.

In embodiments, the collapsible sleeve, when in the collapsed state, and the cover fit within the outer edges of the base for transport.

In embodiments, the collapsible sleeve, when in the collapsed state, the cover, and the base are attachable together for transport.

In embodiments, the cover comprises an exterior frame that fits over a peripheral edge of the open collapsible sleeve and a hinged interior portion.

In embodiments, the base forms a reservoir for containing a liquid portion of the waste material.

In embodiments, the reservoir comprises one or more channels.

In embodiments, the one or more channels comprise a plurality of channels along an exterior edge of the base, each of the plurality of channels having a corresponding lip.

In embodiments, the collapsible sleeve has notches in bottom edges to accommodate the plurality of channels.

In embodiments, the device further comprises a disposable liner adapted to be disposed within the open collapsible sleeve to provide lining for the interior of the bin.

In embodiments, the collapsible sleeve has an opening to accommodate an attachment mechanism of the base.

In embodiments, the collapsible sleeve comprises a location indicator for placement of at least one of an RFID tag, a GPS tracker and an asset tracker.

In embodiments, at least the interior of the collapsible sleeve is coated by a wax coating.

In embodiments, the device further comprises at least one of an RFID tag, a GPS tracker and an asset tracker.

In embodiments, the base and the collapsible sleeve are adapted for repeated use as a bin for transporting waste or recyclable material.

The present disclosure describes a method of a system for tracking waste or recyclable material, wherein the system according to one disclosed non-limiting embodiment of the present disclosure may include an imaging device for capturing an image of at least one of a batch of waste or recyclable material and any bin for the material, wherein the imaging device is located at or on at least one of the originating site, a transport device for the material, and a material handling site that is remote from the originating site, wherein the imaging device is associated with at least one communications facility for communicating with a system that tracks the batch of material, and wherein the image captured by the imaging device is sent with information enabling the captured image to be associated with at least one of a batch of waste or recyclable material and a bin for the material.

In embodiments, a portion of the material is organic material.

In embodiments, the system further comprises a label configured to be associated with the batch of material, wherein the label comprises an identifier including at least one of information identifying the originating site and information about the batch of material and a label reader at a material handling site that is remote from the originating site and is capable of reading the identifier on the label, the label reader associated with a first communications facility for communicating the information read by the label reader to a server, wherein the system that tracks the batch of material in the bin associates the image captured by the imaging device with the label.

In embodiments, the captured image of the material may be processed to identify at least one of: an estimate of the temperature of organic material, a presence of inorganic material, an estimate of the percent of inorganic material, an estimate of the number of inorganic items, an estimate of the type of inorganic items, an estimate of volume of material, an estimate of weight of the material, an estimate of the quality of the material, and an estimate of the age of the organic material.

In embodiments, the imaging device is sensitive to infrared wavelengths.

In embodiments, the captured image may be used to document the quality of material received at the material handling site.

In embodiments, the information about the batch of material includes information about the destination of the material.

In embodiments, the information about the batch of material includes information about the destination of the material.

In embodiments, the information about the batch of material comprises at least one of: a type of the material, a facility that produced the material, a time of origination of the material, a transporter of the material, a time of transportation of the material, a transport duration, an image of the material, a weight of the material, a temperature of the material, a volume of the material, and a location of handling of the material.

In embodiments, the system further includes a liner for the bin, wherein the label is attached to the liner.

In embodiments, the label is attached to the bin.

In embodiments, the bin is configured to be handled by a forklift.

In embodiments, the system further comprises a scale for weighing the bin to determine a weight of the material.

The present disclosure describes a system for tracking a batch of waste or recyclable material, wherein the system according to one disclosed non-limiting embodiment of the present disclosure may include a label reader for reading a label that was associated with the batch of material at the originating site, a device for measuring a parameter indicative of the weight of the batch of material and a communications facility for communicating the weight of the batch of material and the label information to a system for tracking the batch of waste material.

In embodiments, the scale measures the weight of the material by using a transport device that transports the batch of material.

In embodiments, the device for measuring a parameter indicative of the weight of the batch is positioned on a transport device that transports the batch of material.

In embodiments, the parameter indicative of the weight of the item is at least one operating parameter of at least one operating system on the transport device.

In embodiments, the at least one operating parameter is at least one of a pressure associated with a lifting system of the transport device, a load measured in the lifting system of the transport device, a power requirement of a power system of the transport device, and an operating parameter of a motor of the transport device. In embodiments, a weight of a subsequent batch of material is determined by using historical data from a plurality of batches of the same material type as the batch of material to determine a weight for the batch of material, such as by calculating an average weight of batches of the same material from the originating site.

In embodiments, the scale is a drive-through scale that measures the weight of the material by measuring the weight of the material and a transport device that transports the material over the scale and subtracting the weight of the transport device.

In embodiments, the scale is located at a material handling site that is remote from the originating site.

In embodiments, the system further comprises a bin to hold the material.

In embodiments, the system further comprises a liner in the bin.

In embodiments, the label is affixed to the liner.

In embodiments, the bin is configured to be handled by a forklift.

In embodiments, the information about the material includes information about the transport of the material.

In embodiments, the information about the material includes information about the destination of the material.

In embodiments, the information about the material comprises at least one of: a type of the waste material, an owner of the facility that produced the waste material, a time of origination of the waste material, a transporter of the waste material, a time of transportation of the waste material, an image of the waste material, a weight of the waste material, a temperature of the waste material, a volume of the waste material, and a location of handling of the waste material.

In embodiments, the system further comprises a bin to hold the material, and wherein the scale is a drive-through scale that measures the weight of the material by measuring the weight of the material, the bin, and the transport device that transports the material over the scale and subtracting the weight of the bin and the transport device.

The present disclosure describes a system for tracking a batch of waste or recyclable material the method according to one disclosed non-limiting embodiment of the present disclosure can include a label reader for reading a label that was associated with the batch of material at the originating site, a scale for determining the weight of the batch of material, wherein the scale is a drive-through scale that measures the weight of the material by measuring the weight of a transport device loaded with the material and subtracting the weight of the transport device and a communications facility for communicating the weight of the batch of material and the label information to a system for tracking the batch of waste material.

The present disclosure describes a system for tracking organic material in a waste stream, wherein the system according to one disclosed non-limiting embodiment of the present disclosure may include a label associated with a batch of waste material at an originating site, wherein at least a portion of the batch of waste material is organic material and wherein the label comprises label information identifying at least one of the originating site and information about the batch of waste material, a label reader at a waste handling site that is remote from the originating site and is capable of reading the label information on the label, a characterizing device for determining at least one characteristic of the batch of waste material and a communications facility for communicating to a server the label information read by the label reader and the determined at least one characteristic of the batch of waste material, wherein the server uses the label information and the at least one characteristic to provide a user with data about the organic material in the batch of the waste material.

In embodiments, a forklift is configured to handle the batch of material, or a bin for the batch of material is configured to be handled by a forklift.

In embodiments, the characterizing device comprises an image processing subsystem for acquiring an image of at least one of the material and a bin for the material. In embodiments, the acquired image is used for documenting the nature of the batch of waste material or a condition of the bin. In embodiments, the server for the processing facility may associate the information about the nature of the waste material with information about the origination and handling of the bin. In embodiments, a condition of the bin may include a determination as to whether the bin has been properly assembled, whether a liner is in place, or the like, or other compliance determinations.

In embodiments, the system further comprises a device for measuring a parameter indicative of the weight of the waste material.

In embodiments, the information about the batch of the waste material includes information about the transport of the waste material, comprising at least one of: a pick-up location, a time of pick-up, a drop-off location, a time of drop-off, a duration of transport, a temperature of the batch of waste material during transport, a weight of the material, and a weight at a particular time.

In embodiments, the information about the waste material includes information about the destination of the waste material.

In embodiments, the information about the batch of waste material comprises at least one of: a type of the waste material, an owner of the facility that produced the waste material, a time of origination of the waste material, a transporter of the waste material, a time of transportation of the waste material, an image of the waste material, a weight of the waste material, a temperature of the waste material, a volume of the waste material, and a location of handling of the waste material.

The present disclosure describes a system for tracking waste or recyclable material, wherein the system according to one disclosed non-limiting embodiment of the present disclosure may include a label for a batch of material generated at an originating site, the label being associated with at least one of the material and any container for the material at the originating site, the label comprising an identifier including at least one of information identifying the originating site and information about the material, a label reader at a material handling site that is remote from the originating site and is capable of reading the identifier on the label, the label reader associated with a communications facility for communicating information to a server.

In embodiments, the information communicated to the server includes at least one of: a timestamp associated with a label, a type of material, an amount of material, a read rate associated with a label, an absence of a label, data from more than one label, an image of the material and data associated with at least one of signal strength and signal direction associated with each label read.

In embodiments, the server uses at least some of the received information to at least one of: verify that a label was read, determine an absence of a label on the batch of material, disambiguate between the use of the same label for different batches of material, disambiguate between the presence of more than one label on the same material in order to identify the correct label information for a particular shipment of material, disambiguate between material on a forklift and material near the forklift, and disambiguate the association of the label with additional measurements made on the material.

In embodiments, the server uses historical data from a plurality of batches of the same material type to determine a weight for the batch of the material.

In embodiments, the information about the material includes information about the transport of the material.

In embodiments, wherein the information about the material includes information about the destination of the material.

In embodiments, the system further comprises an image processing subsystem for documenting the nature of the material in the container.

In embodiments, the server for the processing facility associates the information about the nature of the material with the information about the origination and handling of the container for the batch of material.

In embodiments, the system further comprises a scale for determining a weight of the material.

In embodiments, the information about the material comprises at least one of: a type of the material, a composition of the material, an owner of the facility that produced the material, a time of origination of the material, a transporter of the material, a time of transportation of the material, an image of the waste material, a weight of the waste material, a temperature of the waste material, a volume of the waste material, and a location of handling of the waste material.

The present disclosure describes a forklift system adapted to collect and report information about items handled by a forklift, wherein the forklift system according to one disclosed non-limiting embodiment of the present disclosure may include: a forklift, an RFID reader with at least one antenna positioned at least one of on and in proximity to the forklift, wherein the at least one antenna of the RFID reader is positioned to read RFID information from at least one RFID tag positioned on an item handled by the forklift, a device for measuring a parameter indicative of the weight of the item handled by the forklift; and a processing facility with a server for associating the information read by the RFID reader and the parameter indicative of the weight of the item.

In embodiments, the server further associates the information from the RFID reader with timestamp information that indicates a time of the handling of the item by the forklift.

In embodiments, the device for measuring the parameter indicative of the weight of the item is at least one of a drive-on scale and a drive-through scale.

In embodiments, the device for measuring the parameter indicative of the weight of the item is positioned on the forklift.

In embodiments, the parameter indicative of the weight of the item is at least one operating parameter of at least one operating system of the forklift.

In embodiments, the at least one operating parameter is at least one of a pressure associated with a lifting system of the forklift, a load measured in the lifting system of the forklift, a power requirement of a power system of the forklift, and an operating parameter of a motor of the forklift.

In embodiments, the forklift system further includes a communications facility of the forklift for communicating the information captured by at least one of the RFID reader and the device for measuring weight to the server.

In embodiments, the forklift system further includes a camera for capturing an image of the item handled by the forklift, wherein at least one of the captured image and information from the captured image is associated with the information captured by the RFID reader.

In embodiments, a communications facility communicates at least one of the captured image and information from the captured image to the server.

Disclosed herein are methods and systems for tracking returned material.

Such methods and systems may include a labeler for attaching an RFID label representative of origination site to each unit of material for return; an RFID reader for reading an RFID label on each unit of material; and a logic and data storage module for associating each unit of returned material with originating site. Such methods and systems may further include a communications module in communication with an analytic server.

Also disclosed herein are methods and systems for tracking returned material. Such methods and systems may include a labeler for attaching a bar code label representative of origination site to each unit of material; a bar code scanner for reading the label on each unit of material; and a logic and data storage module for associating each unit of returned material with originating site. Such methods and systems may further include a communications module in communication with an analytic server.

Also disclosed herein are methods and systems for automatic billing. Such methods and systems may include a labeler to label units of material at an originating site; a reader to read labels at distribution system; a characterization device for characterizing each unit of material; a logic and data storage module for associating each label information from each unit of material with data characteristic of the unit material; and an analytic server to associate material data with originating site and automatically generate on of a bill and a credit for the originating site based on the units of material moved from originating site to distribution center.

In embodiments the characterization device may be one of a scale, a thermal sensor, an imaging device, an odor sensor, and a noise sensor.

Also disclosed herein are methods and systems for awarding credit for recyclable material. Such methods and systems may include a labeler to place labels on units of recyclable materials at an originating site; a reader to read labels at distribution system; a characterization device for characterizing each unit of material; a logic and data storage module for associating label information from each unit of material with data characteristic for each unit material; and a facility for awarding credit to the originating site based on obtained information. In embodiments the recyclable materials are one of cardboard, Styrofoam, corrugated cardboard, plastics, PET plastics, waxed cardboard, glass, plastic film, plastic bags, newspapers, waste paper, Steel and Aluminum cans, foam, scrap metal, shrink wrap, food donation, organics, food waste and trash. In embodiments the label comprises one of an RFID tag, a barcode, a QR code, and an alphanumeric sequence. In embodiments the reader comprises one of RFID reader, a barcode scanner, and an imaging device. In embodiments the characterization device is one of a scale, a thermal sensor, an imaging device, an odor sensor, and a noise sensor.

Also disclosed herein are methods and systems for allocating penalties for recyclable material. Such methods and systems may include a labeler to place labels on units of recyclable materials at an originating site; a reader to read labels at distribution system; a characterization device for characterizing each unit of material; a logic and data storage module for associating label information from each unit of material with data characteristic for each unit material; and a facility for allocating a penalty to the originating site based on obtained information. In embodiments the recyclable materials are one of cardboard, Styrofoam, corrugated cardboard, plastics, PET plastics, waxed cardboard, glass, plastic film, plastic bags, newspapers, waste paper, Steel and Aluminum cans, foam, scrap metal, shrink wrap, food donation, organics, food waste and trash. In embodiments the label comprises one of an RFID tag, a barcode, a QR code, and an alphanumeric sequence. In embodiments the reader comprises one of RFID reader, a barcode scanner, and an imaging device. In embodiments the characterization device is one of a scale, a thermal sensor, an imaging device, an odor sensor, and a noise sensor.

Also disclosed herein are methods and systems for evaluating a store performance. Such methods and systems may include a labeler to place labels on units of recyclable materials at an originating site; a reader to read labels at distribution system; a characterization device for characterizing each unit of material; a logic and data storage module for associating label information from each unit of material with data characteristic for each unit material; and a communications module for transmitting label information and characteristic data to an analytic server, the analytic server enabled to compare performance of one originating site with other originating sites.

Also provided herein are methods and systems for evaluating a store performance. Such methods and systems may include identifying a peer set of stores based one at least one of size, sales, location, pieces moved, division and employee count; automatically tracking returned material using a labeler at each store and a reader at the distribution center; calculating store waste based on at least one of weight of organic materials returned, volume of organic material returned; and calculating store performance relative to stores in peer set of stores.

Also disclosed herein are methods and systems for tracking returned material. Such methods and systems may include a labeler for attaching an RFID tag. Such methods and systems may include information identifying the origination site of each unit of material for return wherein each RFID tag a comprises GPS tracker; an RFID reader at return center for reading an RFID tag on each unit; a logic and data storage module for associating each label information from each unit of material with data characteristic of the unit material; a communication module for transferring label information and GPS data to a analytic server; and an analytic server for tracking returned material from origination site through return center.

Also disclosed herein are methods and systems for documenting store shrinkage of commodity. Such methods and systems may include identifying volume of commodity supplied to store based on store orders calculating volume of commodity sold based on sales receipts; capturing volume of commodity recycled based on information from recycling center; and identifying shrinkage based on difference between supplied commodity and combination of sold and recycled commodity.

Also disclosed herein are methods and systems for monitoring compliance with organic storage regulations. Such methods and systems may include a labeler to label units of organic material at an originating site; a reader to read label at distribution system; an imager for capturing a digital thermal image of the content of the unit of material; and a logic and data storage module for associating label information from each unit of material with captured thermal image data of said unit of material and estimating the temperature of the organic material based on the digital image.

Also disclosed herein are methods and systems for recycling coffee grounds. Such methods and systems may include a container for transporting ground coffee; a labeler for attaching a label to the container at the originating site each label. Such methods and systems may include information identifying the origination site; a forklift adapted to carry the container; a reader for reading the label on the container; a scale for assessing the weight of coffee grounds in the container; and a logic and data storage module for associating information from the label of each container with assessed weight of the coffee grounds in the container.

Also disclosed herein are methods and systems for tracking waste organics. Such methods and systems may include a bin; a bin liner having an embedded RIFD tag identifying the originating site; an RFID reader at a destination site; a characterization device for characterizing each bin of waste organics; a logic and data storage module for associating label information from each bin of waste organics with data characteristic of the bin of waste organics; and a communications module for transmitting label information and characteristic data to an analytic server.

Also disclosed herein are methods and systems for evaluating a store performance. Such methods and systems may include a labeler to place labels on units of recyclable materials at an originating site; a reader to read labels at distribution system; a characterization device for characterizing each unit of recyclable material; a logic and data storage module for associating label information from each unit of material with data characteristic for each unit material; and a communications module for transmitting label information and characteristic data to an analytic server, the analytic server enabled to calculate a store incentive based on at least one of weight, volume and quality of recycle material relative to a defined group of stores.

Also disclosed herein are methods and systems for evaluating a store performance. Such methods and systems may include identifying a peer set of stores based one at least one of size, sales, location, pieces moved, and employee count; automatically tracking returned material using a labeler at each store and a reader at the distribution center; evaluating store recyclable material on at least one of weight of recyclable materials, volume of recyclable material and quality of recyclable material; and calculating a store incentive based on at least one of weight, volume and quality of recycle material relative to a peer set of stores.

Also disclosed herein are methods and systems for recycling. Such methods and systems may include an RFID labeler to place RFID tags on units of materials at an originating site; a RFID reader to read RFID tags at distribution system; a characterization device for characterizing each unit of material; and a logic and data storage module for associating RFID tag information from each unit of material with data characteristic for each unit material.

Also disclosed herein are methods and systems for identifying an RFID tag associated with a unit of return material. Such methods and systems may include reading RFID tags at multiple locations such as at the source location, during transport to a distribution center, at a plurality of locations within a distribution center and locations to which the units of material may be sent beyond the distribution center; identifying RFID tags read each time; identifying whether RFID tags are already associated with data; and selecting RFID tag with strongest signal.

Also disclosed herein are methods and systems for tracking returned material. Such methods and systems may include an RFID labeler to place RFID tags on units of materials at an originating site; an RFID reader to read RFID tags at a distribution system; a drive through scale enabled to communicate measured weight with a logic and data storage module; and a logic and data storage module for associating RFID tag information from each unit of material with measured weight.

Also disclosed herein are methods and systems for tracking returned material. Such methods and systems may include an RFID labeler to place RFID tags on units of materials at an originating site; an RFID reader to read RFID tags at a distribution system; at least one of an image sensor and an audio sensor enabled to capture data about a unit of material and communicate captured data with a logic and data storage module; and a logic and data storage module for associating RFID tag information from each unit of material with captured data.

Also disclosed herein are methods and systems for documenting quality of return material. Such methods and systems may include an RFID labeler to place RFID tags on units of materials at an originating site; an RFID reader to read RFID tags at a distribution system; an imager positioned to capture one or more images of the return material enabled to communicate captured image data to a logic and data storage module; and a logic and data storage module for associating RFID tag information from each unit of material with captured image data.

Also disclosed herein are methods and systems for documenting quality of return material. Such methods and systems may include a labeler to place labels on units of materials at an originating site; a reader to read labels on a unit of material at a distribution system; an imager positioned to capture one or more images of the return material enabled to communicate captured image data to a logic and data storage module; and a logic and data storage module for associating label information from each unit of material with captured image data.

Also disclosed herein are methods and systems for tracking returned cardboard. Such methods and systems may include a baler for baling the cardboard for return. Such methods and systems may include a labeler for applying an RFID tag representative of origination site to each bale as it is baled; an RFID reader at return center for reading RFID tag on each bale of cardboard; a characterization device for obtaining data characteristic of each bale of cardboard; and a logic and data storage module for associating information from the label of each bale of cardboard with data characteristic of the bale of cardboard.

Also disclosed herein are methods and systems for tracking returned material. Such methods and systems may include a labeler for attaching a label representative of origination site to each unit of returned material; a reader at return center for reading a label on each unit of returned material; a logic and data storage module for associating information from the label of each unit of material with a date and location for each unit of recycled return material; a communication module enabled to receive data characteristic of each unit of material transported; a logic and data storage module for associating information from the label of each unit of material with data characteristic of each unit of material; a communications module for transmitting label information and characteristic data to an analytic server; and an analytic server enabled to estimate, in the absence of label information, an origination site based on origination site of units with similar date and location of the unit.

Also disclosed herein are methods and systems for tracking returned plastic containers. Such methods and systems may include a labeler to label units of material at an originating site; a reader to read labels at distribution system; an imager for capturing a digital image of the content of the unit of material; a logic and data storage module for associating label information from each unit of material with captured image data of said unit of material and estimating at least one of a volume, weight, number, quality, and type representative of the plastic containers in the bin based on the digital image.

Also disclosed herein are methods and systems relating to a smart forklift. Such methods and systems may include a smart forklift; and an automatic tracking system disposed on the forklift, for tracking items carried by the forklift. Such methods and systems may include a communication module enabled to receive data characteristic of each unit of material transported; a logic and data storage module for associating information from a label of each unit of material with data characteristic of each unit of material; and a communications module for transmitting label information and characteristic data to an analytic server. Such methods and systems may further include at least one of an RFID reader and a bar code scanner for reading a label on each unit of material transported.

Methods and systems relating to a smart forklift may further include a forklift; a communication module enabled to receive data characteristic of the unit of material being transported; a logic and data storage module for associating, for each unit of material, information from the label and characteristic data; and a communications module for transmitting label information and characteristic data to an analytic server. Such methods and systems may include an RFID reader for reading a label from unit of material being transported and at least one RFID antenna. Such methods and systems may include a scale for weighing the unit of material being transported. In this disclosure, a scale is any device which measures one or more parameters indicative of weight and facilitates a determination or a calculation of weight. In embodiments the scale comprises a pressure gauge to measure with the hydraulic pressure for raising and lowering the unit of material being transported. In embodiments, the scale comprises an electric scale incorporated in the forks of the forklift.

Methods and systems relating to a smart forklift may further include a forklift; an RFID reader for reading a label from unit of material being transported; at least two RFID antennas wherein the antennas have different characteristics; a communication module enabled to receive data characteristic of the unit of material being transported; a logic and data storage module for associating, for each unit of material, information from the label and characteristic data; and a communications module for transmitting label information and characteristic data to an analytic server. Such methods and systems may include a scale for weighing the unit of material being transported. In embodiments the operating characteristics include at least one of operating frequency, location, coverage area, and power.

Methods and systems relating to a smart forklift may further include a forklift; at least one of a built in RFID reader and a build in bar code scanner; an indicator for indicating success or failure of read; an interface for driver to manually enter label ID upon indication of failure; a communication module enabled to receive data characteristic of the unit of material being transported; a logic and data storage module for associating, for each unit of material, information from the label and characteristic data; and a communications module for transmitting label information and characteristic data to an analytic server. Such methods and systems may include a scale for weighing the unit of material being transported.

BRIEF DESCRIPTION OF THE FIGURES

The invention and the following detailed description of certain embodiments thereof may be understood by reference to the following figures:

FIG. 2 illustrates an exemplary system for scoring a store on the basis of weighted material type and criteria.

FIGS. 12A-12E show an enclosure for an exemplary smart forklift system.

FIGS. 14A-14B show optional placement of an RFID antenna on a forklift.

DETAILED DESCRIPTION

High-Level Description of Tracking System

Figure 1A:
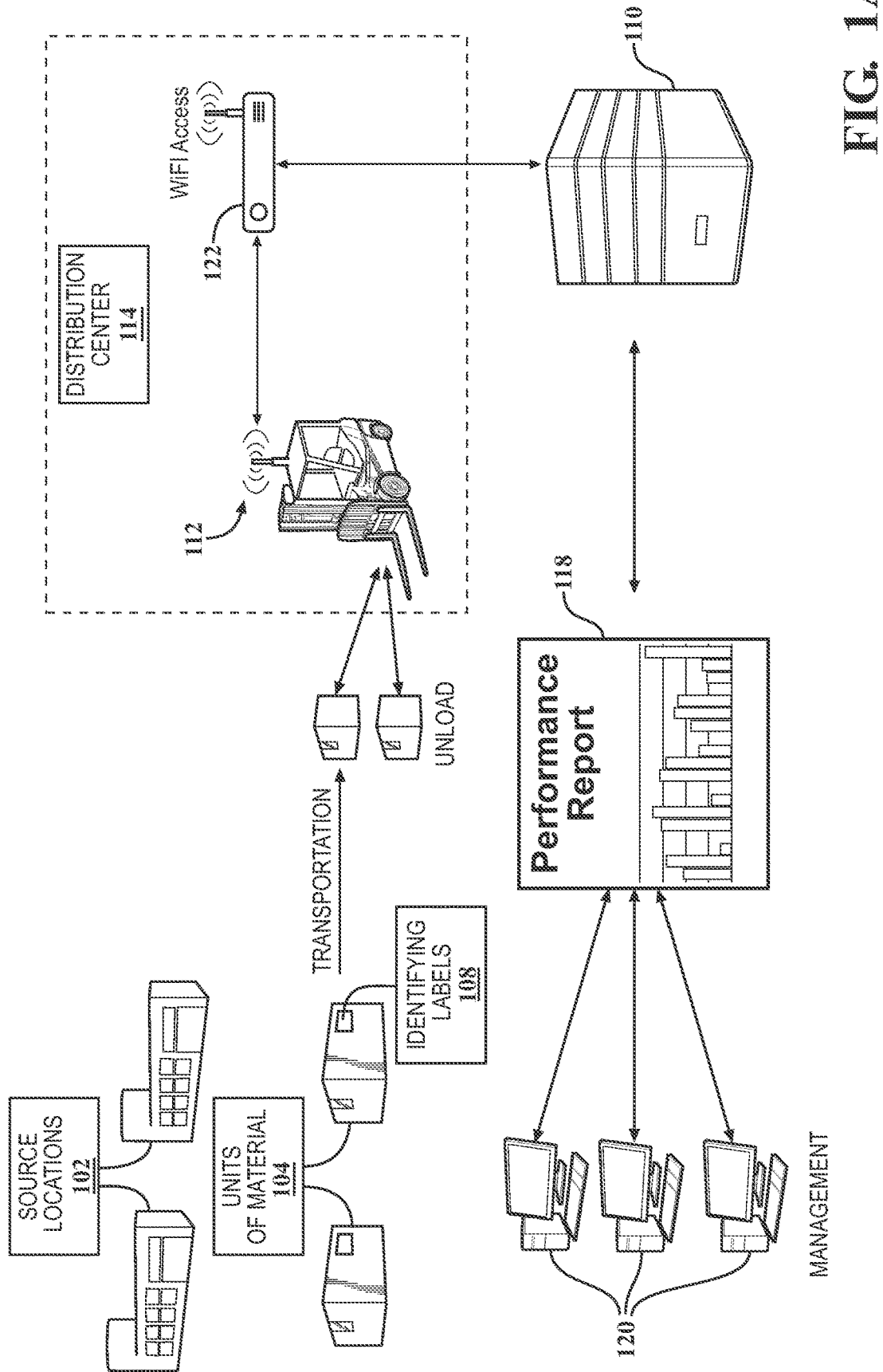
FIG. 1A schematically represents an exemplary system for labeling and tracking material.
Figure 1B:
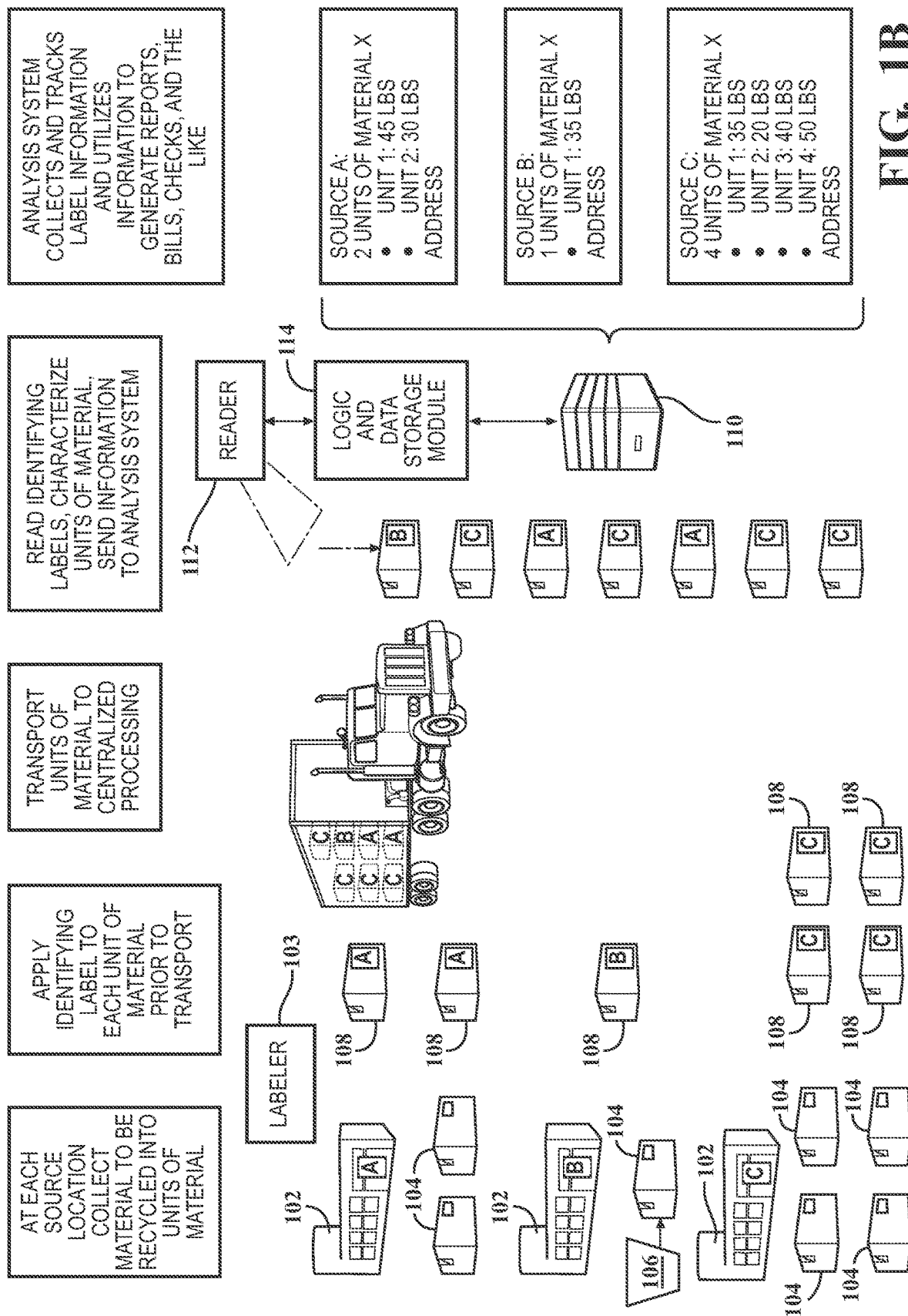
FIG. 1B schematically represents an exemplary system for labeling, tracking and reporting on material through a system.

Referring to FIGS. 1A and 1B, various components, methods and systems for managing and tracking materials from a plurality of source locations are described herein. At each source location 102, quantities of material 104 (also referred to herein as batches or units of material) may be uniquely identified with an identifying label 108, and then enter a transported material stream and be transported to a remote location 114 such as a material handling site, distribution center, recycling center, disposal location, recovery and processing center, and the like. In certain alternative embodiments, an identifying label may be associated with one or more batches of material 104 during transport or upon arrival at one or more remote locations 114. Batches or units of material 104 may be further trans-shipped between remote locations 114. At one or more locations, such as at the source location 102, during shipping, at one or more remote locations 114 and the like, the identifying label 108 on each unit of material 104 may be read by one or more of a plurality of readers 112, and the label information together with information characterizing the units of material 102 may be sent using a communication module 122 to a server or analysis system 110. There the identifying label 108 information together with information characterizing the units of material 102 may be processed to generate a series of reports 118 which may be shared with one or more report recipients 120 such as an individual source location 102 or store, a division manager, a company manager, sustainability managers, other management, shareholders, tax reporting, one or more regulatory agencies, or the like. The reports may include information about one or more of credits or obligations owed or reporting information associated with the material and the transportation of the material.

At each source location 102, there may be a material collection capability 106 that results in quantized batches or units of material 104 such as material collected in a bin, palette, box, cart, bag, shrink-wrapped bundle or the like. As discussed below, homogenous material may also be aggregated together without a container. A labeler 103 may attach an identifying label 108 comprising information regarding the source location 102, type of material, and the like to each unit of material 104 prior to transportation of units of material 104 to a remote location 114 such as a distribution center, recycling center, waste disposal location, recovery and processing center, and the like. In some embodiments the identifying labels 108 may be generated at the source location or provided to the source location for association with the batches of material. The identifying label 108 on each unit of material 104 may be read by a plurality of readers 112 at loading, during transportation, at off-loading, at various spots within the distribution center, at offsite locations, and the like. Additional data, characterizing each unit of material 104, may be captured at loading, during transportation, at off-loading, at various spots within the distribution center, at offsite locations, and the like. In embodiments, the additional data may be captured by entry into a user interface, such as in a mobile device, such as by selecting a type of material from a menu, or the additional data may be captured by an automated system, such as by capturing and analyzing images of the material, using inputs from one or more sensors, or using data from a system, such as an inventory management system that indicates the nature of the item. The additional data for each unit of material 104 may be associated with a unique label ID associated with its specific identifying label 108 and may be sent to an analysis system 110 which may be local, remote, cloud-based, and the like.

The analysis system 110 may process information collected from the identifying labels 108 and additional data characterizing the units of material to calculate, track, analyze, manage and report a variety of information, such as the number of units of material 104 received from a given source location 102 or set of source locations, the types of material received from each source location 102, additional data associated with an individual unit of material 104 or with a plurality of units of material 104 from an individual source location 102, such as cumulative weight and volume of material from a given source location, external data about each source location 102, cost information relating to materials, a type of the material, an owner of the facility or source location that produced the material, a time of origination of the material, information regarding the transport of the material such as a transporter of the material, a time of transportation of the material, a pick-up location, a time of pick-up, a drop-off location, a time of drop-off, a duration of transport, a temperature of the material during transport, and the like, an image of the material, a weight of the material, a temperature of the material, a volume of the material, a location of handling of the material and the like. The analysis system 110 may be used to produce reports, bills, reimbursements, summaries, assessments, guidance and the like for different source locations 102, as well as for collections of source locations 102, and for various groups, divisions and chains, regulatory agencies, and the like.

Source Location

A source location 102 may be one or more of a retail store such as hardware store, consumer electronics store, a grocery store, a convenience store, a restaurant, a coffee shop, or a fast food location, a production facility, such as for production of foods, manufactured goods, and the like, a distribution facility, such as for distributing various goods, a warehousing facility for holding inventory, and the like. While the general term "store" is sometimes used to represent source location hereafter, it is not meant to be limiting. A store may be part of a larger chain or franchise, which provides delivery and backhauling to their different locations, and the term may refer to a production facility, distribution facility, or warehousing facility that is a source of material that requires disposal or recycling, except where context indicates otherwise. A store may refer to a single location and may use a third party service for waste disposal and recycling. A source location may encompass any location where material for disposal or recycling originates or is collected and readied for transport and where an identifying label 108 may be associated with the material.

Material

The material handled by the methods and systems disclosed herein may include recyclable materials, such as cardboard, corrugated cardboard, plastics, PET plastics, Styrofoam, waxed cardboard, glass, plastic film, plastic bags, newspapers, waste paper, tin, steel and aluminum cans, foam, scrap metal, shrink wrap and the like. These recyclable materials may be collected from a plurality of source locations at the distribution center and inserted into appropriate recycling streams. The material may be waste for disposal or non-traditional recycling such as food donation, organic waste, coffee grounds, garbage, and the like. These materials may be sent to a waste stream, incinerated, composted, or the like. Some materials, such as organic food waste, may be turned into food, such as for pigs and other livestock, used for compost, or sent to a landfill or waste disposal site, and the like. Some materials may be used and/or converted into fuel sources (e.g., biofuels or organically produced fuels), used as sources of heat, or otherwise used as energy sources.

In some instances, the material may be collected into homogenous collections or batches of material 104. For some materials, such as cardboard, paper, Styrofoam, cans, bottles, trash, or the like, a material collection capability 106 such as a baler, compactor, crusher, condenser, densifier, or the like may be used to create bales or other units of compressed material where each bale or unit of crushed material represents a unit or batch of material 104. For some materials, such as food donations, organic waste, and the like, the material may be collected in a container. Each container may be a unit of material 104, or a plurality of containers may be palletized or otherwise collected such as in a bin, box, bag, cart, shrink-wrapped bundle or the like with a single pallet, bundle, or collection being treated as a unit of material 104.

Labeling

An identifying label 108 may be associated with each unit of material 104 at the source location 102 where the material is generated or as the units of material 104 are being loaded for transport, such as to a distribution center, disposal site or other remote location. Identifying labels 108 may comprise RFID tags, barcodes, QR codes, symbols, images, alphanumeric strings, and the like. Identifying labels 108 may be applied manually to each unit of material 104 or with a labeler 103. A labeler 103 may be incorporated into a material collection capability 106 designed to collect or compress material into units of material 104. Identifying labels 108 may be embedded into or attached to a collection container designed for use with the system, such as by the labeler 103. Identifying labels 108 may be incorporated into a container liner, such as provided to the source location 102 to be used with one or more type of container. Each identifying label 108 may comprise information such as identification of the system, information about the source location 102 (such as a store number, store district, store division, store chain, and the like), as well as information regarding the type of material, a unique label ID number, and the like.

Readers

Readers 112 for extracting information from the identifying labels 108 may be located in a plurality of locations, such as at the point of origin of the material, at the point of loading the unit of material 104 for transportation to a distribution center, disposal site, or other remote location; inside or attached to a transport vehicle; at the point of unloading the material; within the distribution center, disposal site, or other remote location; attached to a forklift, fork truck, transport line, conveyor system, transport vehicle, or other facility for handling, moving or processing the material; and the like. Readers 112 may comprise RFID readers, barcode scanners, QR scanners, image sensors and associated image processing such as optical character recognition, sensor systems, cameras, receivers, transceivers, and the like. The reader 112 may be in communication with an analysis system 110, such as to provide data for analysis by the analysis system 110. The reader 112 may send the information from each successfully read identifying label 108 as each label is identified. The reader 112 may be associated with a local logic and data storage module, where read data may be accumulated and sent at a predetermined time interval, after a defined number of reads, after the accumulation of a certain amount of data, or the like. At any given location, there may be a plurality of readers 112 of different types to provide the capacity to read a plurality of label types used at different source sites, for different materials, by different parties, or the like. At any given location, there may be a plurality of readers 112 of the same type to provide redundancy and to facilitate system identification of source location(s) and material type(s). There may be readers 112 at a plurality of locations.

Characterization

The methods and systems of this disclosure may include one or more devices for characterizing the units of material 104. For example, the system may include a scale for measuring the weight of each unit of material 104. The term "scale" as used herein refers to any system, method or device for calculating weight or measuring one or more parameters indicative of weight, which may be used to determine or calculate weight. The scale may be in communication with a reader 112, such that the measured weight may be associated with the unique identifying label 108 and therefore with a specific source location 102, material type, batch of material, or the like. The scale may be a drive-through or drive-over scale onto which a transport device such as forklift, hand truck or the like loaded with the material could be maneuvered and weighed with minimal impact on workflow. The weight of the material may then be determined by subtracting the weight of the transport device and, if present, the weight of a container. The scale may be built into a transport device such as a forklift, hand truck or the like such that the measurement of a unit of material 104 occurs as the unit of material 104 is handled by such a device. The measurement may be of a parameter that is indicative of the weight rather than the weight directly. The parameter may be associated with an operating system on the transportation device such as a pressure associated with a lifting system of the transport device, a load measured in the lifting system of the transport device, a power requirement of a power system of the transport device, and an operating parameter of a motor of the transport device. The scale may be built into a baler or compactor at the source location 102 and the information associated with the unique identifying label 108. In some embodiments, a weight may be assigned to a batch of material based on previous historical data of weights associated with that material from the same source location, such as an average weight or median weight of batches of the same material, or another statistical calculation of weight based on historical data. The assigned weight may be an average of previously measured weights of the same material from the source location as indicated by the information on the identifying label 108.

Illustrative Clauses

In some implementations, systems for tracking waste or recyclable material including a scale are described as summarized in the following clauses.

Clause 1. A system for tracking a batch of waste or recyclable material, the system comprising: a label reader for reading a label that was associated with the batch of material at the originating site; a device for measuring a parameter indicative of the weight of the batch of material; and a communications facility for communicating the weight of the batch of material and the label information to a system for tracking the batch of waste material.

Clause 2. The system of clause 1, wherein the scale measures the weight of the material by using a transport device that transports the batch of material.

Clause 3. The system of clause 1, wherein the device for measuring a parameter indicative of the weight of the batch is positioned on a transport device that transports the batch of material.

Clause 4. The system of clause 3, wherein the parameter indicative of the weight of the item is at least one operating parameter of at least one operating system on the transport device.

Clause 5. The system of clause 4, wherein the at least one operating parameter is at least one of a pressure associated with a lifting system of the transport device, a load measured in the lifting system of the transport device, a power requirement of a power system of the transport device, and an operating parameter of a motor of the transport device.

Clause 6. The system of clause 1, wherein a weight of a subsequent batch of material is determined by using historical data from a plurality of batches of the same material type as the batch of material to determine a weight for the batch of material.

Clause 7. The system of clause 1, wherein the scale is a drive-through scale that measures the weight of the material by measuring the weight of the material and a transport device that transports the material over the scale and subtracting the weight of the transport device.

Clause 8. The system of clause 1, wherein the scale is located at a material handling site that is remote from the originating site.

Clause 9. The system of clause 1, further comprising a bin to hold the material.

Clause 10. The system of clause 9, wherein the bin further comprises a liner.

Clause 11. The system of clause 10, wherein the label is affixed to the liner.

Clause 12. The system of clause 9, wherein the bin is configured to be handled by a forklift.

Clause 13. The system of clause 1, wherein the information about the material includes information about the transport of the material.

Clause 14. The system of clause 1, wherein the information about the material includes information about the destination of the material.

Clause 15. The system of clause 1, wherein the information about the material comprises at least one of: a type of the waste material, an owner of the facility that produced the waste material, a time of origination of the waste material, a transporter of the waste material, a time of transportation of the waste material, an image of the waste material, a weight of the waste material, a temperature of the waste material, a volume of the waste material, and a location of handling of the waste material.

Clause 16. The system of clause 1, further comprising a bin to hold the material, and wherein the scale is a drive-through scale that measures the weight of the material by measuring the weight of the material, the bin, and the transport device that transports the material over the scale and subtracting the weight of the bin and the transport device.

Clause 17. A system for tracking a batch of waste or recyclable material, the system comprising: a label reader for reading a label that was associated with the batch of material at the originating site; a scale for determining the weight of the batch of material, wherein the scale is a drive-through scale that measures the weight of the material by measuring the weight of a transport device loaded with the material and subtracting the weight of the transport device; and a communications facility for communicating the weight of the batch of material and the label information to a system for tracking the batch of waste material.

The system may include an imaging device, such as a camera or image sensor, for capturing one or more images of a unit of material 104, such as to assist in characterizing the unit of material 104. The imaging device is located at or on at least one of the originating site, a transport device for the material, and a material handling site that is remote from the originating site. The imaging device may be sensitive at various wavelengths to capture different types of information about the unit of material 104. For example, a thermal imaging device may provide information about the nature and/or age of organic material, or about the presence of mixed organics and non-organics, based on the likelihood that organic materials will tend to have a different profile of emitted energy relative to non-organic based materials. The imaging device may also be sensitive in the visible light range, such as to capture and document images indicating the nature and the quality of the units of material 104 being sent through the system. The images captured by the imaging system may be analyzed to estimate: a type of material, the temperature of organic material, the age of organic material, the presence of inorganic material, a percentage of inorganic material present, a number of inorganic items, an estimate of the type of inorganic items, a volume of material, a weight of the material, a quality of the material, a presence of contamination, a number of containers within a single batch of material 104, and the like. These images may also be used to for compliance analysis such as determining the presence or absence of certain contaminants in the material (for example organics and inorganics), how a container or bin was assembled, the use of a liner whether its use complied with a protocol, determination regarding whether the temperature of the material was within a predetermined range, and other compliance issues. There may be one or more imaging devices with different sensitivities at various points throughout the system. The imaging device may inspect one or more units of material 104 by emitting energy and reading the return energy, such as by using ultrasound, reflected light, or similar approaches. One or more imaging devices may be in communication with a reader 112 such that the one or more captured images may be associated with a particular identifying label 108 and therefore with a specific source location 102, material type, unit of material 104, or the like. Other systems for characterizing a unit of material 104 may include one or more microscopes (including optical and electron microscopes), imaging devices (including computed tomography, magnetic resonance imaging, optical imaging devices, laser-based imaging devices, and other imaging devices, as well as devices using other mechanisms for inspection, such as sonograms, radio-based inspection, X-Rays, microwave-based inspection, or the like.

Illustrative Clauses

In some implementations, systems for tracking waste or recyclable material including one or more of an imaging device and organic material are described as summarized in the following clauses.

Clause 1. A system for tracking waste or recyclable material, the system comprising: an imaging device for capturing an image of at least one of a batch of waste or recyclable material and a bin for the material, wherein the imaging device is located at or on at least one of the originating site, a transport device for the material, and a material handling site that is remote from the originating site, wherein the imaging device is associated with at least one communications facility for communicating with a system that tracks the batch of material in the bin, and wherein the image captured by the imaging device is sent with information enabling the captured image to be associated with at least one of a batch of waste or recyclable material and a bin for the material.

Clause 2. The system of clause 1, wherein a portion of the material is organic material.

Clause 3. A system of clause 1, further comprising: a label configured to be associated with the batch of material, wherein the label comprises an identifier including at least one of information identifying the originating site and information about the batch of material; and a label reader at a material handling site that is remote from the originating site and is capable of reading the identifier on the label, the label reader associated with a first communications facility for communicating the information read by the label reader to a server, wherein the system that tracks the batch of material in the bin associates the image captured by the imaging device with the label.

Clause 4. The system of clause 1, wherein the captured image of the material may be processed to identify at least one of: an estimate of the temperature of organic material, a presence of inorganic material, an estimate of the percent of inorganic material, an estimate of the number of inorganic items, an estimate of the type of inorganic items, an estimate of volume of material, an estimate of weight of the material, an estimate of the quality of the material, and an estimate of the age of the organic material.

Clause 5. The system of clause 1, wherein the imaging device is sensitive to infrared wavelengths.

Clause 6. The system of clause 1, wherein the captured image may be used to document the quality of material received at the material handling site.

Clause 7. The system of clause 2, wherein the information about the batch of material includes information about the destination of the material.

Clause 8. The system of clause 2, wherein the information about the batch of material comprises at least one of: a type of the material, a facility that produced the material, a time of origination of the material, a transporter of the material, a time of transportation of the material, a transport duration, an image of the material, a weight of the material, a temperature of the material, a volume of the material, and a location of handling of the material.

Clause 9. The system of clause 1, further including a liner for the bin, wherein the label is attached to the liner.

Clause 10. The system of clause 1, wherein the label is attached to the bin.

Clause 11. The system of clause 1, wherein the bin is configured to be handled by a forklift.

Clause 12. The system of clause 1, further comprising a scale for weighing the bin to determine a weight of the material.

Clause 13. A system for tracking organic material in a waste stream, the system comprising: a label associated with a batch of waste material at an originating site, wherein at least a portion of the batch of waste material is organic material and wherein the label comprises label information identifying a least one of the originating site and information about the batch of waste material; a label reader at a waste handling site that is remote from the originating site and is capable of reading the label information on the label; a characterizing device for determining at least one characteristic of the batch of waste material and a communications facility for communicating to a server the label information read by the label reader and the determined at least one characteristic of the batch of waste material, wherein the server uses the label information and the at least one characteristic to provide a user with data about the organic material in the batch of the waste material.

Clause 14. The system of clause 13, wherein a bin for the batch of waste material is configured to be handled by a forklift.

Clause 15. The system of clause 13, wherein a forklift is configured to handle the batch of material.

Clause 16. The system of clause 13, wherein the characterizing device comprises an image processing subsystem for acquiring an image of at least one of the material and a bin for the material.

Clause 17. The system of clause 13, further comprising a device for measuring a parameter indicative of the weight of the waste material.

Clause 18. The system of clause 13, wherein the information about the batch of the waste material includes information about the transport of the waste material, comprising at least one of: a pick-up location, a time of pick-up, a drop-off location, a time of drop-off, a duration of transport, a temperature of the batch of waste material during transport, a weight of the material, and a weight at a particular time.

Clause 19. The system of clause 13, wherein the information about the waste material includes information about a destination of the waste material.

Clause 20. The system of clause 16, wherein the acquired image is used for documenting the nature of the batch of waste material or the condition of the bin.

Clause 21. The system of clause 20, wherein the server for the processing facility associates the information about the nature of the waste material with information about the origination and handling of the bin.

Clause 22. The system of clause 13, wherein the information about the batch of waste material comprises at least one of: a type of the waste material, an owner of the facility that produced the waste material, a time of origination of the waste material, a transporter of the waste material, a time of transportation of the waste material, an image of the waste material, a weight of the waste material, a temperature of the waste material, a volume of the waste material, and a location of handling of the waste material.

The methods and systems disclosed herein may include devices for measuring temperature, weight, density, humidity, odors, the presence of certain chemicals (including volatile chemicals), the presence of particulates, the presence of organic material, the presence of biological organisms, and the like. The methods and systems disclosed herein may analyze noise profiles; for example, if a forklift makes a certain noise or in a certain part of a plant, the system can use the noise profile to know where in the plant a measurement was taken that had the noise profile in the background. The methods and systems disclosed herein may include image processing techniques to be used to identify material for food donation, quantify the types of material being disposed of (such as packaged or non-packaged), identify recyclables that are not in compliance with regulations regarding liners, containment, contamination, age of material and the like, identify materials associated with different departments, and the like. These devices may be in communication with one or more readers 112, such that the measured information may be associated with a particular identifying label 108 ID and therefore with a specific source location 102, material type, unit of material 104, or the like.

The different measurement devices may also be in communication with a local logic and data storage module, an analysis system 110, or the like. These systems may be located on-site, off-site, in the cloud, or the like. Communication of data from the label reader, scale, imaging system(s), or other material characterization systems may occur using as a communication module 122 one of a wired connection (e.g., an LAN, WAN, Ethernet or Internet connection, such as via an access point, switch or router), a wireless, remote connections such as radio transmission, infrared communications, short range wireless communications system (such as wireless USB, Bluetooth, IEEE 802.11, WiFi and others) or long range wireless communications systems such as 2G, 3G, 4G, LTE and other cellular communications technologies.

Synthesis and Application of Data

An analysis system 110 may collect and track a wide variety of data for each unit of material 104 submitted by each source location 102 or store. The methods and systems of this disclosure may track the number of units of material 104 submitted, the distribution among types of material, the weights and/or volumes of different units of material submitted, images of the units of material submitted, thermal measurements for each unit of material, noise measurements, and other characteristics measured with respect to each unit of material 104. The analysis system 110 may analyze the collected data on the basis of individual stores, various groupings of stores, all stores in a particular chain, a regional or national average, and the like. Comparisons may be made between individual stores, between an individual store and the average performance of a group of stores, between average performance of different groups of stores, between a store and all stores of a particular chain, between a store and a national average, and the like. Comparisons may be based on geography, sales volumes, store format, manager characteristics and the like. The results of the analysis may be a series of reports 118 which may be shared with one or more report recipients 120 such as an individual source location 102 or store, a division manager, a company manager, sustainability managers, other management, shareholders, tax reporting, one or more regulatory agencies, or the like.

Illustrative Clauses

In some implementations, systems for tracking waste or recyclable material and providing at least one of billing information, credit information and reporting information are described as summarized in the following clauses and illustrated in FIG. 1.

Clause 1. A system for tracking waste or recyclable material in a transported material stream and providing at least one of billing information, credit information, and reporting information with respect to the material, the system comprising: a label associated with a batch of waste or recyclable material at an originating site, the label including label information and being associated with at least one of the batch of material and a container for the material at the originating site, the label information comprising at least one of identifier information identifying the originating site and information about the material; a label reader at a material handling site that is remote from the originating site and is capable of reading the label information on the label; and a communications facility for communicating to a server the label information read by the label reader, wherein the server uses the label information to report or determine, with respect to the material, specific information about at least one of the type and the amount of the material.

Clause 2. The system of clause 1, wherein the specific information is about the amount of the material and relates to at least one of a credit owed and an obligation owed.

Clause 3. The system of clause 1, wherein information reported by the server further comprises at least one of: an amount of recycled material, a type of the material, an owner of the facility that produced the material, a time of origination of the material, a transporter of the material, a time of transportation of the material, an image of the material, a weight of the material, a temperature of the material, a volume of the material, and a location of handling of the material.

Clause 4. The system of clause 1, wherein a container for the material is configured to be handled by a forklift.

Clause 5. The system of clause 1, wherein a forklift is configured to handle the material.

Clause 6. The system of clause 1, wherein information reported by the server about the material includes information about the transport of the material.

Clause 7. The system of clause 6, wherein the information about the transport of the material comprises at least one of: a pick-up location, a time of pick-up, a drop-off location, a time of drop-off, a duration of transport, a temperature of the material during transport, a weight of the material, and a weight at a particular time.

Clause 8. The system of clause 1, further comprising an image processing subsystem for acquiring an image of at least one of the material and a container for the material, wherein the image is used in a compliance analysis.

Clause 9. The system of clause 8, wherein the compliance analysis includes at least one of: a determination of presence or absence of contaminants in the material, a determination of proper or improper container assembly, a determination of proper or improper liner set-up, a determination of whether temperature of the material is within a predetermined range, and a determination of compliance or noncompliance with regulations.

Clause 10. The system of clause 1, further comprising an image processing subsystem for acquiring an image of at least one of the material and a container for the material, wherein the server uses the image to determine a nature of the material and associates the nature of the material with information about the origination and handling of the material.

Clause 11. The system of clause 1, further comprising a scale to determine a weight of the material.

Clause 12. The system of clause 1, wherein the same or a different server tracks information with respect to a plurality of batches of material to determine at least one of a net credit and a net obligation with respect to the plurality of batches.

Clause 13. A system for tracking material in a transported waste stream and providing information with respect to the material, the system comprising: a label associated with a batch of waste or recyclable material at an originating site, the label including label information and being associated with at least one of the batch of material and a container for the material at the originating site, the label information comprising at least one of identifier information identifying the originating site and information about the material; a label reader at a material handling site that is remote from the originating site and is capable of reading the label information on the label; and a communications facility for communicating to a server the label information read by the label reader, wherein the server uses the label information to determine analytics with respect to the material.

Clause 14. The system of clause 13, wherein the information with respect to the material includes at least one of a credit owed, an obligation owed, reporting information, destination site, type of material, and classifications.

Clause 15. The system of clause 13, wherein analytics include analyzed information of the material including cost analysis, time analysis, and efficiency analysis.

As shown in FIG. 2, the data for each material type 202 may be evaluated with respect to one or more criteria 204, where each criterion 204 may have an independent criterion weighting 206. Additionally, different material types 202 may have independent material weighting 208. The resulting weighted scores for the different material criteria 204 and material types 202 may be used in producing individual store scores, peer set rankings 210, district rankings 212, performance evaluations and scoring, and the like. The rankings may be produced for individual material types 202 and criteria 204 as well as an overall ranking 214.

The material characteristics data collected by the system may be combined with other data, such as the data on the label (e.g., information about the chain, division, district, store ID, material type and the like) as well as additional background information such as relating to the different source locations, such as store location, type of location (e.g., urban, suburban, rural), store format (e.g. small footprint, corner store, big box), quality of roads used to reach a location, sales volumes for a store (possibly including both total volumes and volumes for various departments within the store), store manager, chain, brand name, and the like. This data may be summarized in a dashboard and may be shared with other systems, such as financial systems, accounting systems, regulatory compliance systems, planning systems, and the like.

A large chain of stores may have its own distribution center, such that any savings accrued from recycling, improved efficiencies and the like contributes to overall reduction in operating costs for the chain. These large chains may utilize the data obtained to evaluate store compliance with different initiatives, such as recycling goals and waste reduction targets. Evaluation may be used to determine the allocation of funds from recycling of material or other savings back to the contributing store(s), to determine allocation of incentives, and the like. This may be done on the basis of material contribution, ranking within a peer set as to particular objectives and the like. This distribution may result, for example, in a low-ranked store receiving reduced credit or no credit. In illustrative examples, the overall top ranked store in a peer set may receive 20% of the profits, the next two stores may receive 10%, and the like. In some instances, compliance with very specific criteria, or with a weighted combination of criteria, may result in receipt of benefits relating to certain initiatives, such as 5% for compliance with unit preparation procedures comprising proper use of a liner, the absence of leaking, and the like or with penalties associated with non-compliance.

Analytics to Improve Store Performance

Analysis of data regarding amounts of recycled and waste materials, types of material, the quality of recycled and waste materials, performance on store initiatives (e.g. the use of liners), and the like may be used to assess the absolute and relative performance of individual stores. The data gathered by the methods and systems of this disclosure may be combined with external databases that may store and handle information about different locations, such as store size, store volume, store location, store turnover, volume and types of goods and materials shipped to a location, volume of material donated, number of employees, experience of the manager, and the like. Two or more stores may be grouped into a peer set on the basis of this information. In some instances a chain or district may indicate peer stores for a given location. A store may be placed in multiple peer groups based on different criteria for the purposes of different analyses.

Figure 3A:
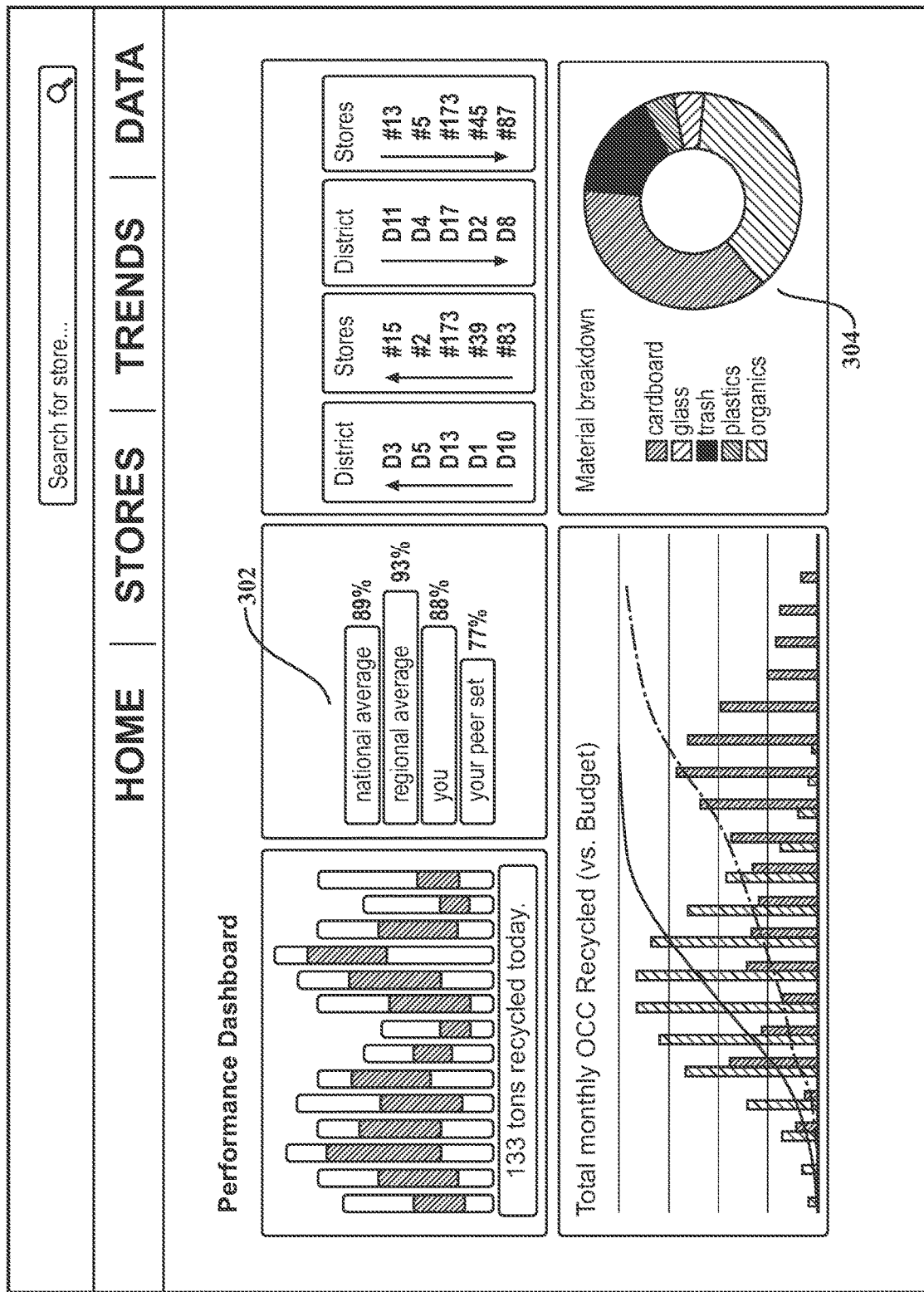
FIGS. 3A-3B represent a sample material report for a single store.
Figure 3B:
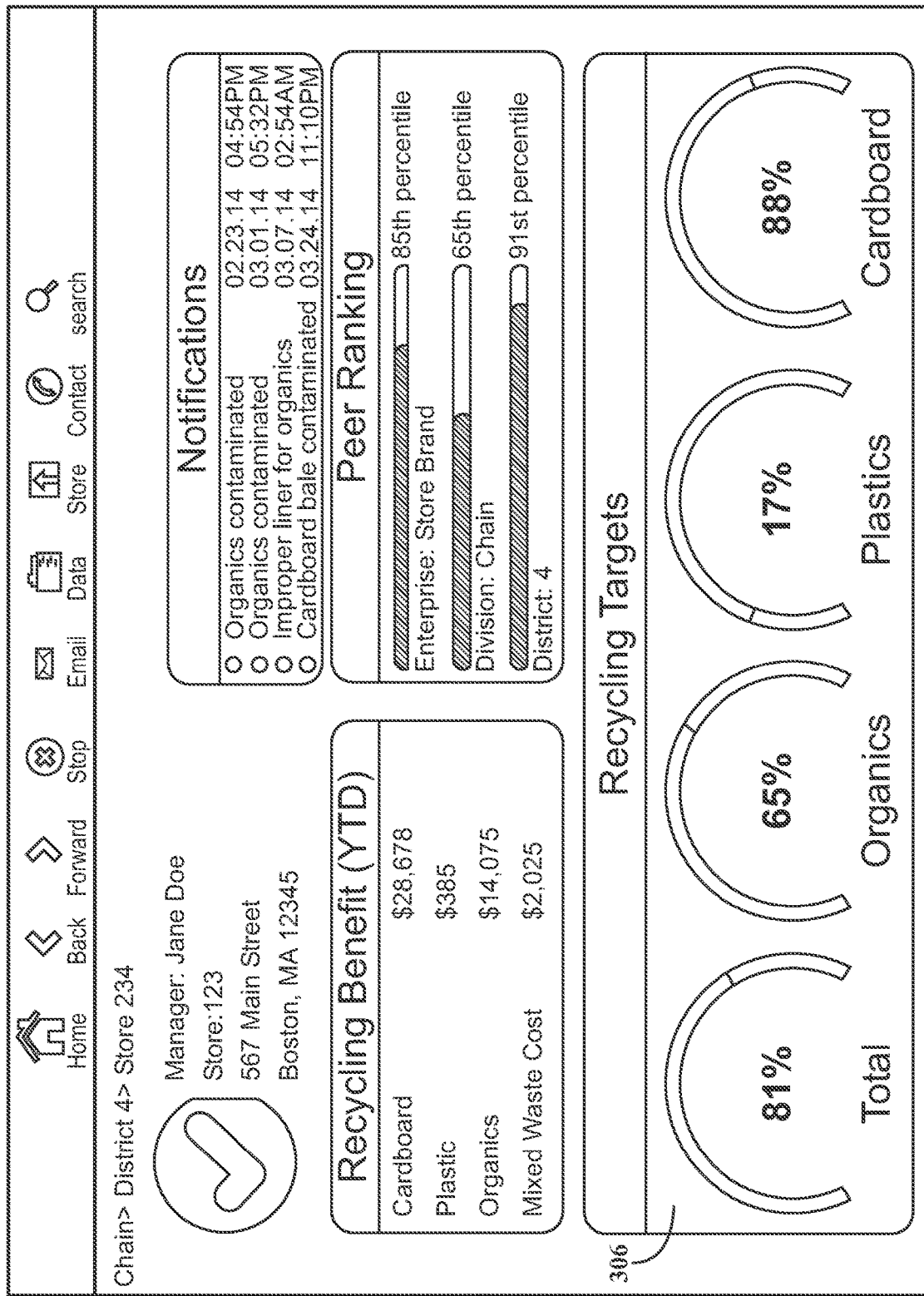

The system may provide information and analytics regarding the relative performance of an individual source location 102 relative to that of a peer group, organization or the like on the basis of data gathered by the system (FIGS. 3A-3B). Stores may receive reports on individual performance, as well as on the performance of the stores' peer set(s), such as with respect to metrics such as volume of material recycled, types of material recycled, percentage of materials recycled 302, tax benefits, money saved by recycling, money generated by recycling, cost analysis, time analysis, efficiency analysis and the like. Reports may include information on average performance by the members of a store's peer set as well as best and worst in class performance. Reports may include performance relative to target performance 306. In an illustrative example, an organization may reward stores on the basis of their participation in waste and recycling programs. Stores may receive an extra incentive or penalty based on their performance relative to other stores in the same peer group. Store management may be evaluated in part on the basis of store performance relative to peer group.

Figure 4A:
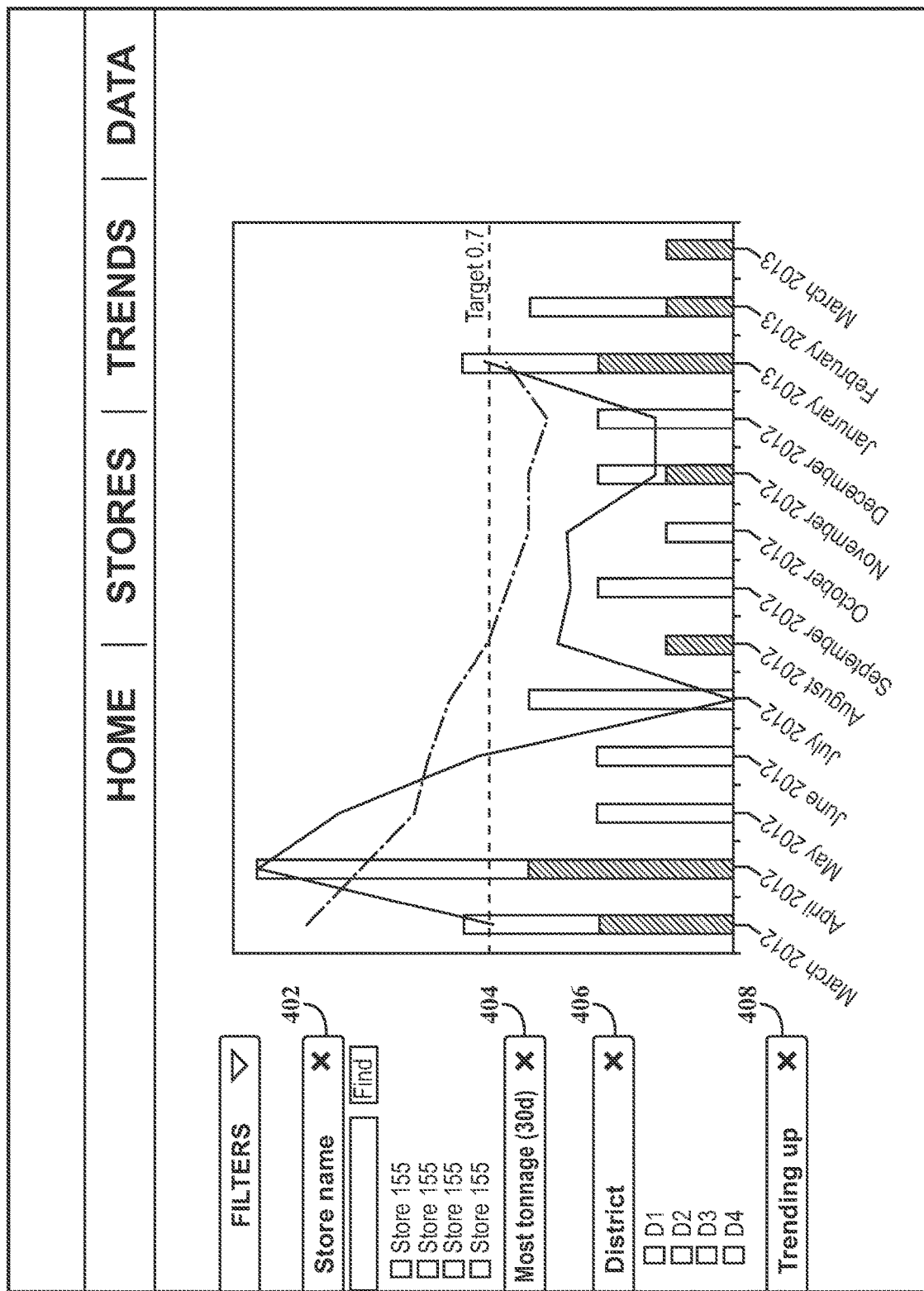
FIGS. 4A-4B represent sample screens for comparing multiple locations.
Figure 4B:
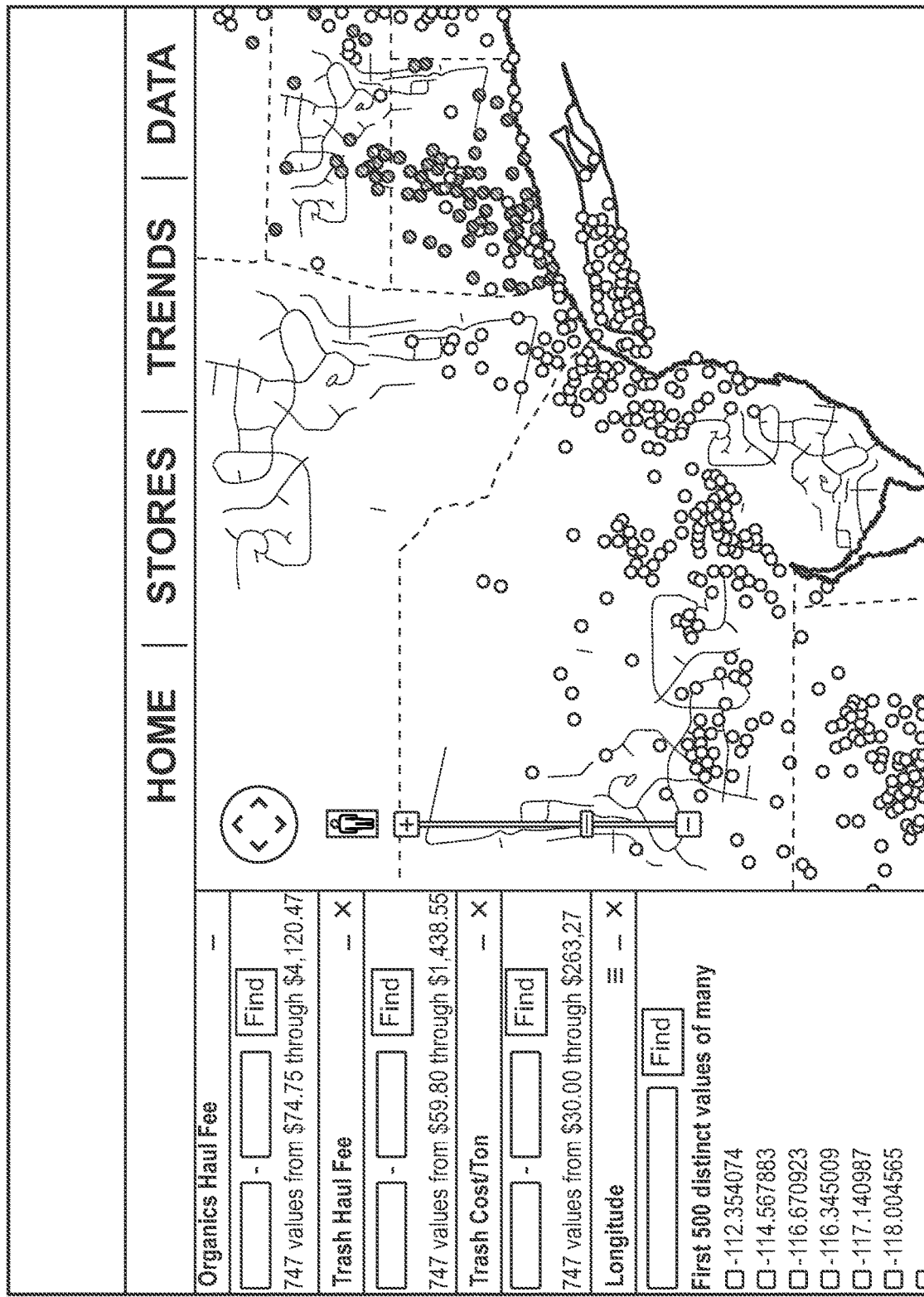

Collected data may be accrued over time, trends identified, and a variety of information, comparisons, trends, suggestions, and the like, may be provided to individual source locations, district, division and chain managers, governmental agencies and the like. FIG. 3B shows a sample dashboard displaying recycling statistics for a given store, including data such as total tons recycled that day, a breakdown of the types of material, recycling performance for the month compared to plan, performance relative to national and regional averages, as well as a comparison to a peer set. FIG. 3A shows trends in performance also seen with a summary of districts and stores whose rankings are changing for the better and for the worse. For example, performance over the past 12 months, or over the past 3 months may be plotted together with performance of peer group average and best performer. Data from current and previous report cards may be shown with trending data, days in category, and the like Managers may be provided with tools and dashboards (FIGS. 4A-4B) to filter data based on various criteria such as store IDs 402, district 406, overall tonnage 404, stores trending in a particular direction 408, highest waste cost, best recycling, largest volume, and the like. In embodiments, this data may be shown as a coded overlay on other data. In an illustrative example, FIG. 4B shows stores, color-coded by cost, overlaid on a map.

In embodiments, the methods and systems of this disclosure may serve as a basis to measure participation in an incentive plan. In an illustrative example, an organization with a plurality of locations may have each source location 102 attach a label to each unit of material 104, identifying the unit of material 104 with one or more of a store ID, a material ID, a location ID and the like. The unit of material 104 may then be transported to a centralized location, such as a distribution center, and the amount of material associated with each source location 102 may be measured or otherwise characterized, using the identifying labels 108 to associate the measured or otherwise characterized material with a source location 102. The information about a material may include a count of the number of units of material 104, a volume of material, a weight of material, a density of material, a count of units of material making up the unit of material 104, a type of material, and the like. In this way, the information about the material, such as the amount of material, may be allocated to each source location 102 on the basis of the identifying label 108 associated with each unit of material 104. In embodiments, stores or source locations 102 may be compared relative to one another on the simple basis of overall amount of material provided, each source location 102 may be compared relative to an average performance, to a performance of a cohort of similar store locations, to a target performance, to the store's past performance, to requirements of governmental regulations, and the like.

Figure 5:
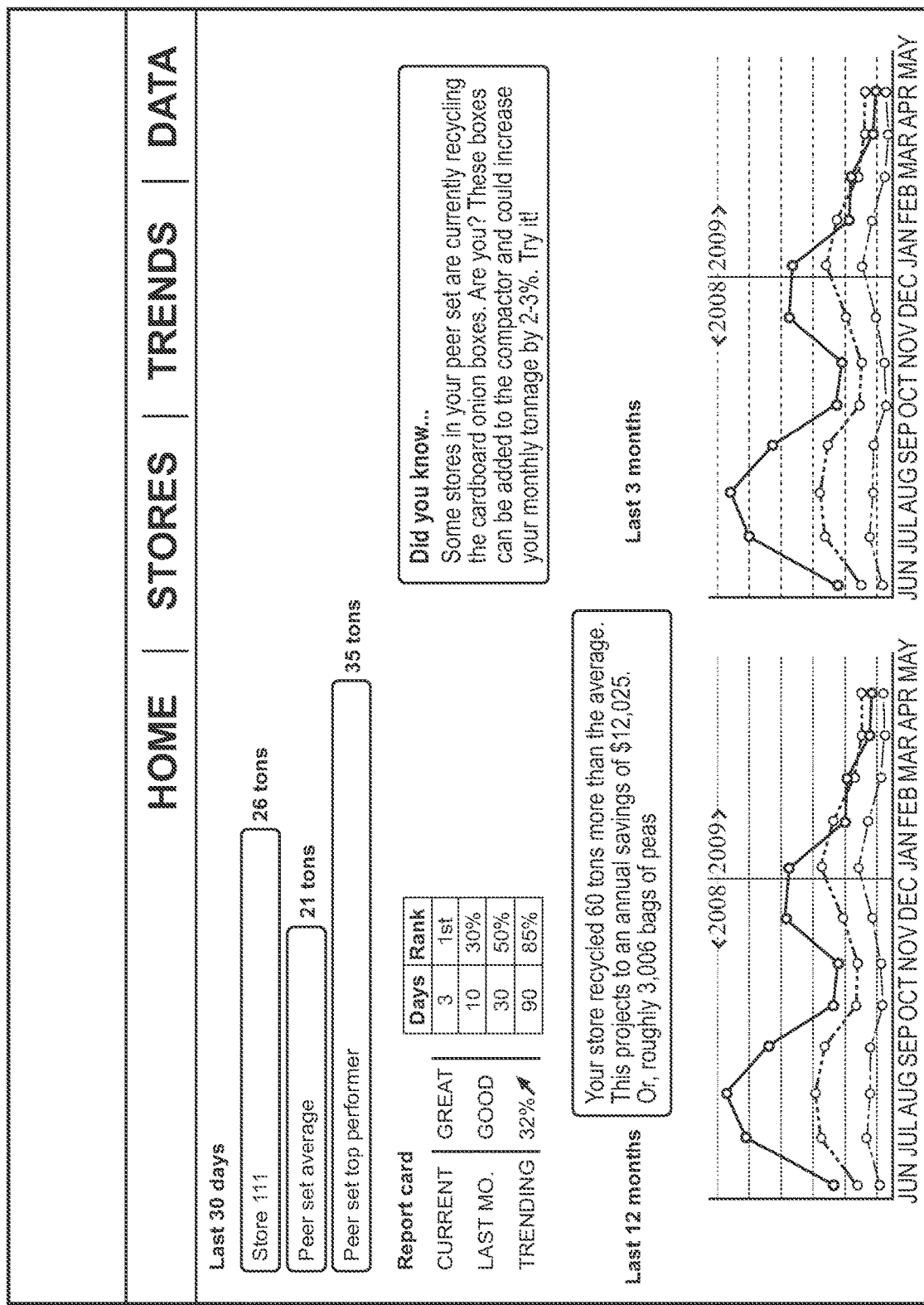
FIG. 5 illustrates sample material reports and recommendations for a single store.

In addition to being provided with performance information and data, a source location may also receive tips and ideas to improve performance in those areas where the store is performing below a target, below a peer group or the like. The data obtained may be used to improve the performance of individual stores and their employees, such as by providing suggestions of areas on which to focus, providing specific information (e.g. data, pictures and graphs) regarding performance gaps, providing general guidelines for improved compliance with initiatives, providing targeted training and the like. In an illustrative example shown in FIG. 5, a store may be provided with one or more suggestions to improve its performance, such as recycling certain types of containers to increase the store's recycling volume. If overall performance is below that of peers on a number of different criteria, the methods and systems disclosed herein may provide guidance on ways to improve overall performance, such as tips to increase employee compliance with a recycling initiative, additional instructions on how to prepare materials of different types, or collateral material such as stickers and labels to display at the source location to motivate associates. In some instances best in class performers and their tactics may be highlighted.

Incentive Systems

The information shown in the sample dashboard and similar information may be used in a variety of ways. In an illustrative example, a chain may provide incentives for stores relative to goals, such as relating to total recycling, improved recycling performance, performance against the store's peers and the like. The data provided by this system allows a chain to evaluate the performance of individual locations rather than simply an overall performance level for a given division or district.

Third Party Suppliers

Smaller businesses typically hire a third party distribution services provider for delivery of goods. In the future these third party distribution services providers may provide backhauling of recyclables as well. A third party distribution service provider typically services multiple locations, multiple stores, and multiple chains with a single distribution center. A third party distribution service provider may utilize the methods and systems of this disclosure to facilitate contracts based on analytics of materials handled, rather than charging a flat fee. For example, the third party distribution service provider may charge a customer on the basis of total weight or volume transported, negotiate a profit sharing of proceeds from recycling in exchange for reduced transport rates, and the like. The capability of detailed tracking of the quantity and quality of materials back to source location may allow the third party distribution service provider to track and enforce quality requirements, such as relating to contamination, proper packaging and the like with the specific customer. When the transport and distribution/recycling center is run by a third party supporting a plurality of business and source locations, the detailed information may be used to provide detailed tracking to support contracts tax credits, verification of regulatory compliance and for providing detailed billing and credit reports.

Analytics as Basis for Contractual Terms

In embodiments, the system of this disclosure may be part of an automatic billing system in which a client may be automatically billed or credited based on the amount and type of material that the client's store(s) have sent into the system. A client may represent a single source location 102 such as an individual restaurant or store, a store district, a store division, a store chain, or the like.

A transporter may transport a plurality of materials such as cardboard, styrofoam, plastics, organics, food donations and other materials to be recycled. In some instances the transporter may pay a small fee to obtain the recyclable material. In some instances, the transporter may remove the recyclable material and then share a portion of the proceeds from the recycling activity with the source location, such as on the basis of the amount of material provided by the various source locations.

A transporter may transport waste materials, such as organic waste, coffee grounds, refuse, and the like. The transporter may bill the source location on the basis of the volume of material collected at a given location, on the basis of volume in excess of a fixed amount, contamination and the like. In some instances, a transporter may transport both recyclable material and waste materials. The credit for the recyclable materials and the charges for the waste materials may be accrued together into a net credit or charge for the source location. In some cases, if a source location does not prepare the waste appropriately, a transporter may impose a fee, which may be taken against the credit for recycled material, thus avoiding the need to charge a source location for fee reimbursement.

The client may receive a portion of the value of recyclable material that it has collected for recycling while being charged for an amount of waste that they have submitted to the system. In an illustrative example, a store may have an agreement with a transporter to pay for the amount of material back hauled on the basis of weight transported during a given billing period. A label may be attached to each unit of material 104 to be hauled at the source location 102. Each unit of material 104 may be loaded onto transport, such as truck, which may stop at a plurality of locations during a single run. Upon arrival at a distribution center where the material is to be unloaded, a reader located near a dock may identify and record each identifying label 108 as a unit of material 104 is unloaded from the transport. As each unit of material 104 is moved through the facility, each unit of material 104 may be weighed. Each scale may have an associated reader 112 such that the measured weight may be associated with the unique ID of the identifying label 108 attached to the unit of material 104 being weighed. A reader 112 may be associated with one or more measuring devices. The reader 112 may be in communication with the measuring devices such as a scale, imaging device and the like. Information regarding the unit of material may be transferred from one or more of a reader 112, a measuring device, and the like to an analytic system. One or more of the scale and the reader 112 may provide information regarding the weight associated with each label ID to an automatically billing system. The analytic system may then correlate the weight of material associated with each unique ID from the identifying labels 108. This information may be used in conjunction with other information from the identifying labels 108, business rules, tax rules, contractual information, and the like to identify a client to be billed or credited for the units of material 104 processed. The client to be billed may be an individual store, a larger parent company associated with a plurality of stores and the like.

Credits and Penalties for Recycled Materials

Figure 6:
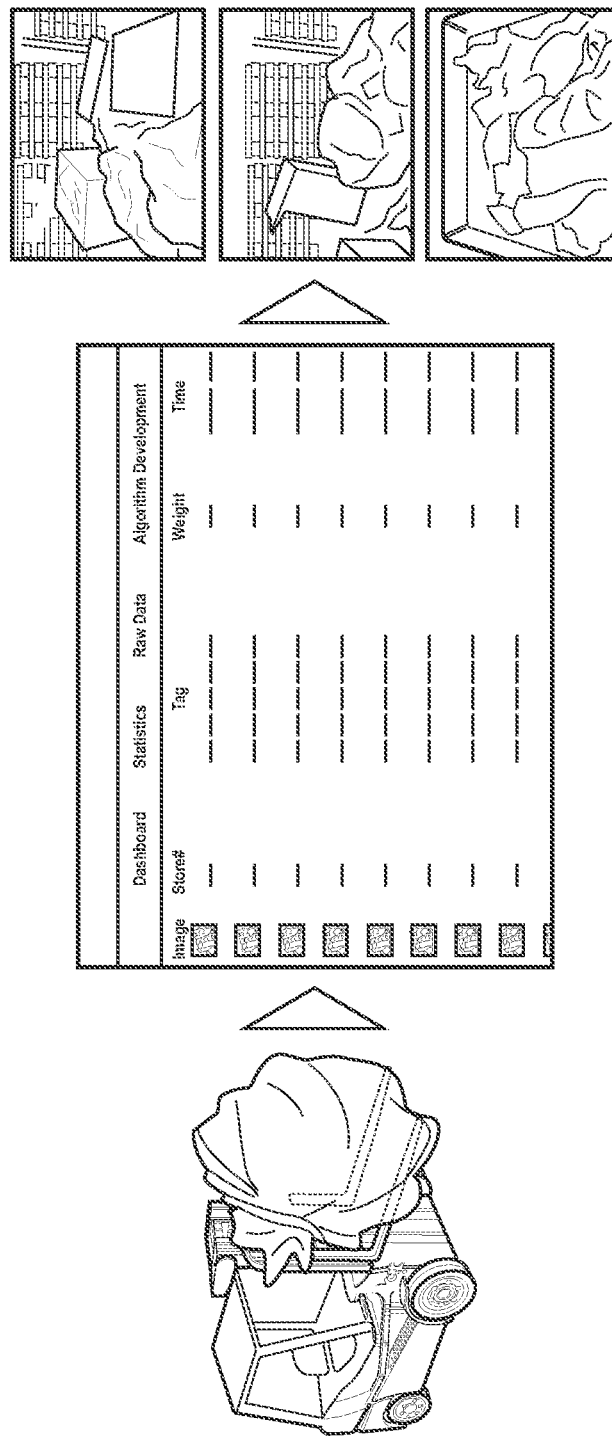
FIG. 6 represents a sample report documenting contamination of material received from different locations.

In embodiments, the system may provide reimbursement or allocate credit to source locations 102 based on quantity and quality of recycled units of material 104 provided by the source location. FIG. 6 shows an example where the characteristic data collected by the system includes images of the units of material associated with a particular source location. Examples of contaminated materials, material not conforming to specified packaging and the like may be flagged and documented, and the store may not receive recycling credit for those materials. In instances where the distribution center receives both recycle material for credit and waste material for a fee; the accrued credit may be docked for poor packaging, regulation violations etc. related to the waste material.

Routing Logistics of Pickup

Information on the overall volume and weight of material generated as well as information on trends, such as increased waste or recycling volume at the end of the month, during the summer season, local holding capacity, regulations, delivery schedules, and the like may be used to optimize routing and logistics of pick up from a plurality of locations. For example, locations that are not visited regularly with deliveries may have material collected on return trips from delivery and pickup at other locations. In addition to picking up material when making deliveries, pickups may be scheduled based on a particular frequency, such as based on analysis of the previous waste generation and recycling rates and volumes initiated by the location, and the like. The frequency of pickup may vary over time as there are changes in the volume and weight of material that is picked up. Routes may be varied to optimize efficiency, cost, response time to pickup requests, frequency rates, and the like.

Reporting for Compliance

In some locations there are regulations regarding recycling, such as mandatory recycling of specific materials, landfill bans on certain materials and types of materials, and the like. Similarly, there are regulations in certain regions banning disposal of commercial organic waste by businesses or restrictions on institutions that dispose of large amounts of materials such as one ton or more of these materials per week. There may be regulations regarding food donation such as favoring food donation over waste disposal. The data provided by the methods and systems of this disclosure may be used to meet legal reporting requirements with reports of compliance with the different regulations, to document food donations for tax credits, sustainability reporting, and the like.

System Implementation Details

Label Logistics: Duplicate, Redundant or Erroneous Labels

In some instances, there may be multiple identification labels 108 applied to a single unit of material 104. This may be done mistakenly at the source location or may occur over time, such as when a container for transporting waste is reused. In some instances, a label may be missing or unreadable. In all of these situations, it may still be important that the unit of material be allocated to the appropriate source location and that credits or charges be generated as appropriate.

For multiple labels, historic label data may be used to identify previously used labels. In some cases, a single label may be selected and the other ignored based on a set of rules. In some cases, details of a missing or unreadable label may be inferred, such as based on the identification details from labels on nearby units of material. Alternately, the details may be inferred from the location of the material within the distribution system or the location on the dock. In some cases, the identification information from the missing or unreadable labels may be inferred based on an analysis of historic patterns, scheduled pickups, and the like.

In some instances, there may be an alert to indicate the failure of the reader to locate or read an identifying label on a unit of material. There may be a device to facilitate manual entry of information regarding the unit of material if the reader fails to automatically read an identifying label. In some instances, data about the unit of material may be inferred on the basis of additional characteristics or measurements of the unit of material such as weight of a unit of material, visual properties, thermal properties and the like.

RFID Label Logistics

In some embodiments, certain technology components may be used for the identifying labels and reader. For example, in embodiments, an antenna for reading an RFID label may be located in one or more locations, such as on a forklift, fork truck, hand cart, palette mover and the like, on or near drive through scales or other measuring equipment, throughout a distribution, recycling or disposal center, and the like.

The Federal Communications Commission (FCC) regulates the amount of power an antenna may emit. For readers 112 located within a distribution center or in proximity to a measurement device, the selection of antenna type may be dependent on the particular geometry of the location of the antenna relative to the anticipated location(s) of the units of material. A directional antenna aligned to focus a cone of available energy on the location where the identifying label 108 is anticipated may be desirable where the likely location of the units of material 104 is known; otherwise, an omnidirectional antenna, where the energy is distributed evenly over a sphere, may be preferred. The particular geometry of antenna location relative to anticipated location of the units of material and RFID labels together with cost of individual labels may be considerations in selecting a particular frequency band for the system. In embodiments, an UHF RFID system may be used due to the large read range, approximately 12 meters, and relatively low cost per label.

A number of label characteristics may be considered when selecting a label type for a particular system, environment, material type to be labeled and the like, as described in the following illustrative examples. For systems where the intent is to avoid any impact on existing workflow, and where the units of material 104 may arrive in any orientation, a "3D" label, which can be read irrespective of label orientation relative to antenna, may be a preferable despite higher costs per label. For systems where the units of material will have a consistent orientation, it may be feasible to use lower cost "2D" labels, even though the labels may need to be oriented relatively parallel to the antenna to be read. In another example, labels, RFID and others, may be made of various materials or films, which may vary in price and environmental stability, with some material selections resulting in labels that are unreadable after exposure to the temperature and humidity outside their tolerance. For a system where units of material 104 may be stored outside at one or more points in the flow of materials it may be important to select a water resistant film for the label to help ensure readability.

RFID tags typically work by absorbing and reflecting energy emitted from an antenna in a unique pattern. Slight discrepancies in the tags' respective reflective patterns allow the RFID reader to discern one tag from another. Therefore, when these tags are placed against a highly reflective material, such as water or metal, some or all of the energy from the reader may be reflected, and the RFID reader may have trouble discerning the subtle changes in reflection of the tags' designed reflective pattern(s). This is particularly a concern for organic waste, such as food waste, which is composed primarily of water, a highly reflective material. The antenna frequency, tag position on the recyclable, label material and the like may be selected based in part on optimizing the readability of a tag against the background of the material being labeled. In an illustrative example, for labels to be placed in units of organic material, a material designed to absorb the energy emitted from the antenna may be placed between the RFID tag and the organic material.

Label Logistics: Multiple Labels & Identifying Appropriate Label

The methods and systems of this disclosure are envisioned to be capable of operating in distribution centers where there may be a plurality of units of material 104 in close proximity. Given these conditions certain safeguards may be put in place to help assure that, when a plurality of RFID labels are read, the correct label is associated with the correct unit of material. When using certain combinations of RFID antennas and operating frequencies, a plurality of RFID labels may be identified for each read. For the system to be effective, the correct label may be identified and associated with a specific unit of material and its various characteristics.

In an illustrative and non-limiting example, the methods and systems of this disclosure may include one or more of various features that aid in readability of the tags and discrimination between read information in order to associate a tag's information with the appropriate unit of material. For example, these goals may be achieved in part by selecting a suitable antenna waveform, such as one with reduced side lobes, in order to focus a field of view of the reader onto the fork tines of a forklift on which a unit of material is loaded. An amplitude of the antenna may be tuned to focus its read distance to materials on the fork tines of the forklift, while providing sufficient energy to overcome possible attenuation due to material incompatibility such as wet metal or the like. Readings may be scheduled to occur only when weight on the fork tines is detected, such as measured by a pressure transducer, or when a determined weight is within a predetermined range. Sequential RFID tags may be utilized which have unique serial numbers to distinguish between third party tags, tags read multiple times, or the addition of multiple labels to a single material load. Images from a camera on-board a forklift may be used to capture data on the material handled by the forklift. Image capture may be triggered by weight, time, fork position, or other occurrence that may provide targeted data capture. Image processing may then be utilized, in combination with other data, to determine if a unit of material is received without a proper RFID label or label placement.

As mentioned, the label reader may be enabled to scan for tags periodically when there is a unit of material at a designed location, such as on a forklift on which a reader is installed. The read rate (the number of times label is read per second) for each label may be negatively correlated with the distance of the label from the antenna, such that a label that is in close proximity to the antenna may have a read rate of 8 or higher while a label placed on a unit of material 10 feet away from the antenna may have a read rate of 4. Typically the label with the highest read rate, and therefore in the closest proximity, is the label that is on a unit of material that is on the fork truck. There may also be a method to measuring the signal strength returned by the tag to discern the proximity to the reader. The label reader may scan periodically for the entire time that a unit of material is on the fork truck. This assures that neighboring units of material with labels in close proximity to one another are not confused. The initial read rate would be similar for the two labels in proximity, but the read rate of the label on the stationary unit of material will gradually decrease as another bale or unit of material 104 changes position. There may be a timing element associated with reading where rather than continuously reading the label, the label reader may read at less frequent intervals, at times defined relative to other events (e.g. read 10 seconds after picking up a unit of material), after a predefined sequence of events (e.g. read after picking up a unit of material and transporting the material 15 feet), at a particular location such as one identified by noise, GPS coordinates, and the like, or at other parameter triggered points.

Illustrative Clauses

In some implementations, there may be a system for tracking waste or recyclable materials as described in the following clauses:

Clause 1. A system for tracking waste or recyclable material, the system comprising: a label for a batch of material generated at an originating site, the label being associated with at least one of the material and any container for the material at the originating site, the label comprising an identifier including at least one of information identifying the originating site and information about the material; a label reader at a material handling site that is remote from the originating site and is capable of reading the identifier on the label, the label reader associated with a communications facility for communicating information to a server.

Clause 2. The system of clause 1, wherein the information communicated to the server includes at least one of: a timestamp associated with a label, a type of material, an amount of material, a read rate associated with a label, an absence of a label, data from more than one label, an image of the material and data associated with at least one of signal strength and signal direction associated with each label read.

Clause 3. The system of clause 1, wherein the server uses at least some of the received information to at least one of: verify that a label was read, determine an absence of a label on the batch of material, disambiguate between the use of the same label for different batches of material, disambiguate between the presence of more than one label on the same material in order to identify the correct label information for a particular shipment of material, disambiguate between material on a forklift and material near the forklift, and disambiguate the association of the label with additional measurements made on the material.

Clause 4. The system of clause 3, wherein the server uses historical data from a plurality of batches of the same material type as the batch of material to determine a weight for the batch of the material.

Clause 5. The system of clause 1, wherein the information about the material includes information about the transport of the material.

Clause 6. The system of clause 1, wherein the information about the material includes information about the destination of the material.

Clause 7. The system of clause 1, further comprising an image processing subsystem for documenting the nature of the material in the container.

Clause 8. The system of clause 7, wherein the server for the processing facility associates the information about the nature of the material with the information about the origination and handling of the container for the batch of material.

Clause 9. The system of clause 1, further comprising a scale for determining a weight of the material.

Clause 10. The system of clause 1, wherein the information about the material comprises at least one of: a type of the material, a composition of the material, an owner of the facility that produced the material, a time of origination of the material, a transporter of the material, a time of transportation of the material, an image of the waste material, a weight of the waste material, a temperature of the waste material, a volume of the waste material, and a location of handling of the waste material.

Recycling Organics and Handling Materials not Recycled Today (Waste)

While recycling of certain materials such as cardboard and plastic is well known, the recycling of organic material on a large scale is relatively new. It is being driven by regulatory initiatives, sustainability goals, economics, and the like. Organics may be diverted to composting facilities, animal agriculture facilities, energy facilities, landfills, and the like. However, each may have certain quality requirements, such as requirements relating to contamination levels of non-organic materials, age of materials, level of biodecay, volatile organic compound VOC) emissions and the like. Additionally, a transporter or a distribution center may have certain requirements regarding moisture and odor containment, and the like, for organic waste.

It may be desirable to assess compliance by a source location 102 with various regulations. Images using one or more radiation bands may be captured for each unit of material 104 as it enters the system. Depending on the type of image captured, the image may be evaluated for contamination. Evaluation may be done manually, or through use of various image-processing techniques. Images may be taken using different wavelengths of radiation such as infrared, UV and the like, where organic and inorganic material will be imaged quite differently. Source locations may be provided feedback with respect to units not meeting contamination standards and may be provided instruction on improving quality. Source locations may be charged a fee or a reduction of credit with respect to units of material that fail to comply with quality regulations. FIG. 6 shows a dashboard with images of contaminated organic waste units to provide supporting evidence of contamination as well as to enhance understanding of violations such as by highlight, marking or otherwise drawing attention to the contamination. Additionally, thermal imaging of a unit of material may provide information on the age of the contents of the unit of material as the organic material may increase in temperature (and corresponding brightness) with the age of the material and the extent of decomposition.

Figure 7A:
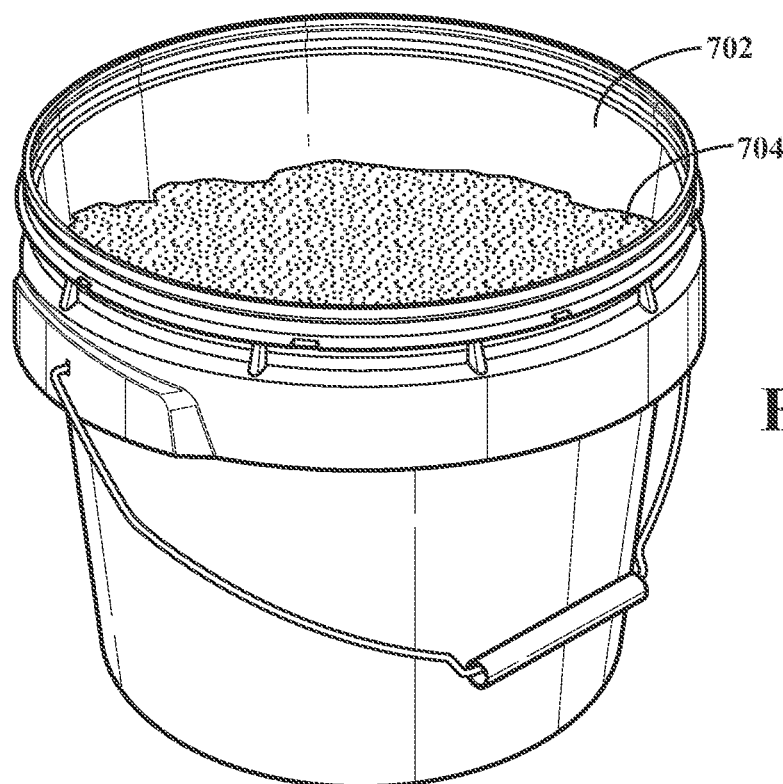
FIGS. 7A-7B show an example of reusing a container to transport coffee grounds.
Figure 7B:
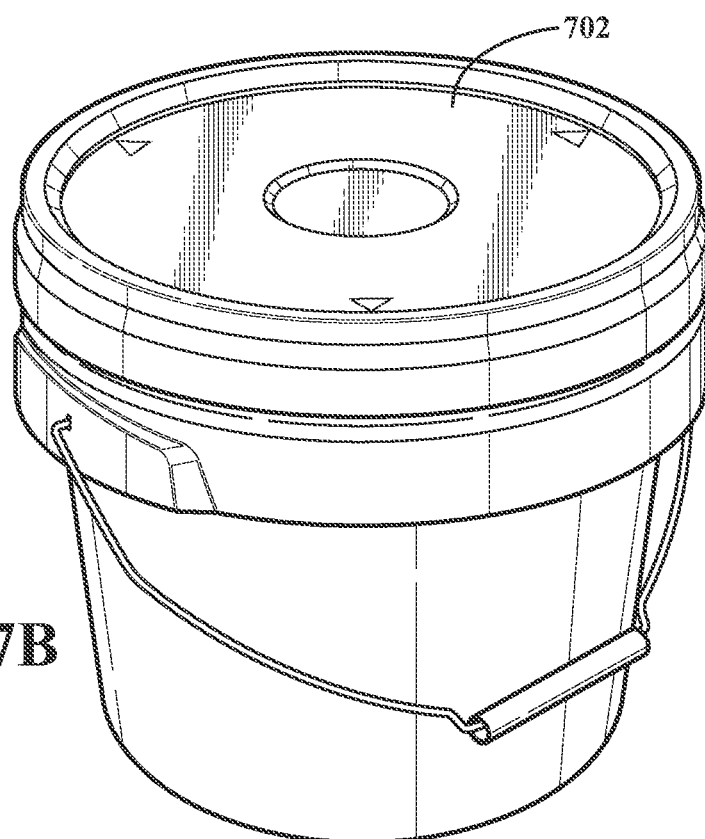

An issue with the transportation of organic material and waste is the need to limit seepage of liquid and odors from decomposition. In some instances, a container (bin) may be designed to be watertight. In some instances, a liner may be used to prevent seepage and reduce odors. In some embodiments, delivery packaging, such as boxes and containers in which the material is delivered, may be used to hold organic material for recycling and waste disposal. In a non-limiting example, as shown in FIGS. 7A-7B, restaurants, cafes, coffee shops, and other locations where large amounts of coffee are consumed might reuse the delivery packaging (containers 702 in which the coffee was delivered to the site) or other available containers for collecting and disposing of the coffee grounds 704. Once the coffee container has been emptied, it may have an identifying label applied, be filled with used coffee grounds, sealed (FIG. 7B) and sent back for recycling.

Figure 8A:
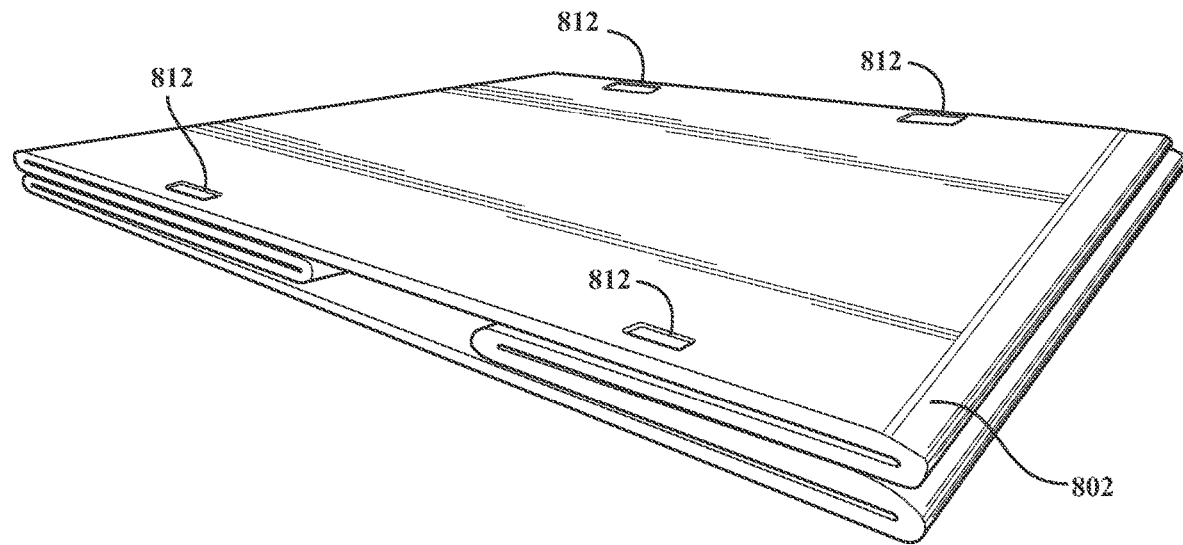
FIG. 8A illustrates an exemplary collapsible sleeve in a folded state.
Figure 8B:
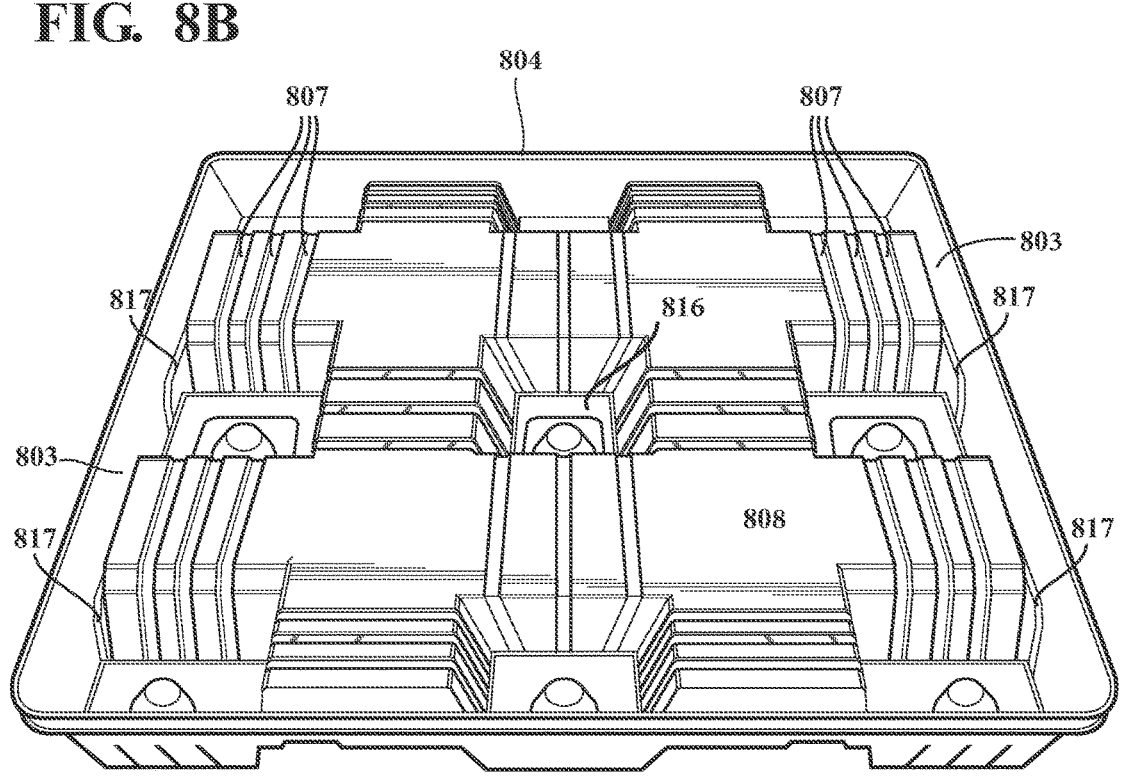
FIG. 8B illustrates an exemplary pallet bin base.
Figure 8C:
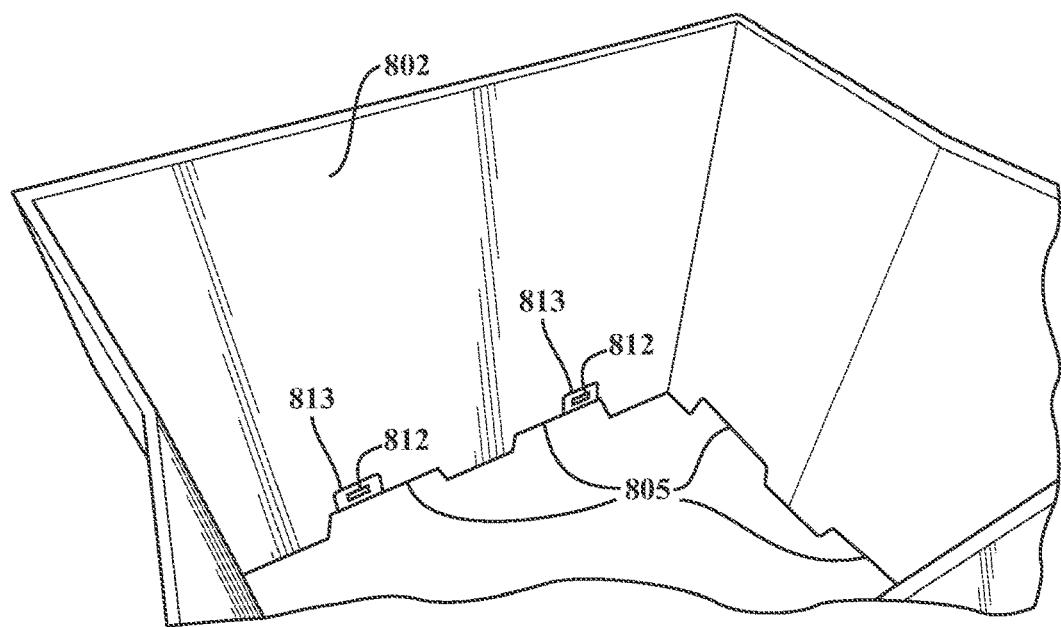
FIG. 8C illustrates another exemplary collapsible sleeve in an opened state.
Figure 8D:
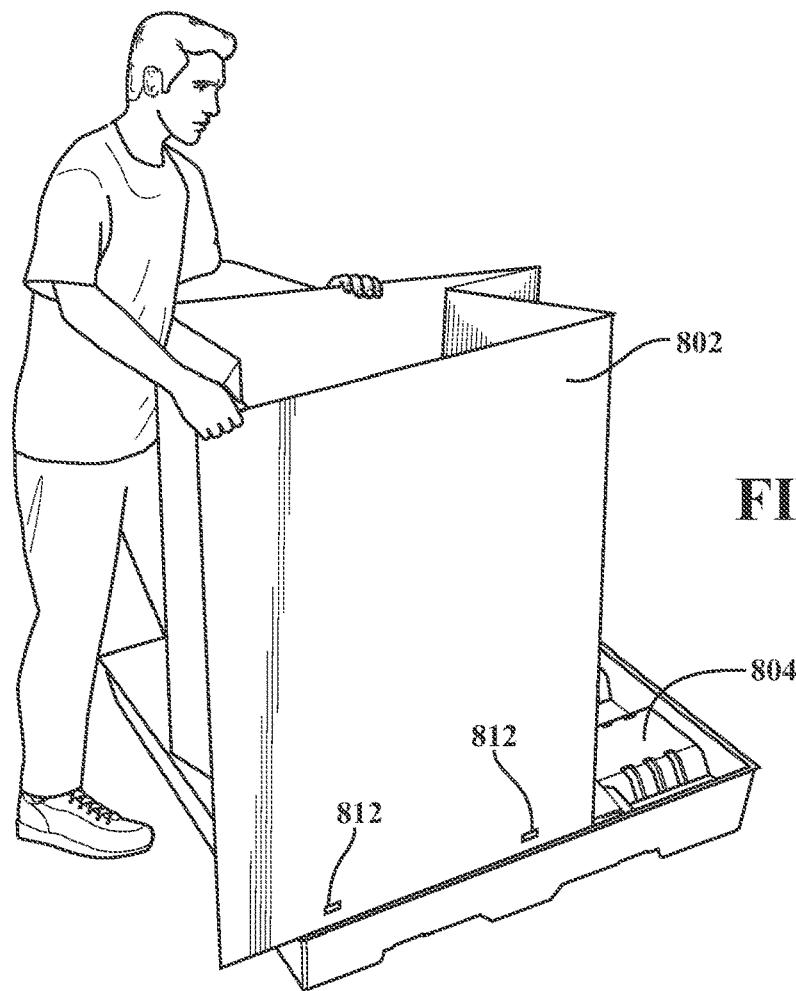
FIGS. 8D-8E illustrate a collapsible sleeve being inserted in a pallet bin base.
Figure 8E:
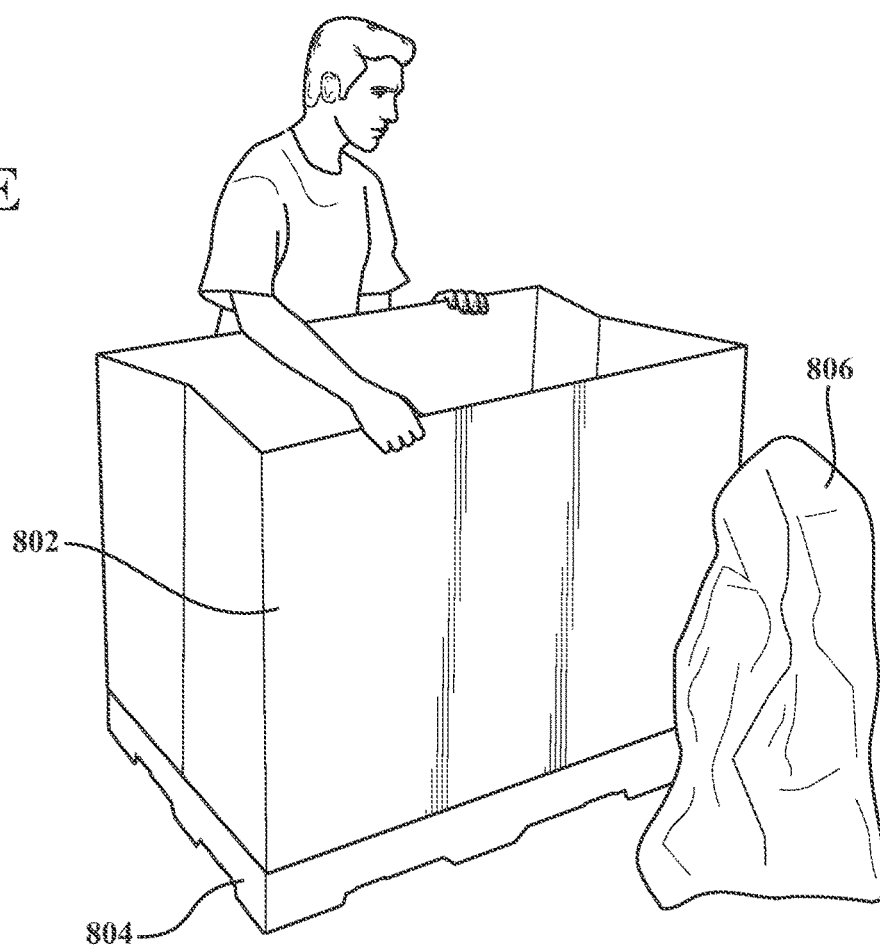
Figure 8F:
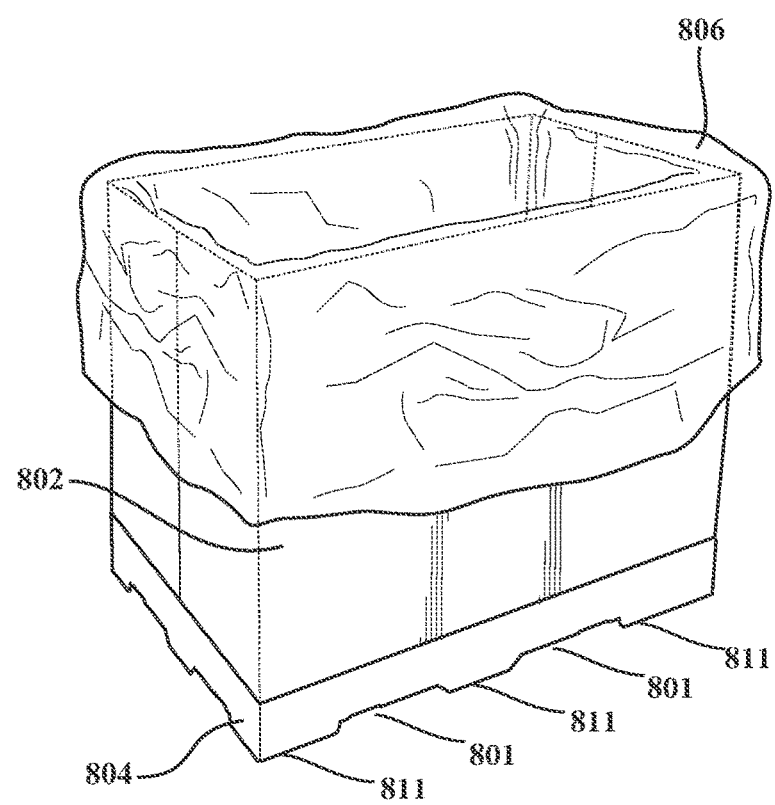
FIG. 8F illustrates a collapsible bin and liner.

In another non-limiting example, a source location may reuse large containers or bins. These containers or bins may be stockpiled at the store. These containers or bins may include collapsible sleeves or boxes, which are delivered to the store as part of a regular shipment of goods or these may be containers or bins in which other products or items were delivered. With reference to FIGS. 8A-8F, a bin may include a collapsible sleeve 802, which may fold flat such as shown in FIG. 8A for shipment to the store, together with a special pallet bin base 804, such as shown in FIG. 8B. Once a flat collapsible sleeve 802 is received, it may be opened such as shown in FIG. 8C and inserted in the special pallet bin base 804, as shown in FIGS. 8D-8E. The collapsible sleeve 802, may have various features that allow it, when open, to interface or nest with features on the pallet bin base 804 to align and hold the two components together for receipt and transport of waste or recyclable materials. In embodiments, an opened sleeve is easily inserted in and removed from the base. A liner 806 may be inserted in the collapsible sleeve for receiving waste or recyclable materials. Together, the assembled collapsible sleeve 802 and special pallet bin base 804 may be referred to herein as a bin or container.

As shown in FIG. 8B, the special pallet bin base 804 may be continuous with a continuous bottom surface (having no holes) and side walls forming one or more reservoirs 816, such that any holes in a liner 806 allow leaked material to be contained within a reservoir 816 of the pallet bin base. The bin base 804 may include one or more elevated surfaces 808 to hold the bin materials above the bottom surface of the base, wherein the elevated surface may cover only a portion of the entire base, to reduce the amount of material otherwise required to form a pallet bin base. The elevated surface 808 may include drainage channels 807 for aiding in drainage of liquid from the material in the bin into the reservoirs 816. This may improve sanitation within the store relative to standard pallets where the liquid would otherwise be able to leak into the surrounding area. The special pallet bin base 804 may include edge channels 803 between the outer edge of the base and the elevated surface 808 for receiving and constraining the collapsible sleeve 802. The edge channels 803 may include lips or ledges 817 for holding the sleeve 802 above the bottom of the reservoirs 816 in order to prevent the sleeve from contacting material in the reservoir (provided such material is below the edge of the collapsible sleeve 802). The reservoirs 816 may be interconnected to allow liquid to flow between them and settle to a low level to provide improved base stability. There may be one or more of an RFID tag and a GPS tracker embedded or attached to the special pallet bin base 804.

Figure 8G:
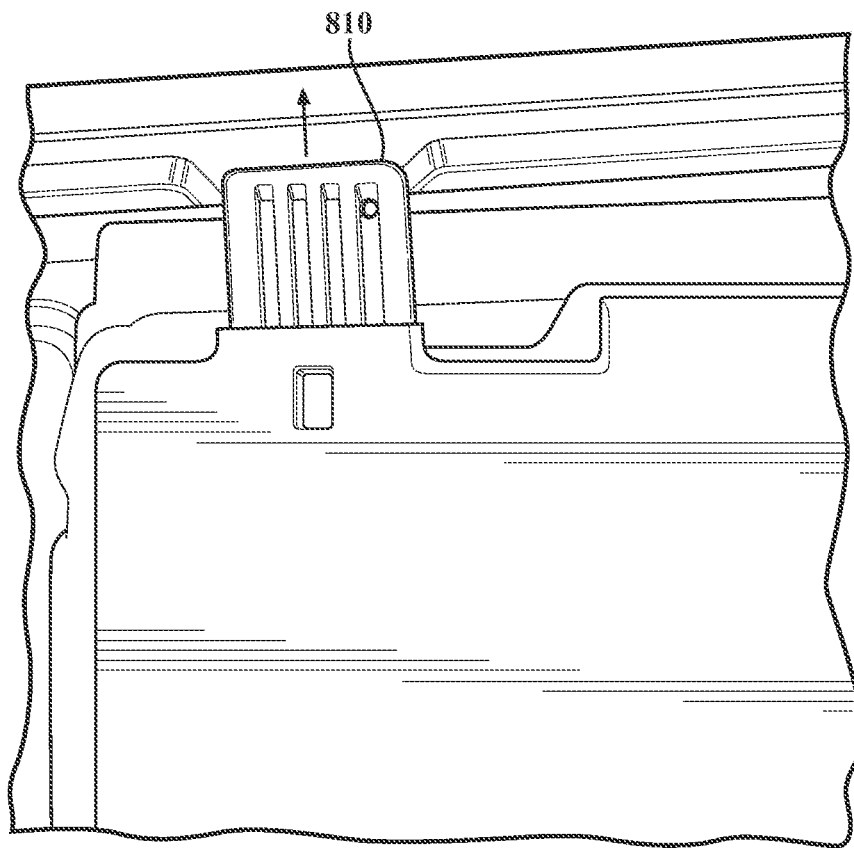
FIG. 8G is a top view of an exemplary base with an exemplary movable locking mechanism for securing a sleeve to the base.
Figure 8H:
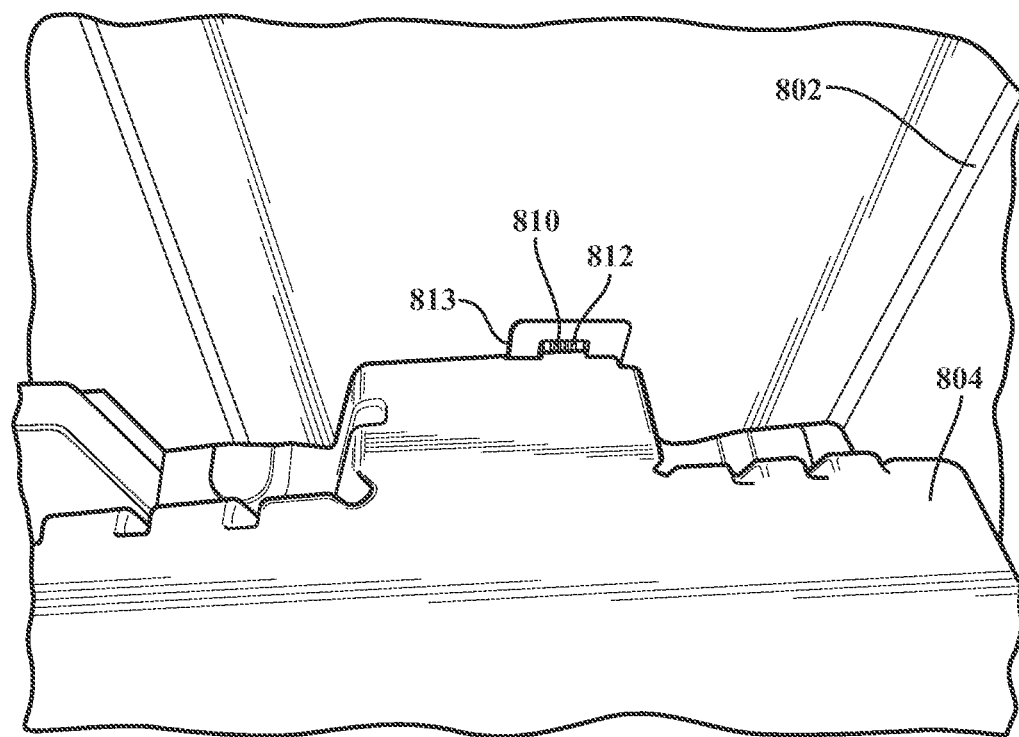
FIG. 8H illustrates a sleeve secured to a base with a locking mechanism.
Figure 8I:
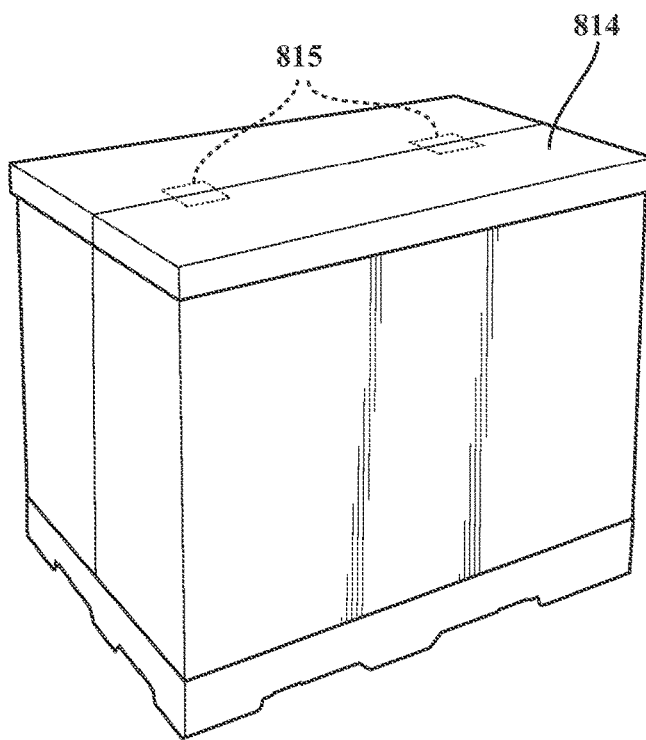
FIG. 8I illustrates an exemplary cover for the bin which is foldable.
Figure 8J:
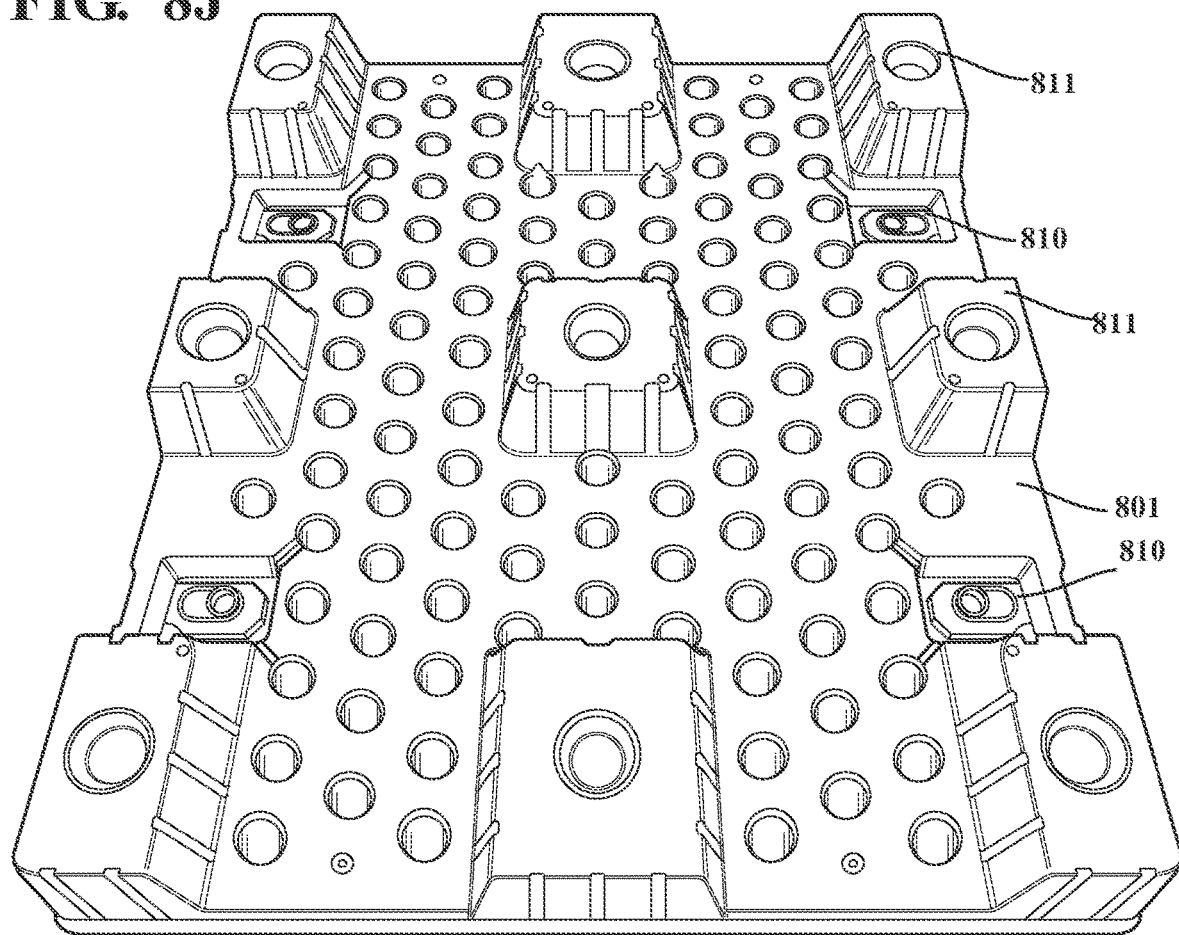
FIG. 8J illustrates the underside of an exemplary base showing an exemplary locking mechanism.
Figure 8K:
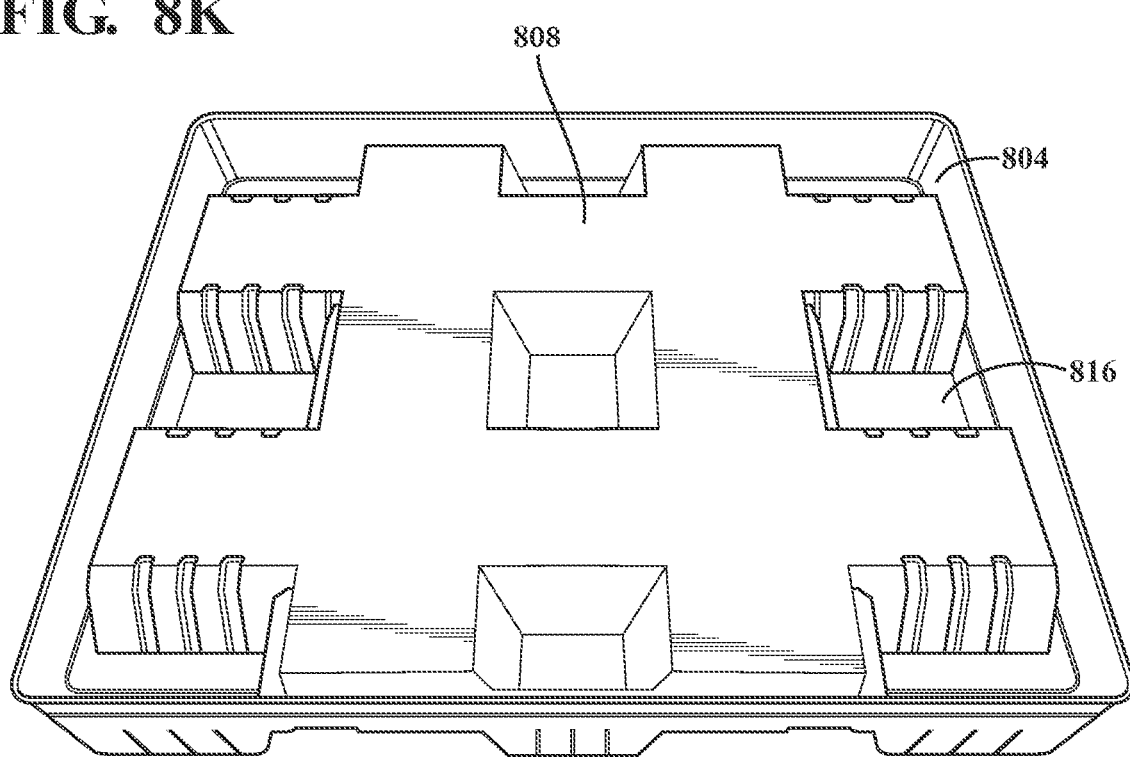
FIG. 8K illustrates another exemplary bin base.

FIG. 8J illustrates the underside of an exemplary base 804, showing underside channels 801 formed between feet 811 in order to facilitate movement of the bin via forklift, as explained below.

The collapsible sleeve 802 may be made of thin, lightweight plastic, such as shown in FIG. 8A, or cardboard, such as shown in FIG. 8C, or the like. The collapsible sleeve 802 may be sufficiently strong to hold another full bin stacked on top of it, such as during transport or prior to processing. A collapsible sleeve 802 made of cardboard may, in embodiments, be approximately 0.5 inches thick, and the interior or exterior or both may have a coating, such as a waxed coating, to protect the collapsible sleeve 802 from the contents of the bin, such as food waste, associated liquids, and the like. A collapsible sleeve 802 made of thin lightweight plastic may be approximately 3/16 to 7/16 inches thick. The use of plastic rather than cardboard may make the collapsible sleeve more robust and easier to clean. In such embodiments, the plastic of the collapsible sleeve 802 may have a corrugated interior structure to provide strength and rigidity. A plastic collapsible sleeve 802 may have rolled edges to provide a smooth edge, which may reduce the potential for tears and rips to a bin liner from the edge of the collapsible sleeve. The rolled edge may reduce the potential of cuts to the hands of those handling the collapsible sleeve 802. The rolled edge may provide a seal against liquids entering the interior of the plastic collapsible sleeve 802 and reduce the potential of contamination.

In embodiments, such as shown in FIGS. 8A and 8C, the collapsible sleeve 802 may have cutouts 812 for aiding in the attachment of the sleeve to the base 804 as more fully described below. In the case of a cardboard base, the cutouts 812 may include a reinforcement portion 813 for preventing tearing of the cardboard around the cutout. The cutouts 812 may be on two or more sides of the sleeve, and may be placed both at the top and bottom of the sleeve for reversibility of the sleeve.

In embodiments, the collapsible sleeve 802 may have notches 805 in the bottom edges (and also at the top edges for reversibility of the sleeve) to rest within pallet bin base 804, while accommodating the elevated surfaces 808 of base 804, such as in the case of a base 804 without edge channel 803, such as shown in FIG. 8J. The notches 805 may improve the stability of the collapsible sleeve 802 when assembled together with the special pallet bin base 804. The combination of the notches 805 in the collapsible sleeve 802 and/or the edge channels 803 in the special pallet bin base 804 of FIG. 8B may facilitate "locking" the collapsible sleeve 802 into its position on the special pallet bin base 804. The length that the collapsible sleeve 802 extends downwards from the upper edge of the notches 805 may be less than the depth of the reservoirs so as to limit contact between the collapsible sleeve 802 and any liquid which may collect in the reservoirs of the special pallet bin base 804.

In embodiments, the collapsible sleeve 802 may have flat, un-notched, top and bottom edges and be substantially vertically symmetrical. The vertical symmetry may facilitate assembly of the collapsible sleeve 802 with the pallet base 804 at the origination site, as the collapsible sleeve may be inserted into the pallet base 804 in either of two vertical orientations. The flat edges of the collapsible sleeve 802 may improve the stability of goods transported on top of a flattened/collapsed sleeve sitting on a pallet bin base 802. The absence of notches on the bottom edge of the collapsible sleeve 802 will enable the opened collapsible sleeve to sit higher in the special pallet bin base 804, potentially creating a larger bin for accepting waste.

The collapsible sleeve 802 may comprise one or more of an RFID tag, a GPS tracker or other tracking device. In embodiments, the collapsible sleeve 802 may have a location indicator for placement of an RFID tag, GPS tracker and the like such that the marker will be positioned so as to facilitate access by a label reader.

When collapsed, the collapsible sleeve 802 and special pallet bin base 804 may occupy a small amount of space; for example, in one embodiment they may, together, occupy less than 7 cubic feet. The collapsible sleeve 802 may be collapsible with a z-fold such that, lying flat, it may be contained within the outer edges of the pallet bin base 804. Together the collapsible sleeve 802 and pallet bin base 804 may be adapted to function as a pallet for transportation of goods. The pallet bin base 804 may be adapted to facilitate its transport using a forklift of pallet jack. Goods for delivery may be stacked on top of the collapsed sleeve 802 and pallet bin base 804. This compact form, which is comparable in scale to a typical wooden shipping pallet, may facilitate low cost or essentially cost-free shipping of the bin.

Further, there may be a locking mechanism 810, as shown in FIGS. 8G, 8H, and 8J, on the special pallet bin base 804, which interacts with a cutout 812 on the collapsible sleeve 802, to lock the collapsible sleeve 802 to the base. In this case, the locking mechanism is movable back and forth from the bottom of the bin (using one's finder in the hole shown in locking mechanism 810 in FIG. 8J) to engage with the cutout. As noted above, in the case of a cardboard sleeve, the cutout 812 may be reinforced with a reinforcement portion 813 such as an edge made of plastic, rubber or the like to strengthen the collapsible sleeve 802 at the location of the cutout 812, while a plastic sleeve may not need reinforcement along a cutout.

The bin may be emptied via dumping it, such as with a forklift clamp, hydraulic tipper, or other dumping mechanism. There may be a modified clamp adapted to hold the bin and retain the bin when the contents of the bin are dumped. The clamp may be adapted to rotate on the forklift to facilitate tipping or dumping of the bin. Once the contents have been dumped, the components of the bin, the collapsible sleeve 802, special pallet bin base 804 and optional cover 814, such as shown in FIG. 8I, may be cleaned and the sleeve 802 collapsed for reuse. The cover may include hinges 815 so as to allow the cover to be opened along an axis of the cover. The components of the bin may be recyclable.

In embodiments, the special pallet bin base 804 may be approximately 40 inches by 48 inches to fit standard grocery pallet jacks or forklifts. The underside channels 801 between the feet 811 may be at least 10 inches wide to accommodate tandem pallet jacks. The bin may be moved around inside the store with a standard pallet-jack, to where waste is being generated at a given time, such as fruit cutting stations or salad bars. This may provide improved convenience relative to other organic waste receptacles. While the special pallet bin base 804 may replace a wooden pallet, it may be stacked on top of a wooden pallet. The dimensions given above are exemplary and it should be understood that the dimensions of the special pallet bin base 804 may be varied to accommodate the fork and pallet sizes specific to a particular distribution system.

There may be a cover 814 which may be placed on top of the assembled collapsible sleeve 802. The cover 814 may be a single, contiguous component. The cover may comprise an exterior frame that fits over the edge of the collapsible sleeve 802 and a hinged interior portion, which may be opened to add waste material and remain closed at other times to reduce odor. The exterior frame may distribute the weight if a container of waste is rested in the edge of the collapsible sleeve when the waste is being added to the bin. The cover 814 may facilitate stacking of filled bins for transport.

The collapsible sleeve may be collapsible with a Z-fold such that it may lie flat on top of the pallet bin base 804 or within the cover 814 and be contained within the pallet's edges, which may extend approximately one inch vertically above the interior surface. Thus, when the sleeve is collapsed and placed on top of the pallet base 804, other products and goods may be stacked on top of the collapsible sleeve. This may facilitate return of the collapsible sleeve to a waste origination site for reuse. For transport of empty bins to the origination source, the collapsible sleeve 802 may fit inside the cover 814 and together they may be strapped to the pallet bin base 804. In some embodiments, the components may be strapped together in the order: pallet bin base 804, cover 814, and collapsible sleeve 802, while in others they may be strapped together in the order: pallet bin base 804, collapsible sleeve 802, and cover 814.

The liner 806 may be used to protect the bin components, contain potential liquids and odors, and maintain sanitation in all settings while the bin is full. The liner 806 may be clear to allow visibility of the bin contents when it is tied over the contents. The liner 806 may include a masking odor or other odor-blocking technology. Additionally, the liner may comprise enzymes to slow or speed up degradation of the organic waste deposited within the liner 806. The liner 806 may be of a sufficient height such that, when applied inside the assembled collapsible bin 802, the liner 806 extends outside far enough beyond the edge of the bin that it may be twisted or tied over the bin contents. In one embodiment the liner is at least 96 inches long. In some embodiments the liner 806 may be a one-time use liner. In other embodiments the liner 806 may be reused for this purpose after enclosing a stack of banana boxes or other materials intended to be sold in supermarkets. The liner 806 may be embedded with one or more of an RFID tag or a GPS tracker.

The liner may be sent directly to the store. The liner may have an identifying label 108 incorporated or attached to the liner 806. Some goods such as banana and other fruit, seafood and the like are shipped with a liner to protect freshness. These liners may be reused as liners for the collapsible sleeve 802.

Illustrative Clauses

In some implementations, there may be a device for transporting waste or recyclable materials as described in the following clauses and as illustrated in FIGS. 8A-8I.

Clause 1. A device for transporting waste or recyclable material, the device comprising: a base; and a collapsible sleeve movable between an open state and a collapsed state, wherein the collapsible sleeve in the open state interfaces in a nesting manner with the base to form a bin for receiving and transporting waste material.

Clause 2. The device of clause 1, wherein the collapsible sleeve, when in the collapsed state, and the base are adapted to function as a pallet for transportation of goods.

Clause 3. The device of clause 1, wherein the base has an interface adapted to allow the device to be lifted by at least one of: a fork lift and a pallet jack.

Clause 4. The device of clause 1, wherein the base comprises an attachment mechanism to secure the collapsible sleeve in the open state to the base.

Clause 5. The device of clause 1, wherein the collapsible sleeve comprises at least one of plastic and cardboard material.

Clause 6. The device of clause 1, wherein the collapsible sleeve is collapsible with a z-fold such that it may be contained within the outer edges of the base.

Clause 7. The device of clause 1, wherein the collapsed state of the collapsible sleeve, allows the base and the collapsed sleeve to be transported together like a standard wooden palette.

Clause 8. The device of clause 1, further comprising a cover, wherein the cover is integral to or separate from the collapsible sleeve and fits on top of the open collapsible sleeve.

Clause 9. The device of clause 8, wherein the base, the open collapsible sleeve and the cover together are stackable on another similar device.

Clause 10. The device of clause 8, wherein the collapsible sleeve, when in the collapsed state, fits within the cover.

Clause 11. The device clause 8, wherein the collapsible sleeve, when in the collapsed state, and the cover fit within the outer edges of the base for transport.

Clause 12. The device of claim 8, wherein the collapsible sleeve, when in the collapsed state, the cover, and the base are attachable together for transport.

Clause 13. The device of clause 8, wherein the cover comprises an exterior frame that fits over a peripheral edge of the open collapsible sleeve and a hinged interior portion.

Clause 14. The device of clause 1, wherein the base forms a reservoir for containing a liquid portion of the waste material.

Clause 15. The device of clause 1, wherein the reservoir comprises one or more channels.

Clause 16. The device of clause 15, wherein the one or more channels comprise a plurality of channels along an exterior edge of the base, each of the plurality of channels having a corresponding lip.

Clause 17. The device of clause 15, wherein the collapsible sleeve has notches in bottom edges to accommodate the plurality of channels.

Clause 18. The device of clause 1, further comprising a disposable liner adapted to be disposed within the open collapsible sleeve to provide lining for the interior of the bin.

Clause 19. The device of clause 1, wherein the collapsible sleeve has an opening to accommodate an attachment mechanism of the base.

Clause 20. The device of clause 1, wherein the collapsible sleeve comprises a location indicator for placement of at least one of an RFID tag, a GPS tracker and an asset tracker.

Clause 21. The device of clause 1, wherein at least the interior of the collapsible sleeve is coated by a wax coating.

Clause 22. The device of clause 1, further comprising at least one of an RFID tag, a GPS tracker and an asset tracker.

Clause 23. The device of clause 1, wherein the base and the collapsible sleeve are adapted for repeated use as a bin for transporting waste or recyclable material.

Figure 9:
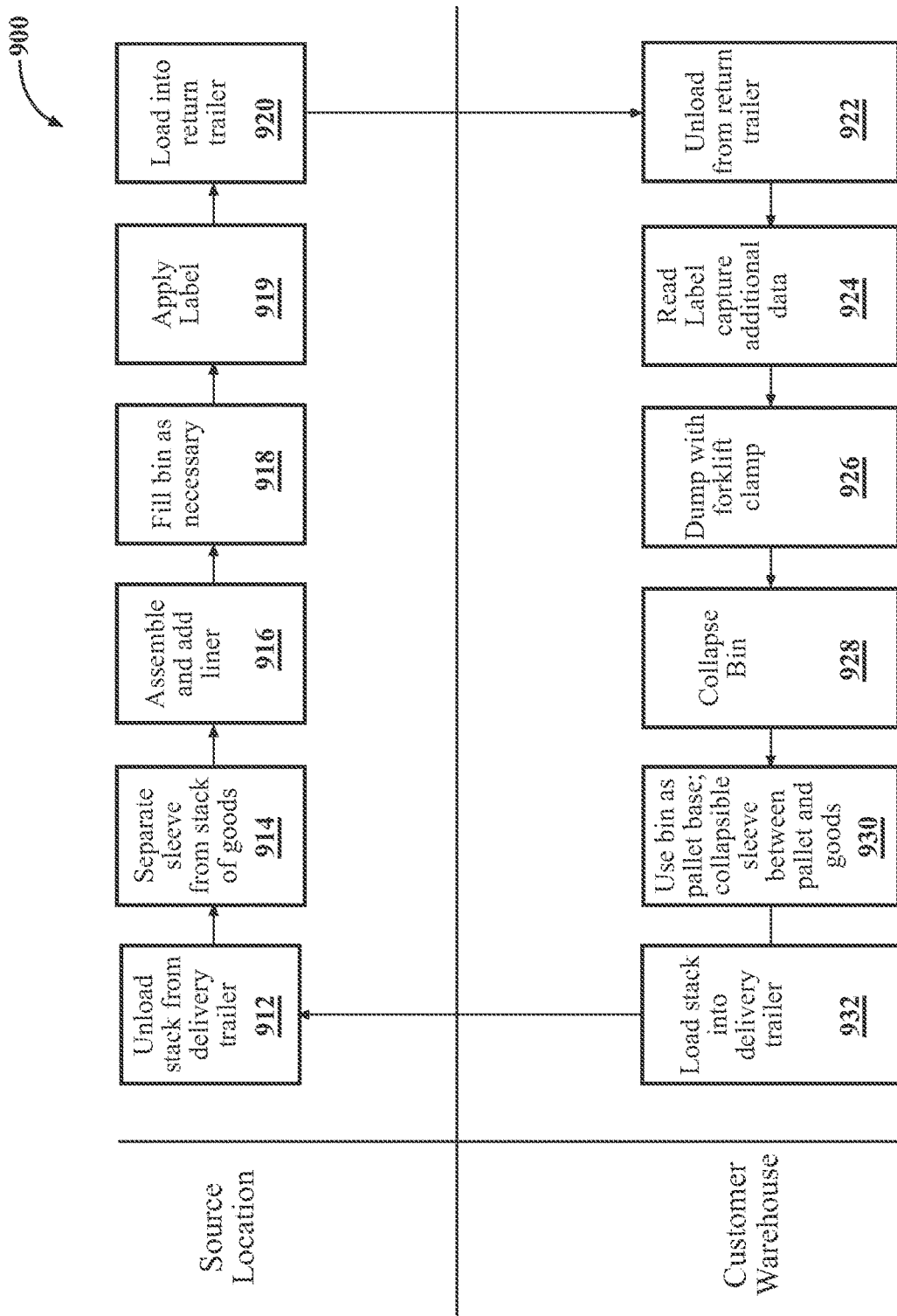
FIG. 9 is a flow chart showing exemplary steps for reusing collapsible bins.

With reference to FIG. 9, a method 900 of reusing these collapsible containers includes a number of steps:

First, a stack is unloaded from delivery trailer (Step 912). A stack of goods with a pallet bin base is unloaded from a delivery trailer along with other goods for delivery to the store. This typically occurs in the back room of a store, such as on a loading/unloading dock.

Next a sleeve may be separated from stack of goods (Step 914). The goods may be unloaded from off the top of the pallet bin base 804, and the collapsed sleeve 802 may be retrieved from the bottom of the stack.

Next, the liner may be assembled and added (Step 916). The collapsed sleeve 802 may be assembled and placed on the pallet bin base 804. A liner 806 may be inserted into the open sleeve 802 on the pallet bin base 804. The store may have a supply of liners 806 for this use.

Next, the lined sleeve 802 may be filled as necessary (step 918). Food waste and other organic material may be added to the assembled and lined sleeve 802 as it is generated throughout the day.

Next, the label may be applied (Step 919). An identifying label 108 may be applied to the liner bag or the assembled sleeve 802 when the bin is sealed. In some instances an identifying label may be incorporated into the liner bag. As noted above, the label 108 may capture various other types of information about the material, the owner, the store, the individual working with the bin, and the like.

Next the bin may be loaded into the return trailer (Step 920). Once the assembled sleeve 802 has been filled and sealed it may be loaded into a trailer along with other recyclable materials to be returned to a central warehouse.

Next, the bin is unloaded from a return trailer (Step 922). Once the trailer has returned to the central warehouse/distribution center the fully assembled sleeve 802, otherwise known as a unit of material 104, is unloaded into the warehouse.

Next, the label is read, the unit may be weighted and an image captured (Step 924). Once the unit of material 104 has been unloaded a reader 112 may read the identifying information on the sleeve 802 or liner 806. Additional data may be captured such as weight and images and that data associated with the unique ID of the identifying label 108 identified by the reader.

Next, the bin is dumped with the forklift clamp (Step 926). The assembled sleeve 802 and liner 806 may then be dumped for processing, composting and the like. A special clamp to maneuver the assembled sleeve 802 and liner 806 without damage may be used as discussed elsewhere herein.

Next the empty bin is collapsed (Step 928). After the contents have been dumped, the empty sleeve 802 may be collapsed or folded.

Figure 10:
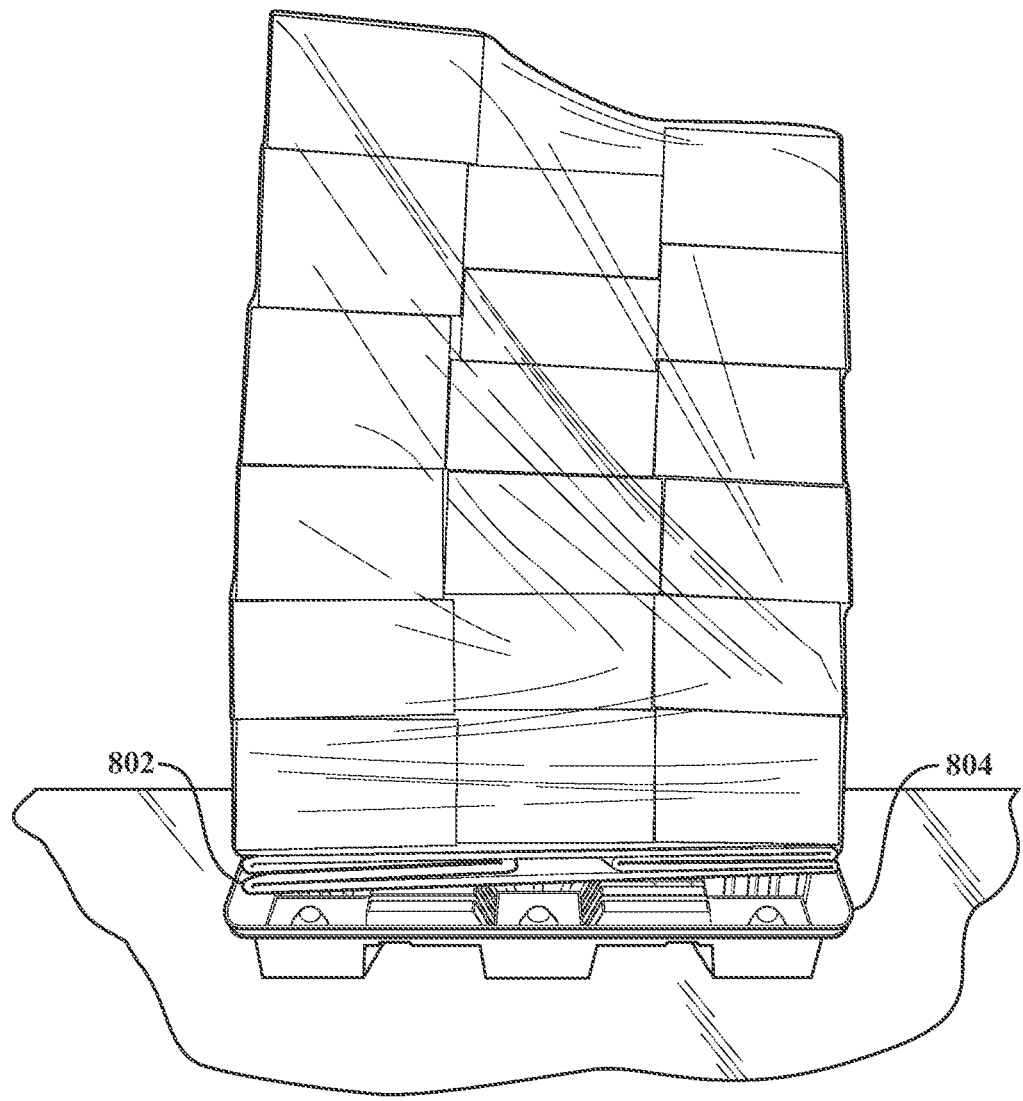
FIG. 10 shows an exemplary pallet bin box with collapsible sleeve supporting a stack of goods for transport.

Next, the pallet bin base 804 is used as the pallet base (Step 930). The collapsed sleeve 802 is placed flat on top of the pallet bin base 804. Outgoing goods are then loaded onto the pallet bin base 804 and collapsed sleeve 802 as shown in FIG. 10.

Next, the stack is loaded into delivery trailer (Step 932). The stack of goods is loaded into an outgoing trailer to a store where the cycle will begin again with unloading the stack from the delivery trailer (Step 912).

In some cases, a store may reuse shipping containers in which they receive goods such as watermelon bins, pumpkin bins, potato bins, and the like. These bins carry goods to the store and, once emptied, may have a liner inserted and be used for collecting food waste, organic waste, trash and the like to be backhauled to the distribution center for disposal. After dumping out the liner filled with organic waste, these bins may be folded and sent back to the store for reuse as a collection bin. Unlike the collapsible sleeve 802, these bins typically do not fold flat and may be inserted among the pallets of goods on the truck, either on edge between pallets or lying on top of the loaded pallets.

Figure 11A:
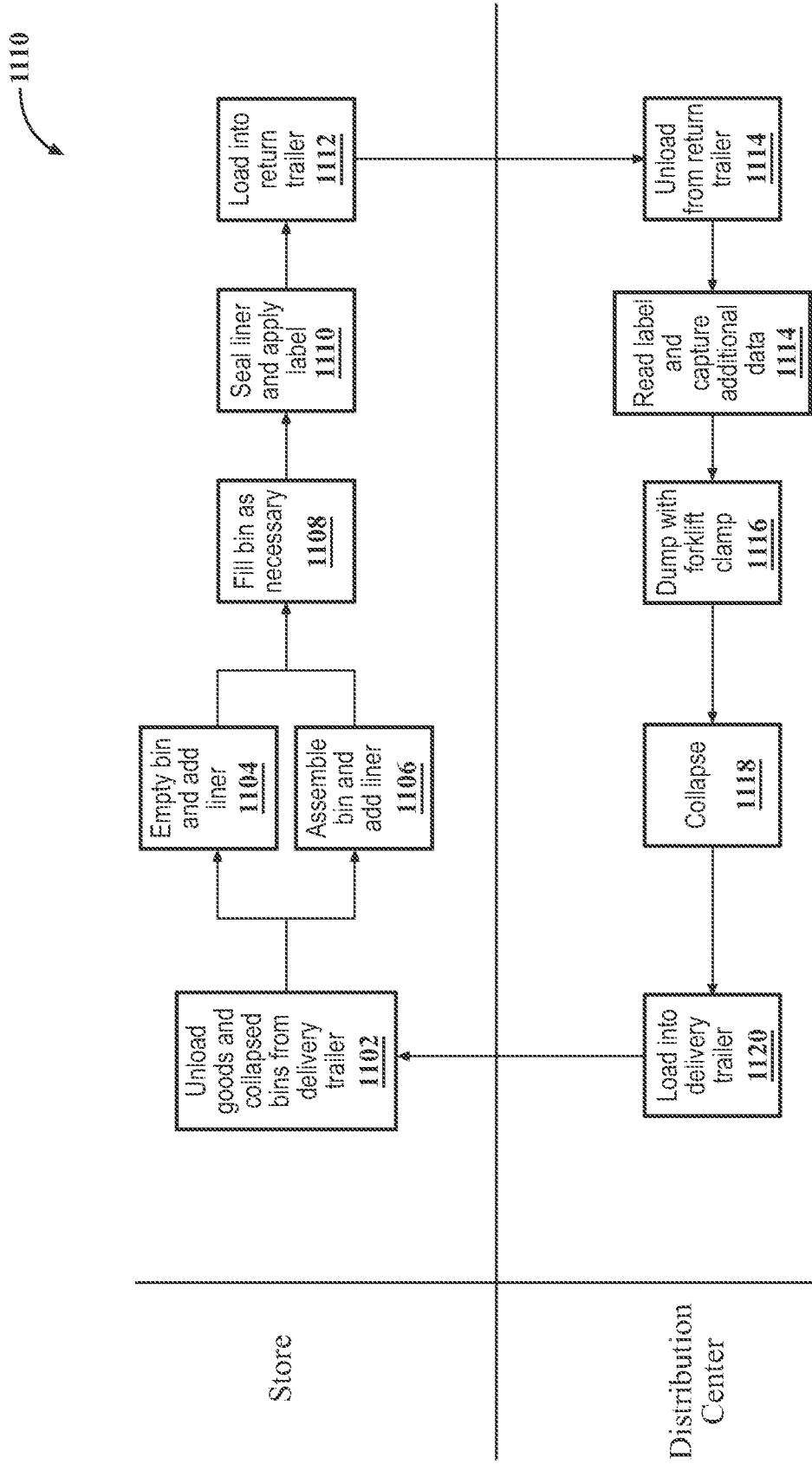
FIG. 11A is a flow chart showing exemplary steps for reusing product containers.

With reference to FIG. 11A, a method 1110 of reusing these shipping containers includes:

First, goods and collapsed bins are unloaded from delivery trailer (Step 1102)

Next, a bin is emptied and a liner added to the bin (Step 1104). Goods are emptied from a large bin such as a watermelon bin and a liner is inserted into the bin. This bin may be newly delivered or one already present in the store. The liner may be new or it may be a reused produce bag such as a banana bag. In some instance, the new liners may comprise an RFID tag for an identifying label 108.

Figure 11B:
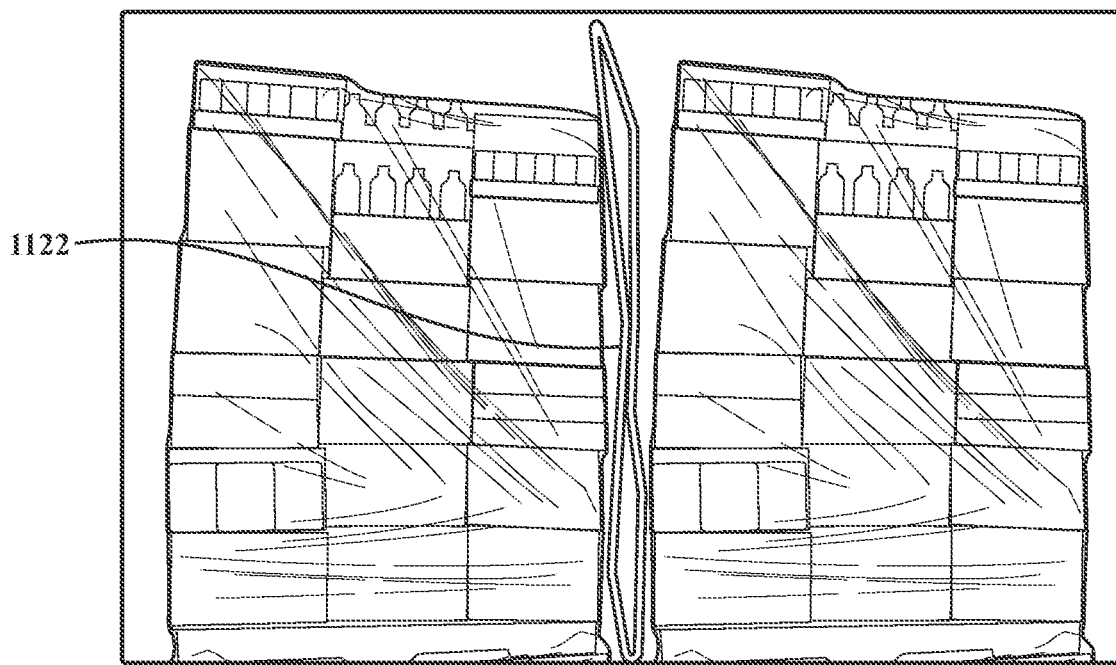
FIGS. 11B-11C show stacks of goods for delivery including collapsed product containers for reuse.
Figure 11C:
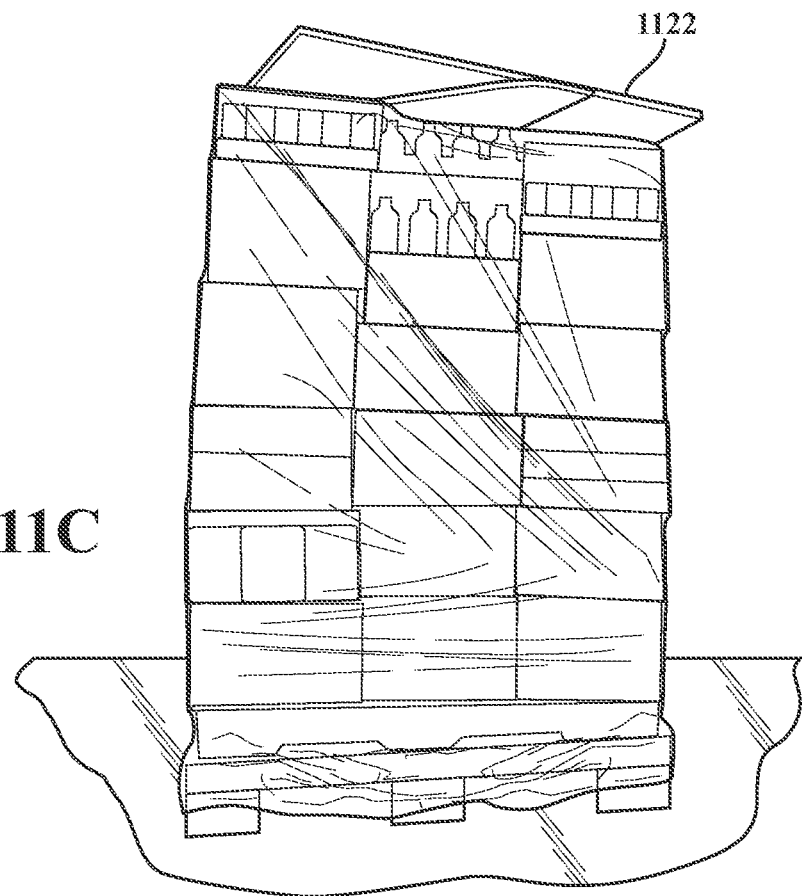

In some instances, a collapsed bin may be reassembled and a bin liner added (Step 1106). In some instances, collapsed previously used product bins 1122 may be part of the received shipment as shown in FIGS. 11B-11C. These boxes may be unloaded from the truck, assembled and a liner inserted.

Figure 11D:
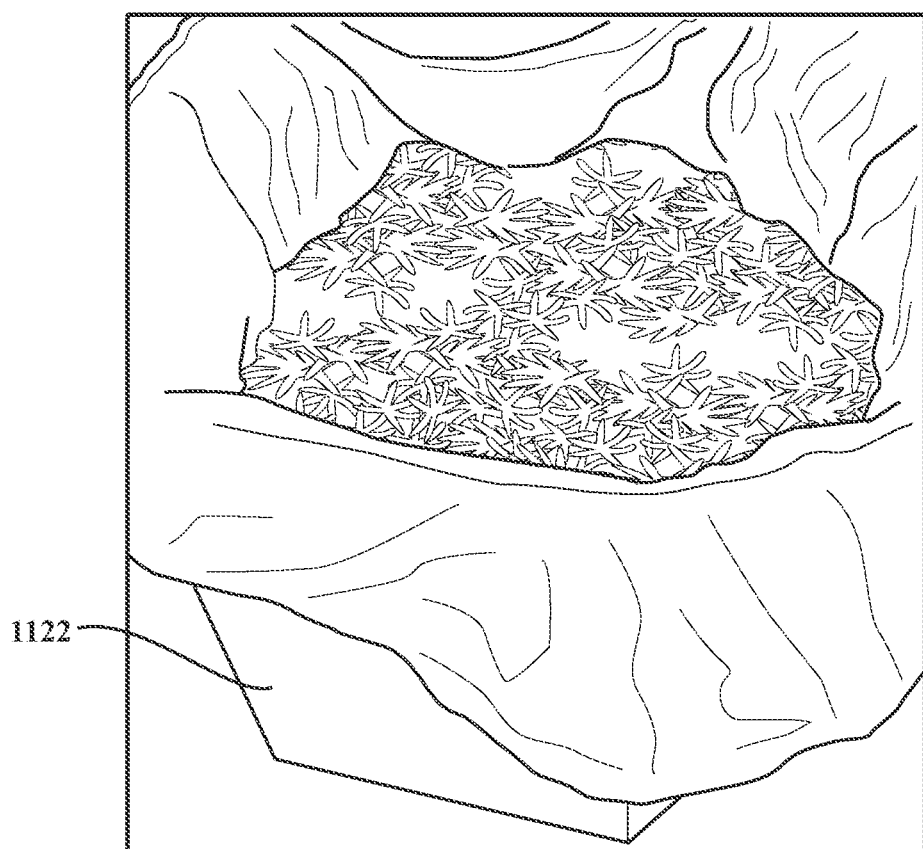
FIG. 11D shows an exemplary product container and liner being used to collect organic waste.
Figure 12A:
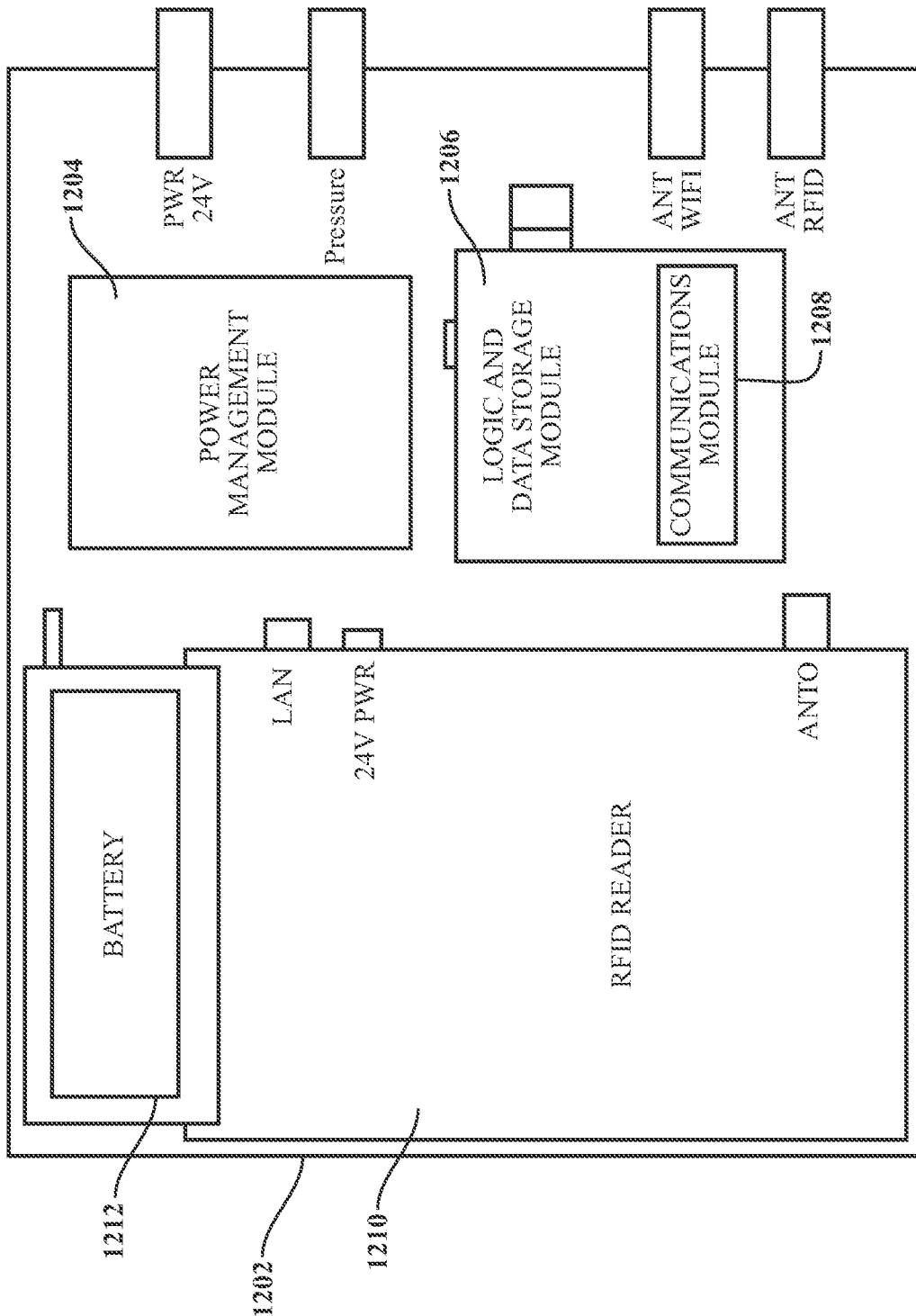
Figure 12B:
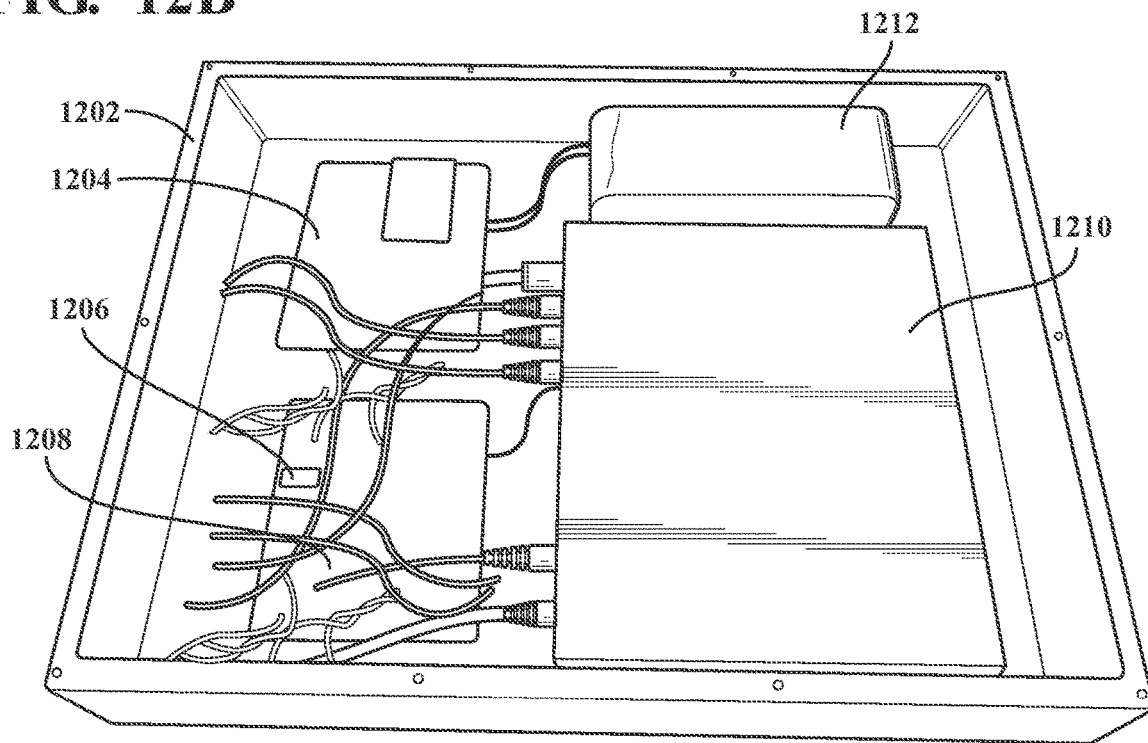
Figure 12C:
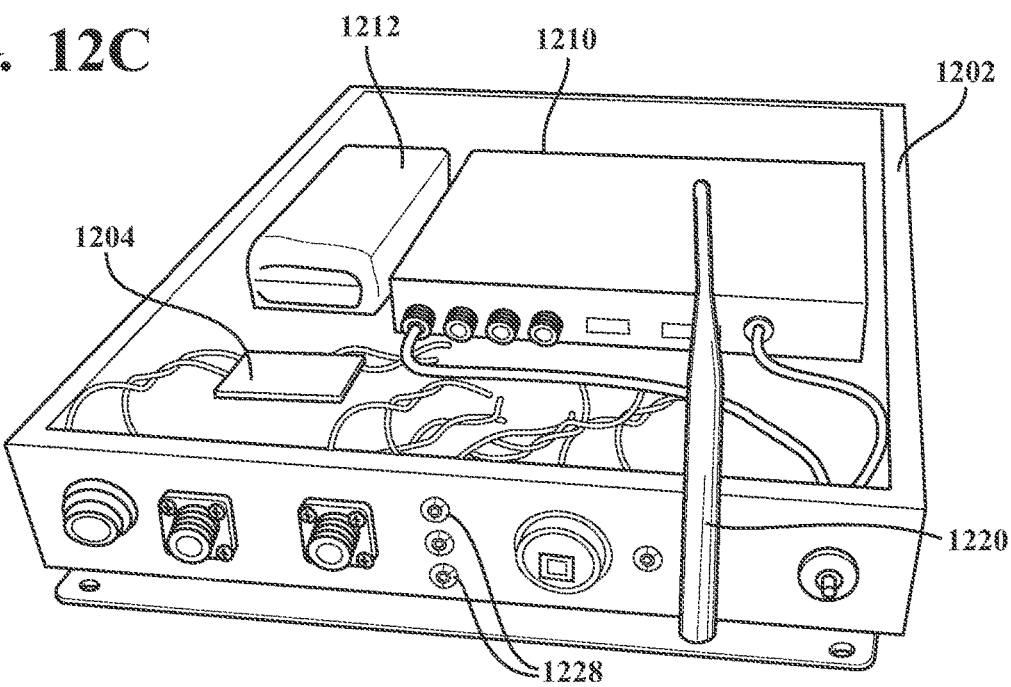
Figure 12D:
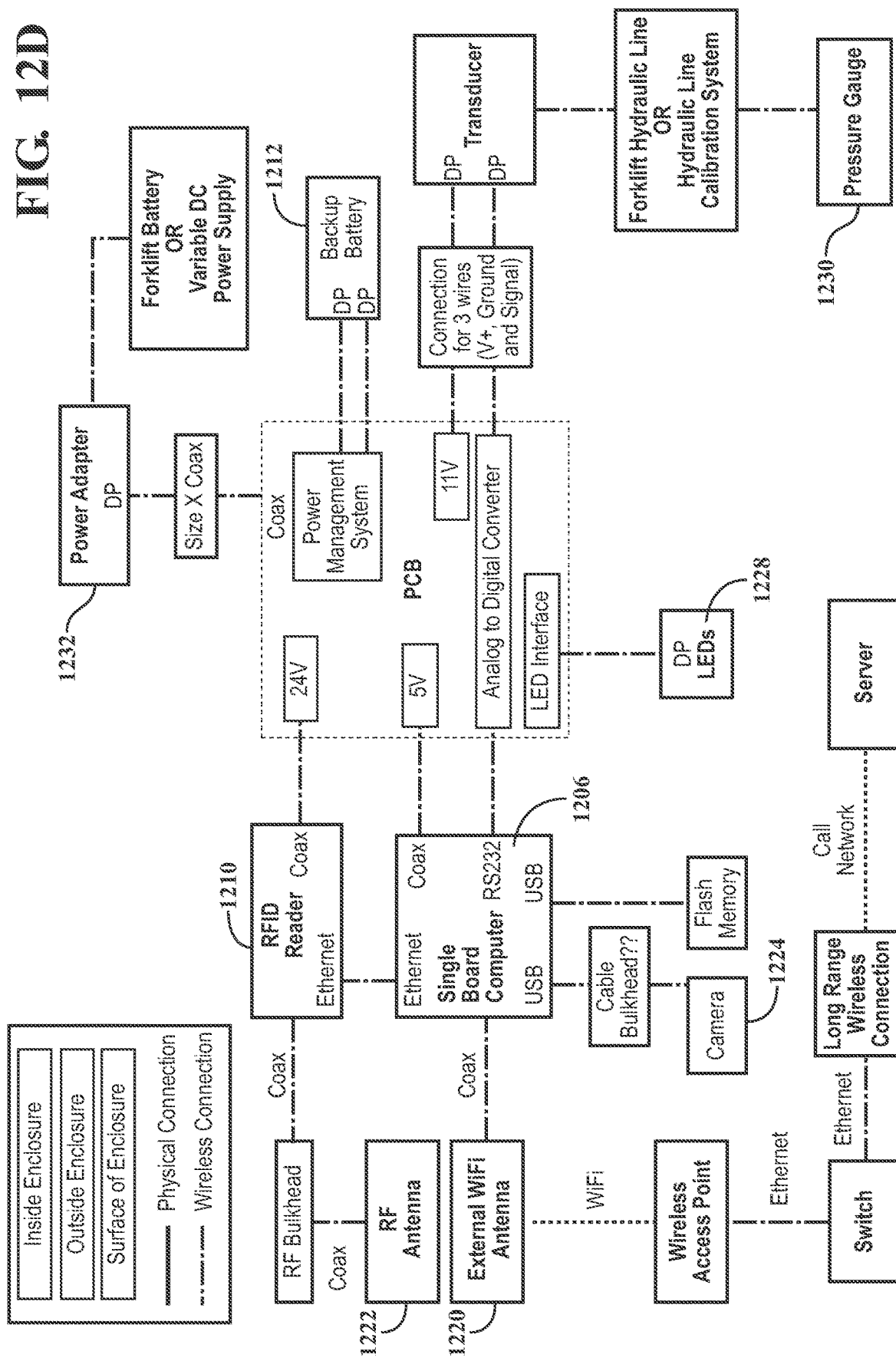

Next, a reused product bin 1122 is filled as necessary (Step 1108). Once the bin is lined, organic material and waste may be placed into the bin for disposal (FIG. 11D).

Next, the liner is sealed and a label applied (Step 1110). Once the bin is full, the liner is sealed and a label applied. The label may be applied to the liner or the container. The label may be incorporated into the liner.

Next, the bin is loaded onto a return trailer (Step 1112). The full bins with the sealed liners are loaded into the truck to be hauled to the distribution center.

Next the bin is unloaded from return trailer (Step 1114). Upon arrival at the distribution center, the full bins are unloaded from the trailer.

Next, the label is read and additional data captured (Step 1112). At the distribution center, the identifying label 108 may be read for each bin and additional data captured such as weight, an image, and the like.

Next, the bin is dumped with special forklift clamp (Step 1114). The bin may then be emptied into the appropriate disposal stream. A special forklift clamp may be used to prevent damage to the liner.

Next, the product bin is collapsed (Step 1118). The now empty bin may be collapsed for return to the store.

Next, the collapsed bin is loaded into delivery trailer together with goods for the store (Step 1120). The collapsed bin may be loaded into the deliver trailer for reuse at the store.

Smart Forklifts

In some embodiments, many of the features of the above described system may be incorporated into a forklift, fork truck, hand truck, pallet jack and the like. This combination will be referenced as a smart forklift in the ensuing description but it should be understood to include other variations of equipment for hoisting and transporting heavy and/or bulky objects, whether carried on a pallet or not. The incorporation of these features with a piece of machinery (e.g. a hopper, a receiving trailer, and the like) already typically used in many distribution centers may facilitate introduction of the methods and systems of this disclosure into existing warehouses and distribution centers while minimizing workflow. This set of features, described hereafter as a smart forklift system, may include at least one of an RFID reader, a bar code scanner, a QR code scanner and the like together. The smart forklift system may include a logic and data storage module for associating and storing a unique ID from an identifying label 108 on a unit of material 104 with received data characterizing the same unit of material 104. The smart forklift system may include a communications module for transmitting the stored data to a centralized location such as an analysis system 110. The smart forklift system may include one or more sensors for obtaining data about the unit of material such as such as a scale, GPS tracker, thermal sensors, noise sensors, imaging sensors for various wavelengths, and the like. The smart forklift system may include a power management system, a reserve battery, one or more antennas, power interface devices, and the like. In some instances, the majority of the smart forklift system components may be situated in a single enclosure attached to the smart forklift. In some instances, some system components such as a scale, a reader, an imaging system and the like, may be located apart from the smart forklift but in communication with the smart forklift system. A smart forklift system may be designed to operate automatically with little or no additional input from the operator of the smart forklift beyond that required for the operation of a standard forklift.

In the following illustrative example, a smart forklift system (FIGS. 12A-12E) may include an enclosure 1202 comprising a logic and data storage module 1206, a power management module 1204, a communications module 1208, an RFID reader 1210, a reserve battery 1212, and the like. The logic and data storage module 1206 may comprise a single chip computer on a PCB, one or more data ports for communicating with the RFID reader 1210, an imaging system 1224 and other sensors, and memory. The RFID reader 1210 may be connected to an external RFID antenna 1222 which may be positioned so as to achieve the best signal for reading an identifying label 108 on the unit of material 104 being transported.

The smart forklift system may include a communications module 1208. The communications module 1208 may have the ability to wirelessly communicate information to a remote server or analysis system 110. The communication module 1208 may utilize one of a short range wireless communications system such as wireless USB, Bluetooth, IEEE 802.11, WiFi and others or long range wireless communications systems such as 2G, 3G, LTE and other cellular communications technologies. The communications module 1208 may be located within the enclosure while having a connection to an externally mounted antenna 1220 to provide adequate signal strength and coverage. The throughput of the communications module 908 may be co-optimized with the capacity of the reserve battery to assure the ability to upload an entire shift's worth of data after power down of the forklift.

In embodiments a scale may be integrated into the smart forklift system. In some instances the scale may be integrated with the forks on which the load, e.g. a unit of material 104, sits. In some instances, the scale may utilize a pressure gauge 1230 attached to the hydraulics used to raise and lower the load. The pressure required to raise and lower the forks may vary with the weight of material on the forks. The pressure gage 1230 may be designed to transmit pressure data to the logic and data storage module 1206 at a frequency and resolution designed to provide adequate weight differentiation when processed by the logic and data storage module 1206. As the forklift moves with the load there may be some level of variability in the mast hydraulics and the associated pressure data transmitted. Therefore, the transmission rate may be chosen so as to assure that weight data is captured throughout to allow for processing or filtering of the pressure data to increase the accuracy of the measurement. The pressure gauge 1230 may include a local analog to digital (A-to-D) converter or the A-to-D converter may be located within the enclosure, incorporated into one of the logic and data storage module 1206, the power management module 1204, and the like. Thus, a pressure gauge 1230 may provide the information necessary for the logic and data storage module 1206 to calculate weight based on pressure used to raise and lower a unit of material 104.

The smart forklift may include one or more sensors such as thermal sensors, noise sensors, imaging systems 1224 for various wavelengths, and the like. The speed of the computer and the size of the memory of the logic and data storage module 1206 may be variable to allow for customization of the system for its intended environment including factors such as the number of images anticipated per unit of material, store ID, and the like, the type and resolution of the images, the frequency of uploading of the images, the number of pictures per shift and per day, the desired safety margin in terms of retaining pictures on system, and the like. As an illustrative example, close to 4 GB of memory would be needed to support a smart forklift in a warehouse supporting 400 stores, where the expectation was that there would be about three images per store per day with each image being about 800 KB and an ability to store four days worth of pictures in the logic and data storage module 1206.

The smart forklift components may draw power by connecting directly to the forklift power adapter 1232. When the forklift is running the smart forklift components may draw power from the forklift power adapter 1232 and charge a reserve battery 1212. There may be a set of rules that governs when and how power may be drawn from the primary forklift power adapter 1232. These rules may include charging the reserve battery 1212 when the primary battery charge exceeds a predefined level, charging the reserve battery 1212 when the forklift is plugged into a power source, and the like. When the forklift is shut off the smart forklift components may draw power from the reserve battery 1212 to complete operations, such as conveying information to the analytic server, backing up information, performing self diagnostics, and the like. The reserve battery 1212 may be one of lithium ion, a fuel cell, and the like.

The enclosure may include LED status lights 1228 to indicate status of the smart forklift system (e.g. red for scale being read, yellow for RFID tag being red, green for communication with the remote server). Access to the enclosures internal components may be limited by specialized tool (screwdriver, etc.).

Figure 13A:
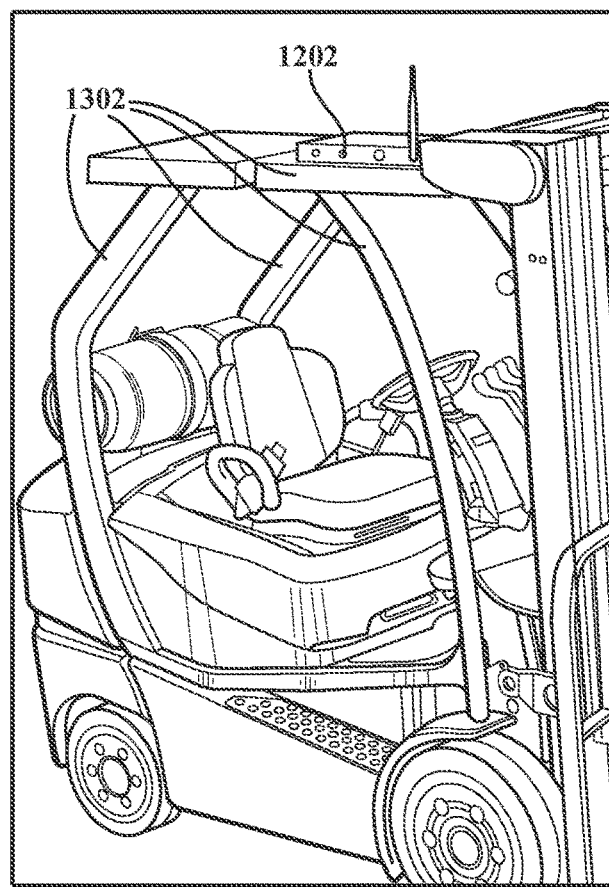
FIGS. 13A-13B show placement of an enclosure on a forklift.
Figure 13B:
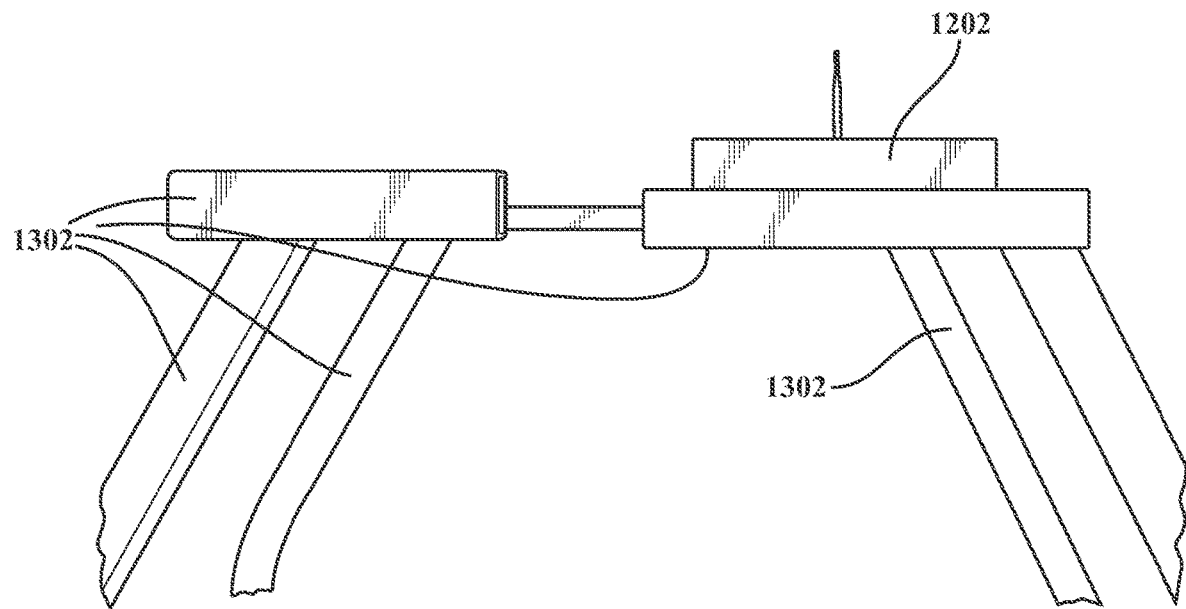

The smart forklift system enclosure 1202 may be positioned on the smart forklift in a location that minimizes its susceptibility to damage, such as adjacent to or on interior elements of the frame. The smart forklift system enclosure 1202 may be mounted on the forklift such that it does not obstruct the operator's field of view or violate OSHA and/or forklift manufacturer requirements. In one embodiment, as shown in FIGS. 13A-13B the enclosure 1202 may be placed above the driver enclosure 1302.

Figure 14A:
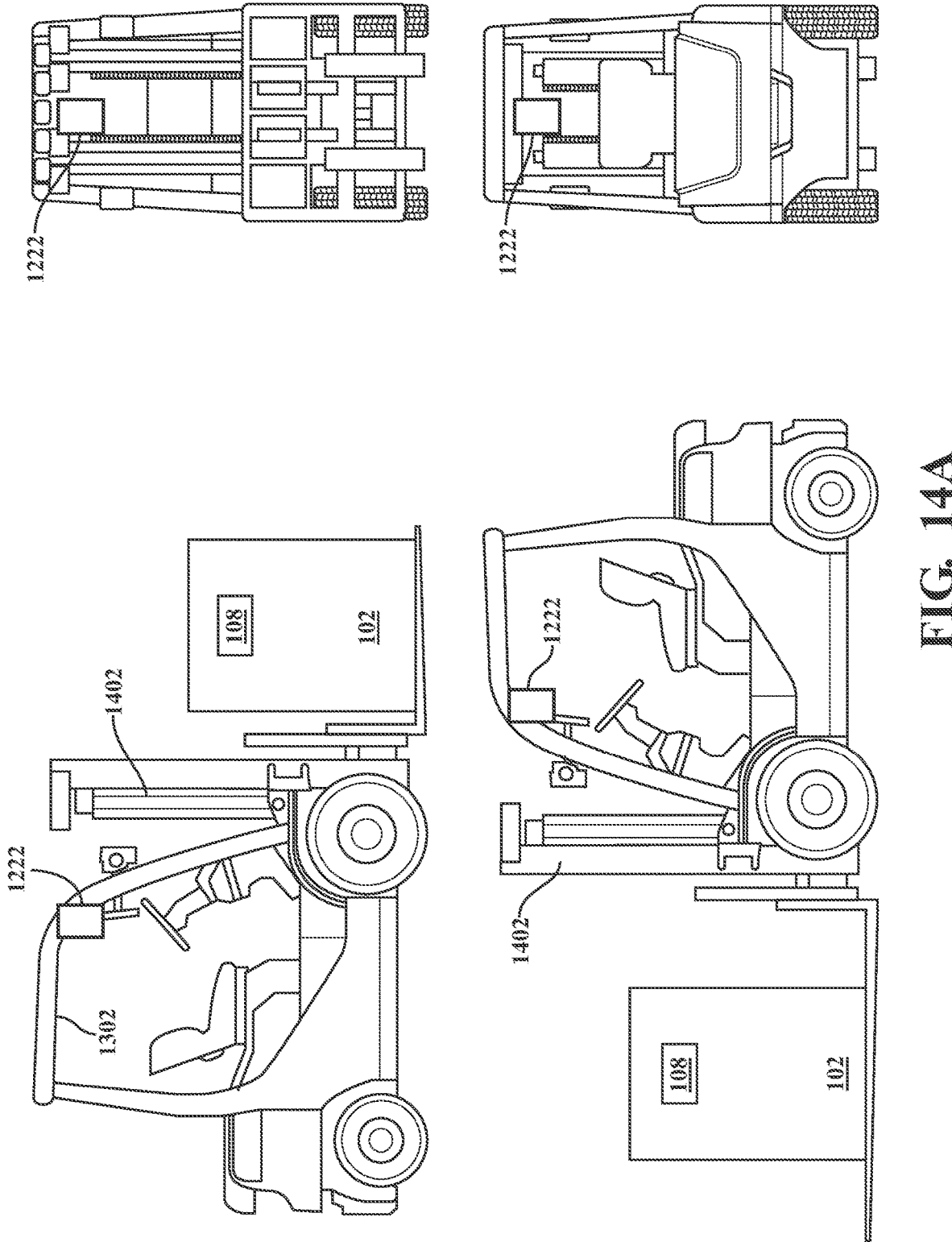
Figure 15A:
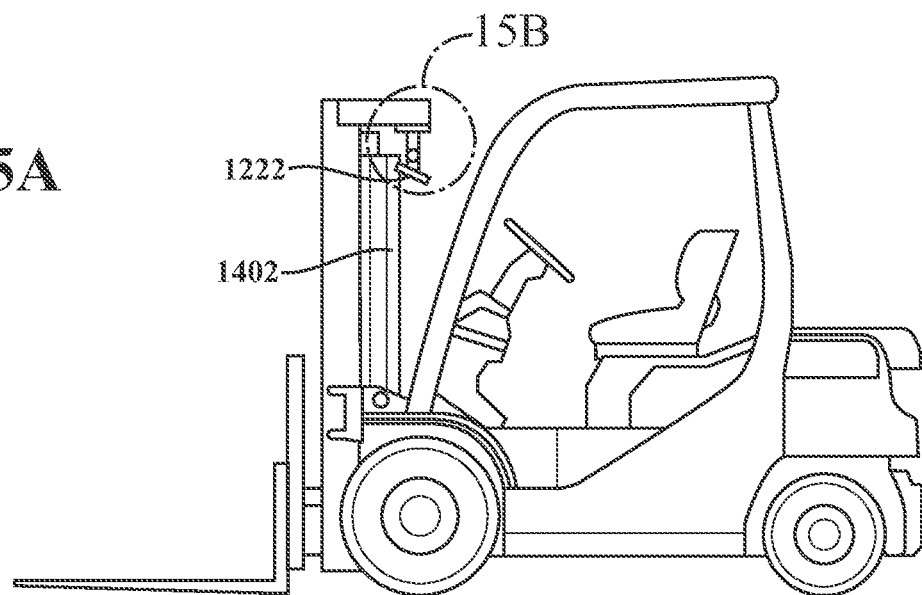
FIGS. 15A-15C show pictures of an RFID antenna on a forklift.
Figure 15B:
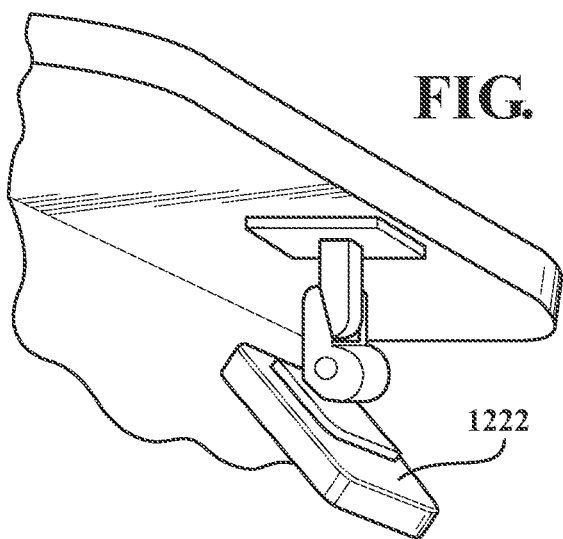
Figure 15C:
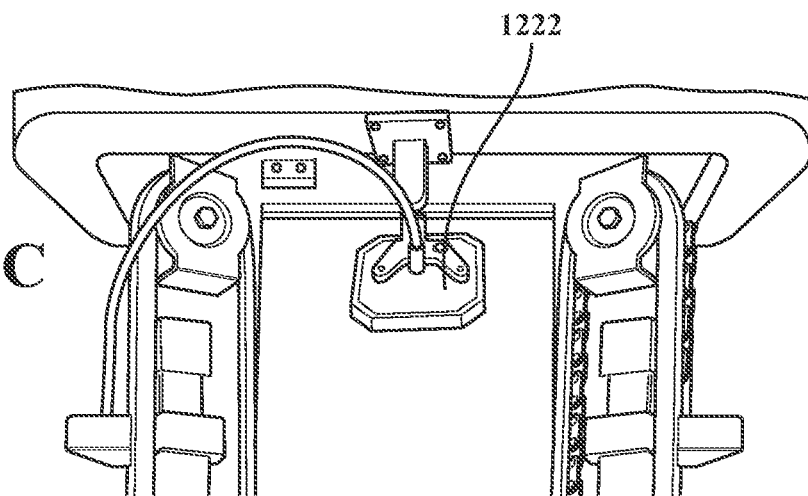

In some cases placement of the RFID antenna 1222 may be important to achieving reliable readings while protecting the antenna from physical damage. An antenna 1222 placed as shown in FIG. 14A, inside the driver enclosure 1302, may be problematic in some cases, as the large metal supports of the forklift mast 1402, positioned between the antenna 1222 and the unit of material 104 and the associated identifying label 108, may interfere with the ability of the antenna 1222 to detect a sufficient signal to enable an RFID Reader to detect the RFID based identifying labels 108. Alternately, an antenna 1222 that is positioned between the metal masts 1402 of the forklift, as shown in FIG. 14B, may be able to detect the RFID identifying labels 108 with more reliability. Furthermore, positioning the RFID antenna 1222 between the metal masts 1402 of the forklift 1404 may provide some physical protection as the metal masts may prevent physical damage to the antenna 1222 during normal operations. The field of view or wave shape of the antenna would be selected based on the position on the forklift to prevent signal attenuation.

For RFID antennas 1222 located on a smart forklift, an identifying label 108 attached to a unit of material 104 may be expected to be located in a particular direction relative to the RFID antenna 1222, such that it may desirable to use a directional antenna aligned to focus its cone of available energy on the location where the identifying label 108 is anticipated rather than use an omnidirectional antenna where the energy is distributed evenly over a sphere. Depending on the type of material to be handled by the smart forklift one or more RFID antennas 1222 may be positioned on the smart forklift where different antennas 1222 are optimized for different potential materials. For example, organics and cardboard may have different reflective and absorption profiles and thus would interact differently with antennas designed for different operating frequencies. It may be possible to optimize the RFID antenna 1222 for reading identifying labels 108 attached to units of material 104 of a particular material type. Thus, for a smart forklift designed to work with multiple materials it may be desirable to have more than one antenna 1222, each antenna 1222 optimized for a particular material type.

A smart forklift may have a user interface through which information about the system operation such as read status, data read, battery status, status and error messages associated with the various system components and sensors, and the like may be communicated to the operator of the smart forklift. In addition to information about the smart forklift system, the user interface may display information from an analytic system regarding larger system topics, such as a cumulative loading calculator that would instruct the operator of the need to stop loading onto a particular truck as its maximum weight has been reached, the need to move to a new dumpster as total capacity has been reached, and the like. This ability to receive overall system information while loading a trailer may reduce occurrences of overloading a trailer, weighing the trailer and discovering that the trailer is overweight or having to partially unload the trailer to comply with weight restrictions. In some instances, the user interface may include the ability for the operator to enter additional information such as general notations about the unit of measurement, filling in information in the event of a failed read, noting if a unit of recyclable material included contaminants, noting if a unit of organics failed to include a liner, and the like. This information may be used to flag a unit for additional review or processing. In addition to a user interface, there may be an additional manually operated reader such as a handheld scanner, smart phone, and the like with which an operator might read the identifying label 108 in the event of a failure by the standard reader 112.

Figure 16A:
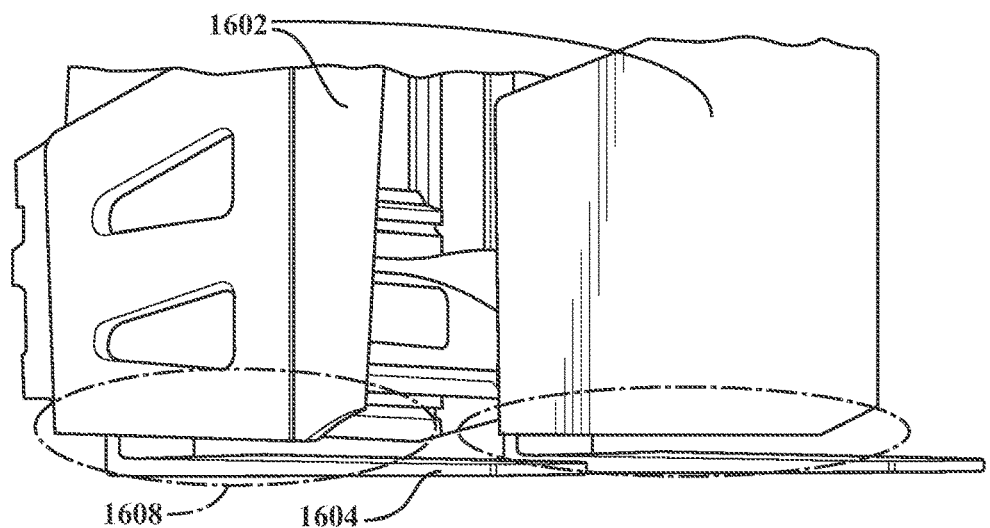
FIGS. 16A-16C show a specialized forklift clamp for handling reusable, collapsible bins.
Figure 16B:
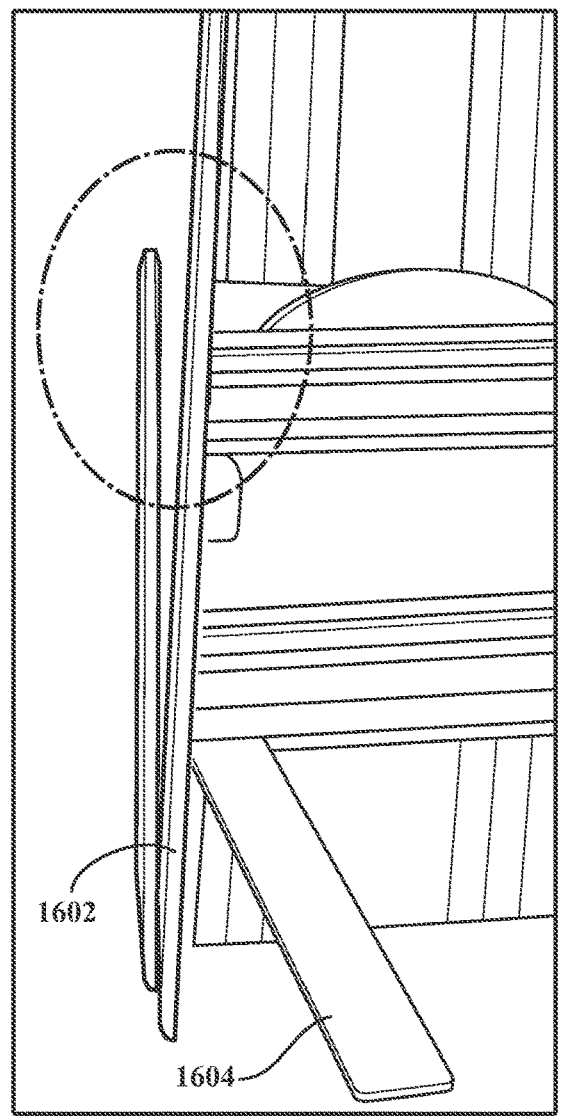
Figure 16C:
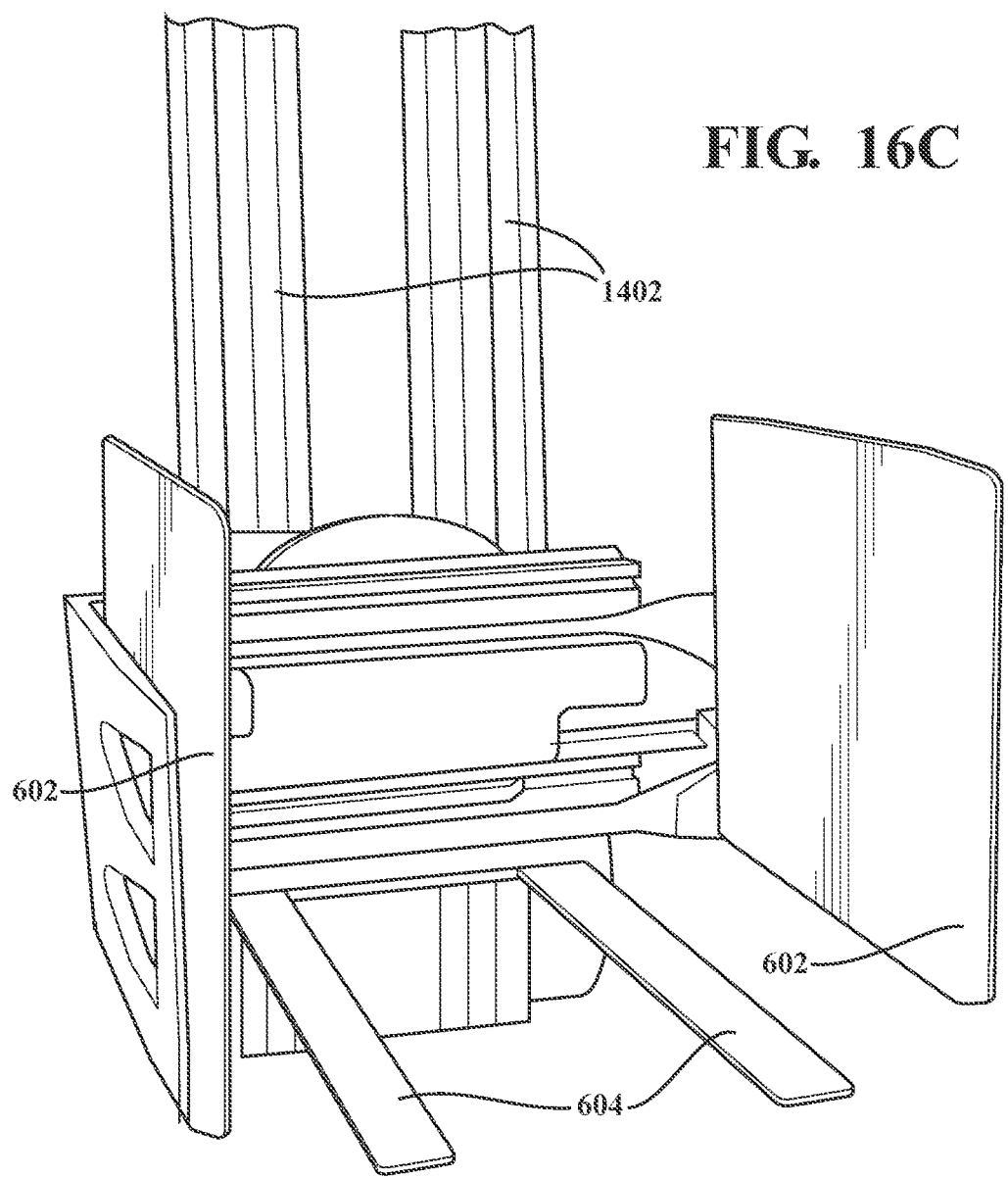

A smart forklift may include a special clamp optimized for specialized units of material 104. For example, a clamp may be optimized to handle the containers 702 of recycled coffee grounds. In another example, the specialized clamp may be designed to hold a recycled sleeve 802 and liner to dump out the liner containing the waste while retaining the sleeve 802 for subsequent reuse. In an illustrative example of a specialized forklift clamp as shown in FIGS. 16A-16C the forks 1604 may be lowered relative to the sides of the clamp 1602 to expand the intervening gap 1608 by about one inch. The sides of the clamp 1602 may be adjusted such that they angle inward toward the bin being transported with distance from the forks 1604. The incline may be created using a shim 1608 as shown in FIG. 16B. The angle prevents the bin from falling in when the contents, such as a liner 806 filled with garbage, food waste and the like is dumped. The maximum pressure produced by the clamp may be reduced to minimize damage to cardboard bins. There may be adjustable stops on the clamp that enable an operator to set a minimum distance between the clamp walls to limit damage to the reusable bins.

Illustrative Clauses

In some implementations, information about smart forklifts for tracking waste and recycle materials in the following clauses, and as illustrated in FIGS. 13A-B, 14A-B, 15A-C, and 16A-C.

Clause 1. A forklift system adapted to collect and report information about items handled by a forklift, the system comprising: a forklift; an RFID reader with at least one antenna positioned at least one of on and in proximity to the forklift, wherein the at least one antenna of the RFID reader is positioned to read RFID information from at least one RFID tag positioned on an item handled by the forklift; a device for measuring a parameter indicative of the weight of the item handled by the forklift; and a processing facility with a server for associating the information read by the RFID reader and the parameter indicative of the weight of the item.

Clause 2. The system of clause 1, wherein the server further associates the information from the RFID reader with timestamp information that indicates a time of the handling of the item by the forklift.

Clause 3. The system of clause 1, wherein the device for measuring the parameter indicative of the weight of the item is at least one of a drive-on scale and a drive-through scale.

Clause 4. The system of clause 1, wherein the device for measuring the parameter indicative of the weight of the item is positioned on the forklift.

Clause 5. The system of clause 4, wherein the parameter indicative of the weight of the item is at least one operating parameter of at least one operating system of the forklift.

Clause 6. The system of clause 5, wherein the at least one operating parameter is at least one of a pressure associated with a lifting system of the forklift, a load measured in the lifting system of the forklift, a power requirement of a power system of the forklift, and an operating parameter of a motor of the forklift.

Clause 7. The system of clause 1, further comprising a communications facility of the forklift for communicating the information captured by at least one of the RFID reader and the device for measuring weight to the server.

Clause 8. The system of clause 1, further comprising a camera for capturing an image of the item handled by the forklift, wherein at least one of the captured image and information from the captured image is associated with the information captured by the RFID reader.

Clause 9. The system of clause 8, wherein a communications facility communicates at least one of the captured image and information from the captured image to the server.

While only a few embodiments of the present invention have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

All documents referenced herein are hereby incorporated by reference.

What is claimed is:

1. A method comprising:
   transporting goods on a plurality of pallets, wherein at least one of the plurality of pallets comprises a base with side walls and a collapsible sleeve that is contained within the side walls of the base, wherein, if the collapsible sleeve is collapsed and configured to lie flat on the base, the collapsible sleeve provides a surface for the transport of the goods, and, if the collapsible sleeve is open and joined to the base, the collapsible sleeve, with the base, forms a bin;
   transporting goods on the at least one of the plurality of pallets from a first location to a second location using a transportation trailer;
   unloading the at least one of the plurality of pallets from the transportation trailer at the second location;
   upon removal of the goods from the at least one of the plurality of pallets at the second location, forming a bin by opening the collapsible sleeve and attaching the open collapsible sleeve to the base;
   at the second location, placing waste or recyclable material in the bin;
   transporting the material in the bin from the second location, using the transportation trailer used to deliver goods;
   removing the material in the bin;
   cleaning the bin;
   collapsing the collapsible sleeve;
   placing the collapsed collapsible sleeve on the at least one of the plurality of pallets; and
   loading the at least one of the plurality of pallets with goods for transportation from the first location to the second location.

2. The method of claim 1, further comprising, after attaching the open collapsible sleeve to the base, inserting a liner into the bin.

3. The method of claim 2, wherein removing the material in the bin further comprises removing the liner from the bin.

4. The method of claim 1, wherein the first location is a food distribution center and the second location is a food retailer.

5. The method of claim 4, further comprising: moving the goods on the at least one of the plurality of pallets at the first location or the second location using a forklift or a pallet jack.

6. The method of claim 2, further comprising moving the material in the bin at the first location or the second location using a forklift or a pallet jack.

7. The method of claim 1, further comprising securing the collapsible sleeve to the base, wherein securing the collapsible sleeve to the base comprises sliding an attachment mechanism on the base through an opening in a bottom of the collapsible sleeve.

8. The method of claim 1, wherein the bin further comprises a cover.

9. The method of claim 8, further comprising: forming the at least one of the plurality of pallets with the collapsed collapsible sleeve, the cover, and the base.

10. The method of claim 8, further comprising: fitting an exterior frame of the cover over a peripheral edge of the bin for transporting material in the bin.

11. The method of claim 1, further comprising: tracking a location of the at least one of the plurality of pallets or the bin via an RFID tag, a GPS tracker, or an asset tracker.

12. The method of claim 1, wherein the sleeve is made of plastic or cardboard material.

13. The method of claim 1, wherein the collapsible sleeve comprises a z-fold and wherein the z-fold is in a folded position if the collapsible sleeve is collapsed.

14. The method of claim 1, wherein the base and the side walls form a reservoir for capturing any liquid portion of the material in the bin.

15. The method of claim 1, wherein the collapsible sleeve has an opening to accommodate an attachment mechanism of the base.

\* \* \* \* \*

UNITED STATES PATENT AND TRADEMARK OFFICE
CERTIFICATE OF CORRECTION

PATENT NO. : 10,730,662 B2  
APPLICATION NO. : 16/216298  
DATED : August 4, 2020  
INVENTOR(S) : Nicholas L. Whitman et al.

Page 1 of 1

It is certified that error appears in the above-identified patent and that said Letters Patent is hereby corrected as shown below:

On the Title Page

In Column 1, under "(*) Notice: Subject to any disclaimer, the term of this patent is extended or adjusted under 35 U.S.C. 154(b) by 78 days.", insert -- This patent is subject to a terminal disclaimer. --.

Item (45), in Column 2, Line 1, delete "Aug." and insert -- *Aug. --, therefor.

In the Specification

In Column 10, Lines 40-47, delete "Such methods and systems may include a labeler for attaching an RFID label representative of origination site to each unit of material for return; an RFID reader for reading an RFID label on each unit of material; and a logic and data storage module for associating each unit of returned material with originating site. Such methods and systems may further include a communications module in communication with an analytic server." and insert the same on Column 10, Line 39, as a continuation of the same paragraph.

In Column 12, Line 47, delete "RIFD" and insert -- RFID --, therefor.

In Column 28, Line 3, after "like" insert -- . --.

In Column 41, Line 7, after ")" insert -- . --.

Signed and Sealed this  
Twenty-seventh Day of October, 2020

Andrei Iancu  
*Director of the United States Patent and Trademark Office*